US012562088B2

(12) United States Patent
Noh

(10) Patent No.: US 12,562,088 B2
(45) Date of Patent: Feb. 24, 2026

(54) ELECTRONIC DEVICE HAVING FLEXIBLE DISPLAY AND METHOD FOR OPERATING DISPLAY THEREOF

(71) Applicant: Samsung Electronics Co., Ltd., Suwon-si (KR)

(72) Inventor: Daeyoung Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/591,404

(22) Filed: Feb. 29, 2024

(65) Prior Publication Data

US 2024/0203310 A1 Jun. 20, 2024

Related U.S. Application Data

(63) Continuation of application No. PCT/KR2022/008362, filed on Jun. 14, 2022.

(30) Foreign Application Priority Data

Sep. 10, 2021 (KR) ........................ 10-2021-0121020

(51) Int. Cl.
*G09G 3/00* (2006.01)
*G06F 1/16* (2006.01)

(52) U.S. Cl.
CPC ........... *G09G 3/035* (2020.08); *G06F 1/1618* (2013.01); *G09G 2300/026* (2013.01); *G09G 2300/04* (2013.01); *G09G 2360/04* (2013.01)

(58) Field of Classification Search
None
See application file for complete search history.

(56) References Cited

U.S. PATENT DOCUMENTS 8,797,268 B2 8/2014 Altman et al.
2013/0082924 A1 4/2013 Kumar et al.
(Continued)

FOREIGN PATENT DOCUMENTS

CN 104851405 A 8/2015
CN 107566572 A 1/2018
(Continued)

OTHER PUBLICATIONS

International Search Report dated Sep. 14, 2022, issued in International Patent Application No. PCT/KR2022/008362.
(Continued)

*Primary Examiner* — Nicholas J Lee
(74) *Attorney, Agent, or Firm* — Jefferson IP Law, LLP

(57) ABSTRACT

An electronic device having a flexible display and a method for operating the display in the electronic device are provided. The electronic device includes a first housing, a second housing, a third housing, and a flexible display. The flexible display includes a first display fixedly disposed in the first housing and visually exposed in a first state of the electronic device, in the second state thereof, in the third state thereof, and in the fourth state thereof, a second display mounted in the second housing to be able to roll and visually exposed in the second and fourth states, the area of the second display being partially expanded in response to a sliding movement of the second housing, and a third display mounted in the third housing to be able to roll and visually exposed in the third and fourth states, the area of the third display being partially expanded.

21 Claims, 35 Drawing Sheets

(56) References Cited

U.S. PATENT DOCUMENTS

| | | | |
|---|---|---|---|
| 2014/0194165 A1* | 7/2014 | Hwang | .................. G06F 3/147 |
| | | | 455/566 |
| 2015/0002398 A1 | 1/2015 | Nakhimov | |
| 2016/0139629 A1 | 5/2016 | Yeo | |
| 2017/0103735 A1 | 4/2017 | Oh et al. | |
| 2017/0242644 A1 | 8/2017 | Song et al. | |
| 2017/0364121 A1 | 12/2017 | Liu et al. | |
| 2019/0187360 A1 | 6/2019 | Nichol et al. | |
| 2020/0225848 A1 | 7/2020 | Yoon et al. | |
| 2021/0044683 A1 | 2/2021 | He et al. | |
| 2021/0109700 A1 | 4/2021 | Yueh et al. | |
| 2022/0254281 A1 | 8/2022 | Zhang et al. | |

FOREIGN PATENT DOCUMENTS

| | | | |
|---|---|---|---|
| JP | 5857639 | B2 | 2/2016 |
| JP | 6403891 | B2 | 10/2018 |
| JP | 7062070 | B2 | 4/2022 |
| KR | 10-2016-0011141 | A | 1/2016 |
| KR | 10-2016-0059054 | A | 5/2016 |
| KR | 10-2016-0100431 | A | 8/2016 |
| KR | 10-2016-0136174 | A | 11/2016 |
| KR | 10-2017-0043347 | A | 4/2017 |
| KR | 10-2019-0004618 | A | 1/2019 |
| KR | 10-2020-0088997 | A | 7/2020 |
| KR | 10-2021-0042817 | A | 4/2021 |
| KR | 10-2022-0008738 | A | 1/2022 |
| KR | 10-2022-0061787 | A | 5/2022 |
| KR | 10-2022-0066802 | A | 5/2022 |
| KR | 10-2022-0067461 | A | 5/2022 |
| WO | 2017-057783 | A1 | 4/2017 |

OTHER PUBLICATIONS

Korean Office Action dated Dec. 22, 2025, issued in Korean Application No. 10-2021-0121020.

* cited by examiner

FIG. 1

ELECTRONIC DEVICE HAVING FLEXIBLE DISPLAY AND METHOD FOR OPERATING DISPLAY THEREOF

CROSS-REFERENCE TO RELATED APPLICATION(S)

This application is a continuation application, claiming priority under § 365(c), of an International application No. PCT/KR2022/008362, filed on Jun. 14, 2022, which is based on and claims the benefit of a Korean patent application number 10-2021-0121020, filed on Sep. 10, 2021, in the Korean Intellectual Property Office, the disclosure of which is incorporated by reference herein in its entirety.

BACKGROUND

1. Field

The disclosure relates to an electronic device (for example, a rollable device or a slidable device) having a flexible display and a method for operating the display in the electronic device.

2. Description of Related Art

In line with development of digital technologies, various types of electronic devices, such as a mobile communication terminal, a personal digital assistant (PDA), an electronic organizer, a smartphone, a tablet personal computer (PC), and/or a laptop PC have become widely used. The hardware part and/or software part of such electronic devices have been continuously improved in order to support and enhance the functionality thereof.

Electronic devices may have a limited size for the sake of portability, and this limits the display size. Accordingly, various types of electronic devices configured to provide a more expanded screen have recently been developed. For example, the screen size of electronic devices has gradually increased while displays have a limited size, and electronic devices have been designed to provide various services (of functions) to users through large screens.

Recent electronic devices may have a new form factor, such as a rollable device and/or a slidable device. For example, an electronic device may be equipped with a flexible display or a slidable display, and at least a part of the display may be rolled and used or unfolded and used. An electronic device may be implemented such that the screen can be expanded or reduced in a sliding type, for example. For example, a part of the flexible display may be moved out of the inner space of the electronic device as if sliding, or moved into the inner space of the electronic device, thereby expanding or reducing the screen. In line with new form factors of electronic devices, there have been increasing demands for development in connection with improvement of hardware parts (for example, displays) and operation of software parts (for example, user interface (UI)).

The above information is presented as background information only to assist with an understanding of the disclosure. No determination has been made, and no assertion is made, as to whether any of the above might be applicable as prior art with regard to the disclosure.

SUMMARY

An existing electronic device equipped with a flexible display is configured such that, when the display is expanded, the Y-axis is always expanded with the same size. Therefore, when the existing electronic device is used in an open state, the expanded display part is mechanically vulnerable, thereby degrading the user's convenience in various manners. For example, the user has difficulty in using the electronic device in an open state with one hand, and feels nervous when using the electronic device while holding the vulnerable part. In addition, when the full screen is used in the open state of the existing electronic device, unnecessary power consumption occurs.

Aspects of the disclosure are to address at least the above-mentioned problems and/or disadvantages and to provide at least the advantages described below. Accordingly, an aspect of the disclosure is to provide an electronic device including an expandable display (for example, a flexible display), wherein the electronic device includes multiple displays which are independently distinguished, and some of the multiple displays are split/expanded.

Another aspect of the disclosure is to provide an electronic device including a flexible display, wherein among multiple displays, a display on a desired part can be split/expanded and then used as needed.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing coupled to the first housing in a first state of the electronic device and configured to slide in a designated direction from the first housing in the first state so as to support a second state in which a display area is first partially expanded, a third housing coupled to the first housing in the first state of the electronic device and configured to slide in the designated direction from the first housing in the first state so as to support a third state in which a display area is second partially expanded, and a flexible display having a display area at least partially varied in conjunction with sliding movements of the second housing and/or the third housing. The flexible display includes a first display fixedly disposed on the first housing and visually exposed in the first state, in the second state, in the third state, and in a fourth state which is a combination of the second state and the third state, a second display mounted on the second housing to be able to roll, visually exposed in the second state and the fourth state, and configured to partially expand a display area according to a sliding movement of the second housing, and a third display mounted on the third housing to be able to roll, visually exposed in the third state and the fourth state, and configured to partially expand a display area according to a sliding movement of the third housing.

In accordance with another aspect of the disclosure, an electronic device is provided. The electronic device includes a first display, a second display capable of expanding the first display first partially, a third display capable of expanding the first display second partially, and a processor. The processor is configured to display a first execution screen based on the first display, detect a change in state of at least one display among the second display and the third display while displaying the first execution screen, identify at least one display, a change in state of which is detected, among the second display and the third display, perform control, based on identifying a change in state of the second display, such that the first execution screen displayed through the first display is maintained, and a second execution screen is displayed through the second display, or the first execution screen is changed so as to correspond to interworking between a first portion of the first display and the second display and then displayed, and a second execution screen is displayed through a second portion of the first display, and perform control, based on identifying a change in state of the third display, such that the first execution screen displayed through the first display is maintained, and a third execution screen is displayed through the third display, or the first execution screen is changed so as to correspond to interworking between a second portion of the first display and the second display and then displayed, and a second execution screen is displayed through a first portion of the first display.

In accordance with another aspect of the disclosure, a method for operating an electronic device including a first housing, a second housing, a third housing, and a flexible display capable of moving into/out of the second housing and/or the third housing is provided. The method includes displaying a first execution screen based on a first display fixed to the first housing, the first display having a display region exposed outwards, detecting a change in state of at least one display, while displaying the first execution screen, among the second display configured to be rolled from the second housing and capable of expanding the first display first partially, and the third display configured to be rolled to the third housing and capable of expanding the first display second partially, identifying at least one display, a change in state of which is detected, among the second display and the third display, performing control, based on identifying a change in state of the second display, such that the first execution screen displayed through the first display is maintained, and a second execution screen is displayed through the second display, or the first execution screen is changed so as to correspond to interworking between a first portion of the first display and the second display and then displayed, and a second execution screen is displayed through a second portion of the first display, and performing control, based on identifying a change in state of the third display, such that the first execution screen displayed through the first display is maintained, and a third execution screen is displayed through the third display, or the first execution screen is changed so as to correspond to interworking between a second portion of the first display and the second display and then displayed, and a second execution screen is displayed through a first portion of the first display.

In order to address the above-mentioned issues, various embodiments of the disclosure includes one or more computer-readable recording medium in which a program for executing the method in a processor is recorded.

An electronic device and a method for operating the same, according to various embodiments of the disclosure, are advantageous in that, by providing an electronic device including independently distinguished multiple displays, some of which are split/expanded, the user can split/expand a display on a desired part, among the multiple displays, as needed and use the same. Accordingly, in connection with using an electronic device having a flexible display, has improved convenience, usability, and/or stability (for example, improved character typing usability, improved camera image capture usability, or improved cradling convenience). According to an embodiment of the disclosure, the displays of the electronic device are partially operated according to the purpose of use, thereby reducing the current consumed by the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

Throughout the drawings, it should be noted that like reference numbers are used to depict the same or similar elements, features, and structures.

DETAILED DESCRIPTION

Figure 2A:
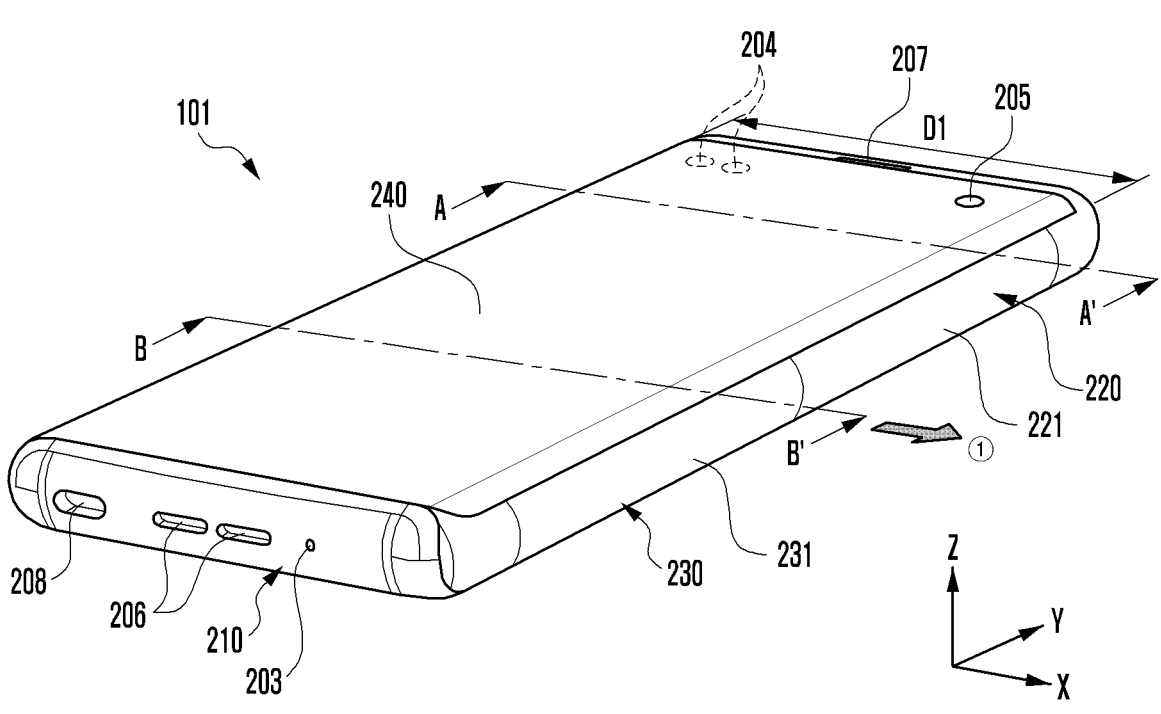
FIGS. 2A and 2B are front perspective views of an electronic device in a closed state and in an open state, respectively, according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
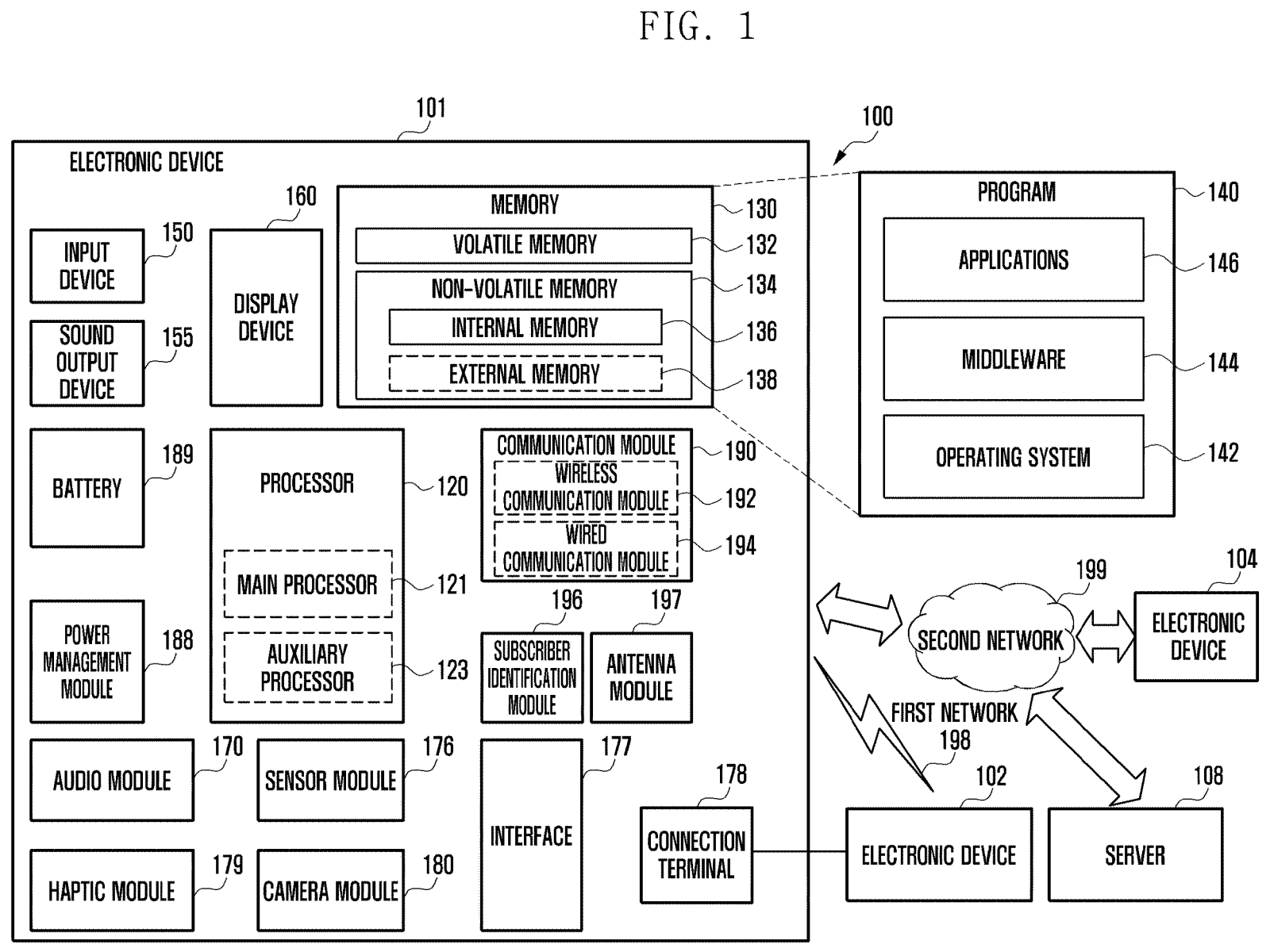

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments of the disclosure, at least one of the components (e.g., the connecting terminal 178) may be omitted from the electronic device 101, or one or more other components may be added in the electronic device 101. In various embodiments of the disclosure, some of the components (e.g., the sensor module 176, the camera module 180, or the antenna module 197) may be implemented as a single component (e.g., the display device 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an another component (e.g., a radio frequency integrated circuit (RFIC)) other than the the disclosure radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2B:
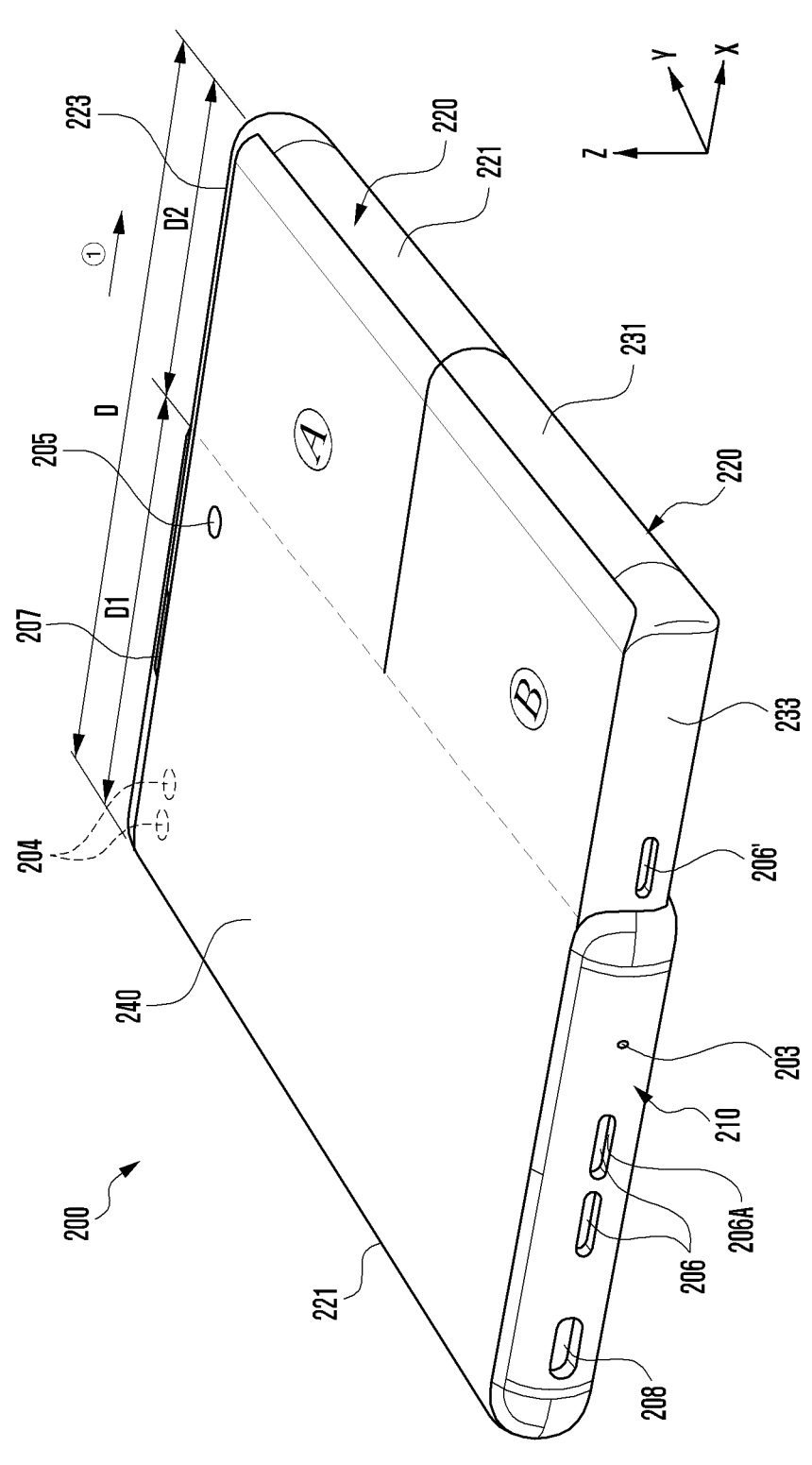
Figure 3A:
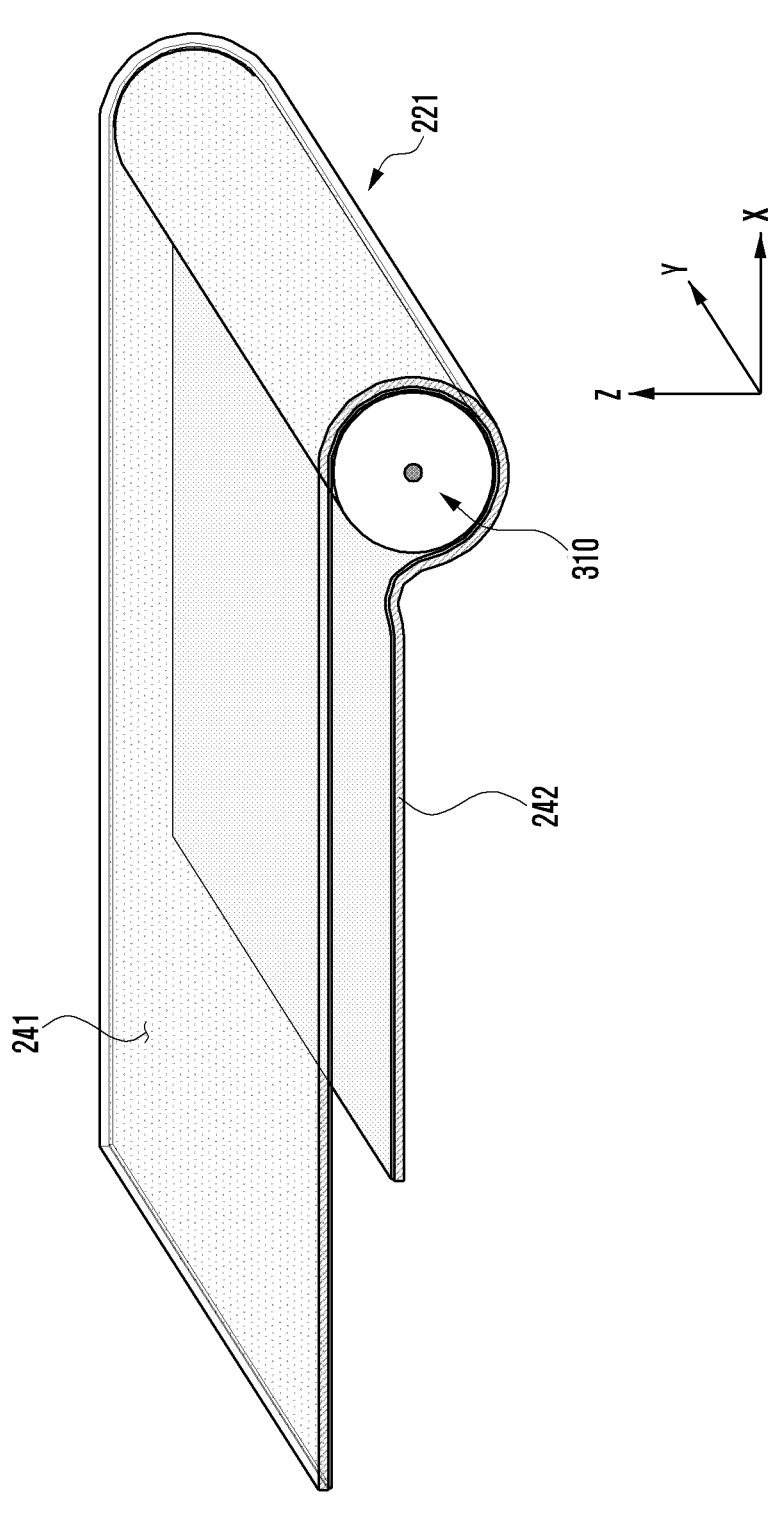
FIG. 3A is a schematic view of a display section taken along line A-A' in FIG. 2A according to an embodiment of the disclosure.
Figure 3B:
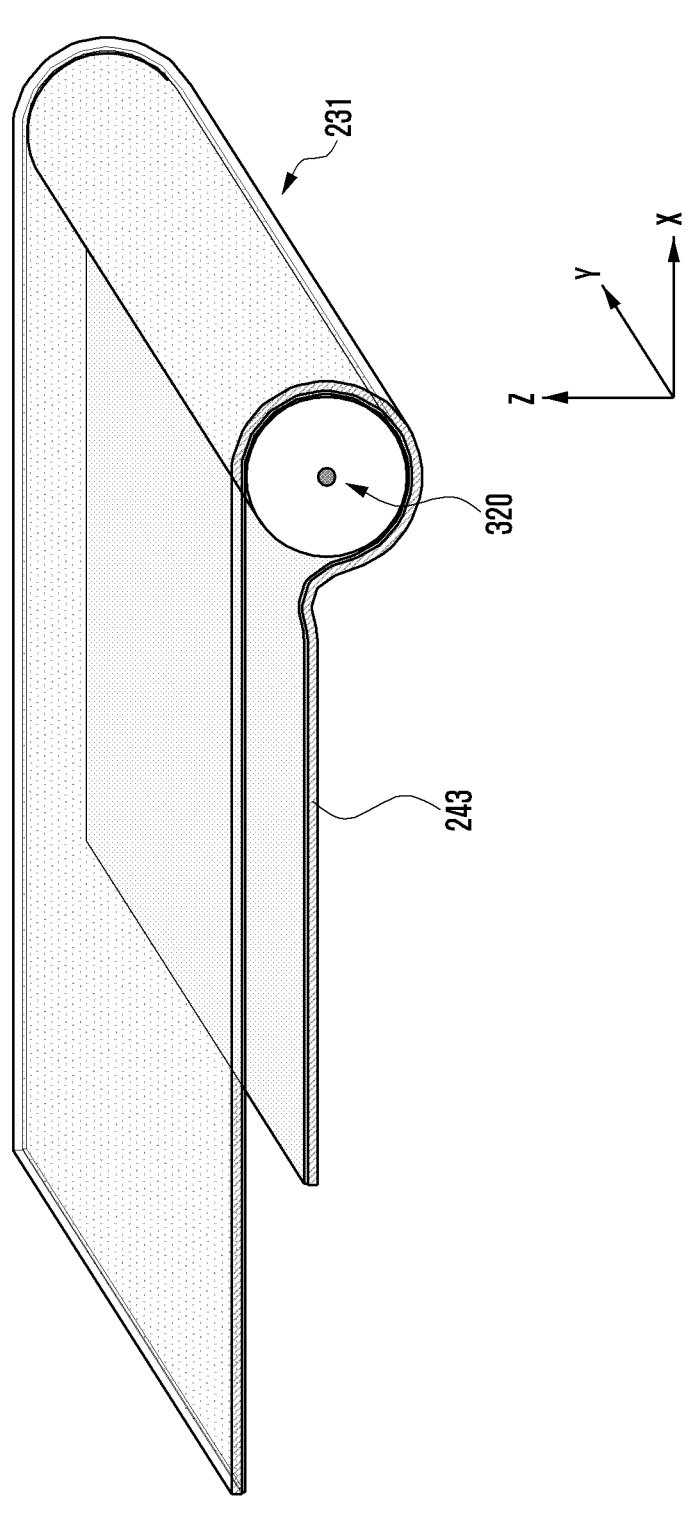
FIG. 3B is a schematic view of a display section taken along line B-B' in FIG. 2A according to an embodiment of the disclosure.

FIGS. 2A and 2B are front perspective views of an electronic device in a closed state and in an open state, respectively, according to various embodiments of the disclosure. FIG. 3A is a schematic view of a display section taken along line A-A' in FIG. 2A according to an embodiment of the disclosure. FIG. 3B is a schematic view of a display section taken along line B-B' in FIG. 2A according to an embodiment of the disclosure.

The electronic device 101 in FIGS. 2A, 2B, 3A, and 3B may be at least partially similar to the electronic device 101 in FIG. 1, may include the electronic device 101 in FIG. 1, or may further include other embodiments of the electronic device 101 in FIG. 1.

Referring to FIGS. 2A, 2B, 3A, and 3B, the electronic device 101 may include a first housing 210 (for example, a first housing structure or a base housing) and a second housing 220 (for example, a second housing structure, a first sliding housing, or a first roller housing) and a third housing 230 (for example, a third housing structure, a second sliding housing, or a second roller housing) which are coupled to be able to move from the first housing 210 in a designated direction (for example, a first direction (direction ①)) and to a designated reciprocating distance.

According to an embodiment of the disclosure, each of the first housing 210, the second housing 220, and the third housing 230 may include a space at least partially closed from the outside.

According to an embodiment of the disclosure, the first housing 210 may be disposed so as to at least partially form the rear and lateral surfaces of the electronic device 101.

According to an embodiment of the disclosure, the second housing 220 may include a first roller portion 221 and a first sliding portion 223. Although not illustrated, the first sliding portion 223 may include sliding portions on a lateral surface of the second housing 220 and on another lateral surface facing the former lateral surface, respectively, thereby supporting sliding movements of the second housing 220 through the sliding portions on both lateral surfaces.

According to an embodiment of the disclosure, the third housing 230 may include a second roller portion 231 and a second sliding portion 233. Although not illustrated, the second sliding portion 233 may include sliding portions on a lateral surface of the third housing 230 and on another lateral surface facing the former lateral surface, respectively, thereby supporting sliding movements of the third housing 230 through the sliding portions on both lateral surfaces.

According to an embodiment of the disclosure, the first roller portion 221 may be positioned on a side (for example, right upper end) with reference to a horizontal split (for example, x-direction split) of a first display 241, and the second roller portion 231 may be positioned on another side (for example, right lower end) with reference to the horizontal split of the first display 241. The first roller portion 221 and the second roller portion 231 may be positioned on a straight line along the y-axis direction (or longitudinal direction of the first display 241). According to an embodiment of the disclosure, each of the first roller portion 221 and the second roller portion 231 may approximately have the shape of a cylinder, both ends of which are closed, and is not limited thereto.

According to an embodiment of the disclosure, referring to FIG. 3A, the first roller portion 221 may include a first roller 310 and a first roller housing (not illustrated) configured to surround the first roller 310. According to an embodiment of the disclosure, referring to FIG. 3B, the second roller portion 231 may include a second roller 320 and a second roller housing (not illustrated) configured to surround the second roller 320. According to an embodiment of the disclosure, the first roller 310 may be mounted inside the first roller portion 221 to be able to rotate by a bearing (not illustrated), and the second roller 320 may be mounted inside the second roller portion 231 to be able to rotate by a bearing (not illustrated).

According to an embodiment of the disclosure, a part of a second display 242 may move into the first roller portion 221 so as to contact the first roller 310. According to an embodiment of the disclosure, a part of a third display 243 may move into the second roller portion 231 so as to contact the second roller 330.

According to an embodiment of the disclosure, the first roller 310 and the second roller 320 may be coated with an adhesive layer (not illustrated) having an attachment function and forced against the second display 242 and the third display 243, respectively. According to an embodiment of the disclosure, the first roller 310 and the second roller 320 may have an identical diameter.

According to various embodiments of the disclosure, the electronic device 101 may be a rollable type electronic device having a flexible display 240, the display screen of which is at least partially expanded based on a sliding movement of the second housing 220 and/or the third housing 230.

According to various embodiments of the disclosure, the second housing 220 and the third housing 230 of the electronic device 101 may be coupled so as to be at least partially inserted into the inner space of the first housing 210 and to be able to move in the illustrated designated direction (for example, direction (1)). For example, the first housing 210 and the second housing 220 my operate in a sliding type with regard to each other such that the width of a side (for example, upper end) of the first display 241 is partially varied. As another example, the first housing 210 and the third housing 230 my operate in a sliding type with regard to each other such that the width of another side (for example, lower end) of the first display 241 is partially varied.

According to an embodiment of the disclosure, in a closed state of the electronic device 101 (for example, in a first state illustrated in FIG. 2A), a coupled state may be maintained between the first housing 210 and the second housing 220 and between the first housing 210 and the third housing 230 such that the first display 241 has a first distance D1 (or a first width W1). According to an embodiment of the disclosure, in an open state of the electronic device 101, the second housing 220 and/or the third housing 230 may remain protruded from the first housing 210 such that the second display 242 moves from the second housing 220, and/or the third display 243 moves from the third housing 230, so as to have an additional second distance D2 (for example, a second width W2), thereby having a third distance D (for example, a third width W) larger than the first distance D1 (for example, increased by the second distance D2).

For example, in a closed state, the flexible display 240 may have a display area corresponding to the first width W1. As another example, in a first partially open state of the flexible display 240 (for example, in a slide-out state of the second display 242), a portion (upper end portion) of the first display 241 may have an expanded display area corresponding to the third width W3, and another portion (lower end portion) thereof may have a display area corresponding to the first width W1.

As another example, in a second partially open state of the flexible display 240 (for example, in a slide-out state of the third display 243), another portion (lower end portion) of the first display 241 may have an expanded display area corresponding to the third width W3, and a portion (upper end portion) thereof may have a display area corresponding to the first width W1. As another example, in an open state (for example, in a slide-out state of the second display 242 and the third display 243), the entire portion of the flexible display 240 may have an expanded display area corresponding to the third width W3.

According to an embodiment of the disclosure, the 101 may include a flexible display 240 (for example, an expandable display) disposed to be at least partially supported by the first housing 210, the second housing 220, and the third housing 230. According to an embodiment of the disclosure, the flexible display 240 may include the first display 241 supported by the first housing 210 and configured to be always seen from the outside, a bendable second display 242 configured to partially extend from a first portion A (for example, upper end portion) of the first display 241, configured to at least partially move into the inner space of the second housing 220 so as not to be seen from the outside in a closed state, and supported by the second housing 220, and a bendable third display 243 configured to partially extend from a first portion B (for example, lower end portion) of the first display 241, configured to at least partially move into the inner space of the third housing 230 so as not to be seen from the outside in a closed state, and supported by the third housing 230.

According to an embodiment of the disclosure, the first display 241 may be disposed to be supported by the first housing 210, the second display 242 may be disposed to be at least partially supported by a support member (for example, a bendable member) of the second housing 220, and the third display 243 may be disposed to be at least partially supported by a support member (for example, a bendable member) of the third housing 230.

According to an embodiment of the disclosure, the first display 241 of the flexible display 240 may be always exposed to the outside in a closed state of the electronic device 101 (for example, in a slide-in state of the second display 242 and the third display 243), in a partially open state of the electronic device 101 (for example, in a slide-out state of the second display 242 or the third display 243), or in a fully open state of the electronic device 101 (for example, in a slide-out state of the second display 242 and the third display 243).

According to an embodiment of the disclosure, the second display 242 of the flexible display 240 may be disposed in the inner space of the second housing 220 so as not to be exposed to the outside in a closed state (or in a slide-in state) of the electronic device 101. According to an embodiment of the disclosure, the second display 242 of the flexible display 240 may be exposed to the outside by extending from the first portion A of the first display 241 while being supported by the second housing 220 in an open state (or in a slide-out state) of the electronic device 101. Therefore, the display screen of the flexible display 240 may be first partially expanded by an opening operation (for example, a sliding movement) of the electronic device 101 resulting from a movement of the second housing 220 from the first housing 210.

According to an embodiment of the disclosure, the third display 243 of the flexible display 240 may be disposed in the inner space of the third housing 230 so as not to be exposed to the outside in a closed state of the electronic device 101. According to an embodiment of the disclosure, the third display 243 of the flexible display 240 may be exposed to the outside by extending from the second portion B of the first display 241 while being supported by the third housing 230 in an open state of the electronic device 101. Therefore, the display screen of the flexible display 240 may be second partially expanded by an opening operation (for example, a sliding movement) of the electronic device 101 resulting from a movement of the third housing third housing 230 from the first housing 210.

According to an embodiment of the disclosure, the second display 242 and the third display 243 may be formed to have a first disposition structure (for example, up/down disposition structure) and to have a structure in which they slide in/out in a first direction (for example, leftward/rightward direction or X-direction) perpendicular to the first disposition structure. Various embodiments are not limited thereto, and the second display 242 and the third display 243 may be formed to have a second disposition structure (for example, left/right disposition structure) and to have a structure in which they slide in/out in a second direction (for example, upward/downward direction or Y-direction) perpendicular to the second disposition structure.

According to an embodiment of the disclosure, the display screen of the flexible display 240 may be fully expanded by an opening operation (for example, a sliding movement) of the flexible display 240 resulting from a movement of the second housing 220 and the third housing 230 from the first housing 210.

According to an embodiment of the disclosure, the second housing 220 and/or the third housing 230 may be manually moved into/out of the first housing 210 by the user's manipulation. According to various embodiments of the disclosure, the outward moving operation of the electronic device 101 may be performed through the user's manipulation. For example, the electronic device 101 may be switched from a closed state to an open state by an operation of the flexible display 240 which is pushed in a designated first direction (direction (1) by the user's manipulation. According to an embodiment of the disclosure, the electronic device 101 may be switched from an open state to a closed state by an operation of the flexible display 240 which is pushed in a designated second direction (direction (2) by the user's manipulation.

According to an embodiment of the disclosure, the electronic device 101 may maintain an open state and/or a closed state as a sliding hinge module (not illustrated) disposed between the first housing 210 and the second housing 220 and/or a sliding hinge module (not illustrated) disposed between the first housing 210 and the third housing 230 pressurize the second housing 220 and/or the third housing 230 in a direction in which they tend to move into or out of the first housing 210. When operated by the user's manipulation, the second housing 220 and/or the third housing 230 can protrude by an amount of protrusion desired by the user, and this may vary the screen of the flexible display 240 so as to have various display areas. For example, the display area of the flexible display 240 of the electronic device 101 may be varied as the second housing 220 and/or the third housing 230 move from the first housing 210 along a designated direction in a sliding type.

In some embodiments of the disclosure, the electronic device 101 may be configured such that the second housing 220 and/or the third housing 230 move outwards in a designated first direction (direction (1)) through manipulation of a locker exposed through the rear surface (not illustrated) of the electronic device 101.

According to an embodiment of the disclosure, the electronic device 101 may switch to an open state and a closed state automatically through a driving mechanism (for example, a driving motor, a reduction module, and/or a gear assembly) disposed in an inner space (for example, in the inner space of the first housing 210 and/or in the inner space of the second housing 220 and the third housing 230). For example, the electronic device 101 may be configured such that, upon detecting an event for switching the closed/open state of the electronic device 101 through a processor (for example, the processor 120 in FIG. 1), operations of the second housing 220 and/or the third housing 230 are controlled through the driving mechanism. In some embodiments of the disclosure, the processor (for example, the processor 120 in FIG. 1) of the electronic device 101 may control the flexible display 240 so as to display visual information (for example, an object and/or an application execution screen) in various types in response to the changed display area of the flexible display 240, according to a closed state, an open state, or an intermediate state (for example, a free stop state included).

According to various embodiments of the disclosure, the electronic device 101 may include at least one of an input device 203 (for example, the input device 150 in FIG. 1) (for example, a microphone), sound output devices 206, 206', and 207 (for example, the sound output device 155 in FIG. 1) (for example, speakers 206 and 206 and a receiver 207, a sensor module 204, a front camera 205, a rear camera (not illustrated), a connector port 208, a key input device (not illustrated), and/or an indicator (not illustrated). In another embodiment of the disclosure, at least one of the above-described components of the electronic device 101 may be omitted, or other components may be additionally included therein.

According to an embodiment of the disclosure, the speaker 206', if disposed in the third housing 213, may be configured to output sounds through a speaker hole 206A formed in the first housing 220 in a closed state. According to an embodiment of the disclosure, the input device 203 or the connector port 208 may also be configured have substantially the same configuration. According to other embodiments of the disclosure, the sound output devices 206, 206', and 207' may include a speaker (for example, a piezoelectric speaker) configured to operate without a separate speaker hole (for example, 206A).

According to various embodiments of the disclosure, the electronic device 101 may include a display having the structure in FIGS. 2A, 2B, 3A, and 3B. According to various embodiments of the disclosure, the electronic device 101 may include various expandable form factors regarding various types of displays in addition to the form factor described with reference to FIGS. 2A, 2B, 3A, and 3B. For example, the electronic device 101 may be implemented in various form factors, based on a sliding (or rolling) scheme, according to the form factor structure of the electronic device 101 in FIGS. 2A, 2B, 3A, and 3B.

According to an embodiment of the disclosure, the electronic device 101 may be a rollable device capable of expanding the display area of the display device 160 in a type corresponding to the rolling (or sliding) type referring to FIGS. 2A, 2B, 3A, and 3B, and may include a housing (for example, a first housing and a second housing on a lateral surface, and a third housing and a fourth housing on another lateral surface) including expandable displays on both lateral surfaces of the display device 160 (for example, the first display 241), respectively.

According to an embodiment of the disclosure, although the electronic device 101 is described as a unidirectional rollable device having a display device 160 (for example, a second display 242 and the third display 243) configured to roll and contained in the second housing 220 and the third housing 230, the electronic device 101 may be implemented so as to roll in both directions. According to an embodiment of the disclosure, although the second housing 220 and the third housing 230 of the electronic device 101 are illustrated as having a designated shape (for example, a cylinder or a quadrangular column), the second housing 220 and the third housing 230 are not limited thereto and may be implemented in various manners in which the display device 160 can be rolled and contained therein.

Figure 4A:
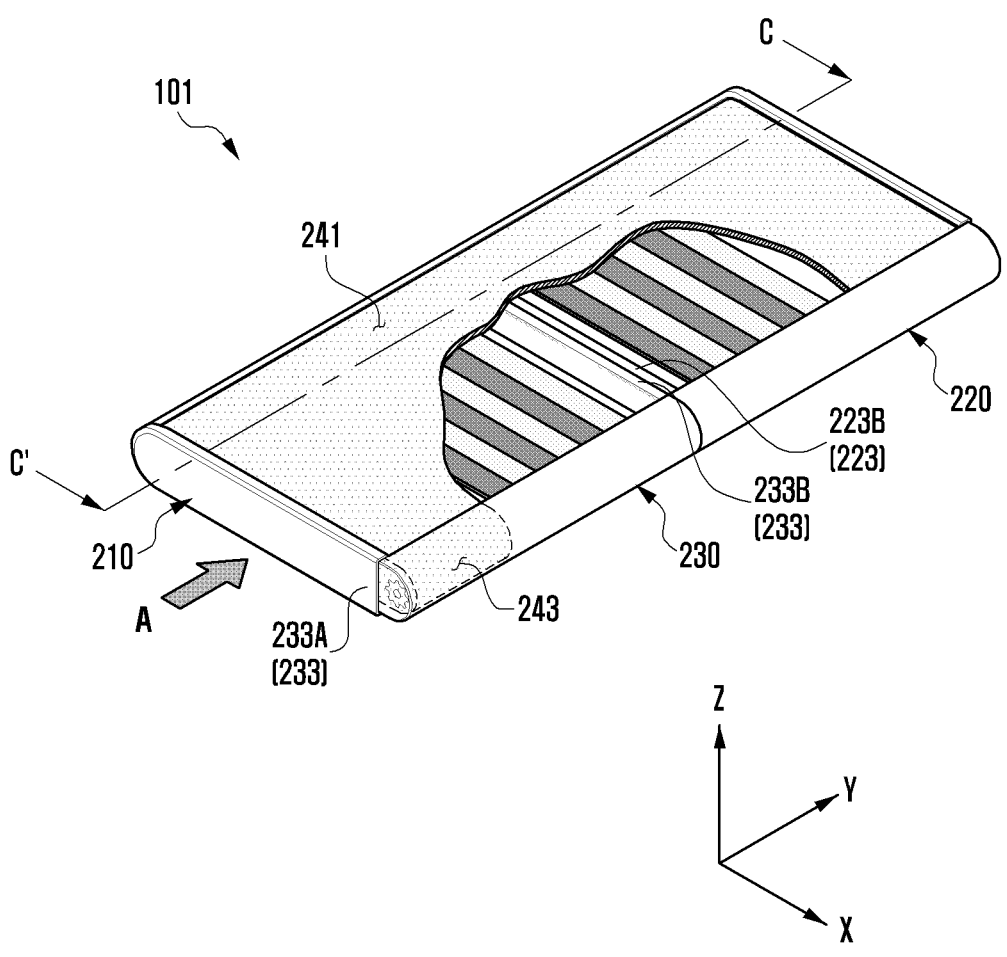
FIGS. 4A and 4B illustrate an electronic device in a closed state and in a partially open state, respectively, according to various embodiments of the disclosure.
Figure 4B:
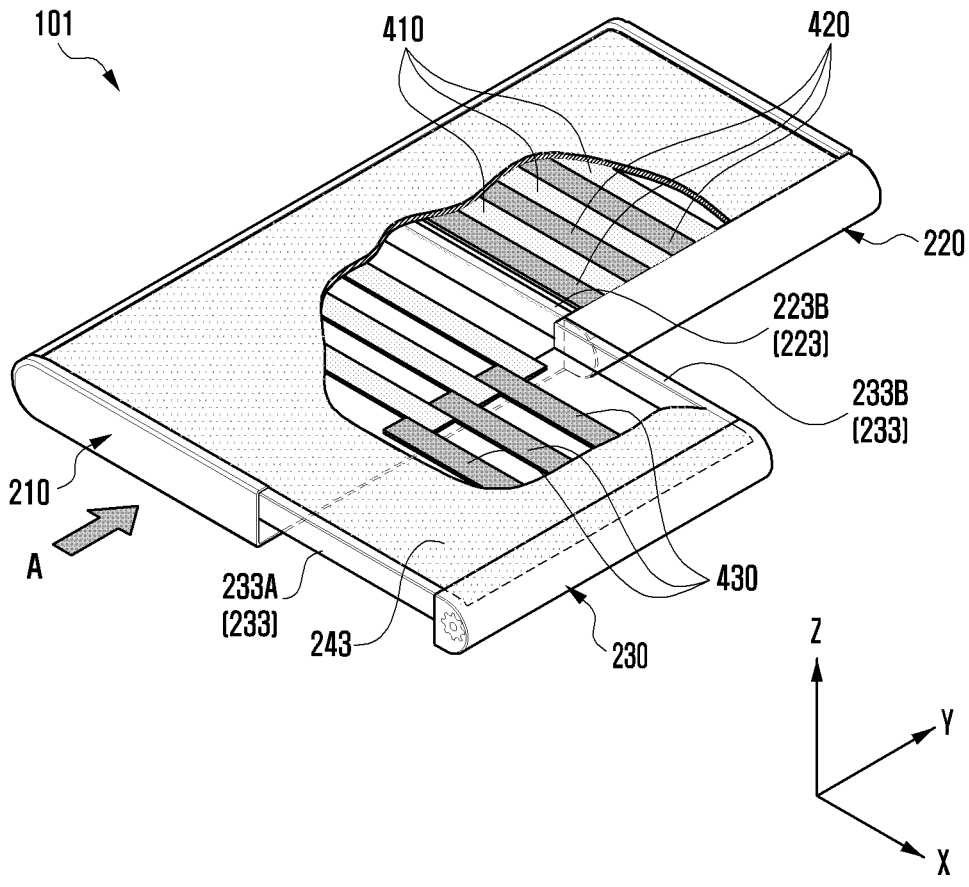
Figure 5A:
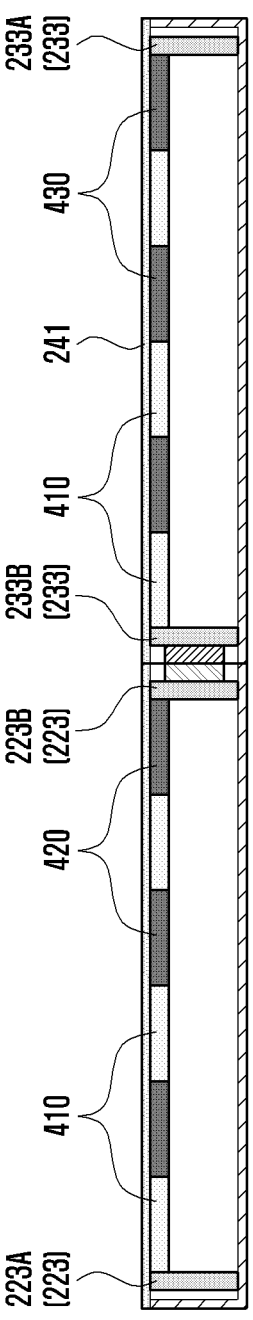
FIG. 5A is a schematic view of a section taken along line C-C' in FIG. 4A according to an embodiment of the disclosure.
Figure 5B:
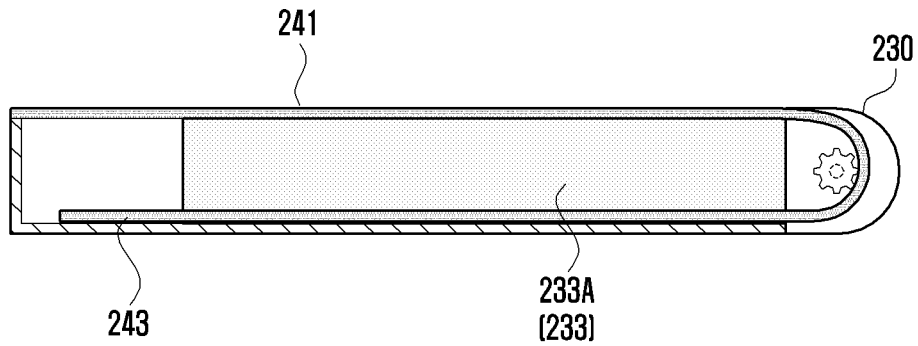
FIG. 5B is a schematic view of a partial section of an electronic device in a closed in state in FIG. 4A, seen in direction A according to an embodiment of the disclosure.
Figure 5C:
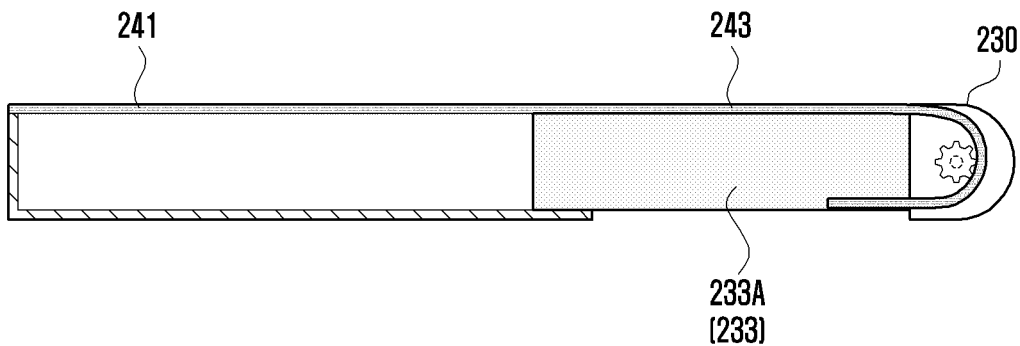
FIG. 5C is a schematic view of a partial section of an electronic device in a partially open in state in FIG. 4B, seen in direction A according to an embodiment of the disclosure.

FIGS. 4A and 4B illustrate an electronic device in a closed state and in a partially open state, respectively, according to various embodiments of the disclosure. FIG. 5A is a schematic view of a section taken along line C-C' in FIG. 5A according to an embodiment of the disclosure. FIG. 5B is a schematic view of a partial section of an electronic device in a closed in state in FIG. 4A, seen in direction A according to an embodiment of the disclosure. FIG. 5C is a schematic view of a partial section of an electronic device in a partially open in state in FIG. 4B, seen in direction A according to an embodiment of the disclosure.

Referring to FIGS. 4A, 4B, 5A, 5B, and 5C, the electronic device 101 according to an embodiment may include a flexible display 240 including multiple displays distinguished independently (for example, the first display 241, a second display 242, and the third display 243). According to an embodiment of the disclosure, the electronic device 101 may support at least some displays (for example, the second display 242 and the third display 243) among the multiple displays 241, 242, and 243 such that they can be used after being partially expanded (or split/expanded) according to a designated display operating scheme. For example, FIG. 4A may illustrate an example of a fully closed state of the electronic device 101 (for example, a state in which the second display 242 and the third display 243 are reduced), and FIG. 4B may illustrate an example of a partially open state of the electronic device 101 (for example, a state in which the third display 243 is expanded).

The electronic device 101 according to an embodiment may include the first housing 210, the second housing 220, and the third housing 230.

The first housing 210 may be disposed so as to form the rear and lateral surfaces of the electronic device 101.

The second housing 220 may be positioned on one side of the first housing 210 (for example, on the right side of the first display 241) and above the third housing 230. The third housing 230 may be positioned on one side of the first housing 210 (for example, on the right side of the first display 241) and below the second housing 220.

The second housing 220 may include the first roller portion 221 and a first sliding portion 223. The first sliding portion 223 may include sliding portions on a lateral surface of the second housing 220 and on another lateral surface facing the former lateral surface, respectively, thereby supporting sliding movements of the second housing 220 through the sliding portions on both lateral surfaces.

The third housing 230 may include the second roller portion 231 and a second sliding portion 233. The second sliding portion 233 may include sliding portions on a lateral surface of the third housing 230 and on another lateral surface facing the former lateral surface, respectively, thereby supporting sliding movements of the third housing 230 through the sliding portions on both lateral surfaces.

The second housing 220 and the third housing 230 may be positioned on a straight line along the Y-axis direction (for example, in the vertical direction or in the longitudinal direction of the first display 241) in a closed state of the electronic device 101 or in a fully open state of the electronic device 101. The first roller portion 221 of the second housing 220 and the second roller portion 231 of the third housing 230 may be positioned on a straight line along the Y-axis direction (for example, in the vertical direction or in the longitudinal direction of the first display 241). According to an embodiment of the disclosure, each of the first roller portion 221 and the second roller portion 231 may approximately have the shape of a cylinder, both ends of which are closed, and is not limited thereto.

The first roller portion 221 may include a first roller 310 and a second display 242. The second roller portion 231 may include a second roller 320 and the third display 243. In an embodiment of the disclosure, the first roller 310 and the second roller 320 may have an axial direction parallel to the Y-direction. The first roller 310 may be mounted inside the second housing 220 (for example, the first roller portion 221) to be able to rotate by a bearing (not illustrated), and the second roller 320 may be mounted inside the third housing 230 (for example, the second roller portion 231) to be able to rotate by a bearing (not illustrated).

The second display 242 may be move out of the second housing 220 or move into the second housing 220 according to the direction of rotation of the first roller 310 resulting from a sliding movement of the second housing 220. The third display 243 may be move out of the third housing 230 or move into the third housing 230 according to the direction of rotation of the second roller 320 resulting from a sliding movement of the third housing 230.

The second housing 220 may be formed by coupling between the first roller portion 221 and the first sliding portion 223, and the distance from the first housing 210 (or the first display 241) may be varied by a sliding movement thereof resulting from an operation of the first sliding portion 223. The first sliding portion 223 may include a pair of first sliders 223A and 223B fixed to both ends of the first roller portion 221. According to some embodiments of the disclosure, the first sliding portion 223 may include a first actuator coupled to at least one of the pair of first sliders 223A and 223B so as to move the first sliding portion 223.

The third housing 230 may be formed by coupling between the second roller portion 231 and the second sliding portion 233, and the distance from the first housing 210 (or the first display 241) may be varied by a sliding movement thereof resulting from an operation of the second sliding portion 233. The second sliding portion 233 may include a pair of second sliders 233A and 233B fixed to both ends of the second roller portion 231. According to some embodiments of the disclosure, the second sliding portion 233 may include a second actuator coupled to at least one of the pair of second sliders 233A and 233B so as to move the second sliding portion.

The pair of first sliders 223A and 223B may have rod shapes, may be positioned parallel to the X-direction, and may face each other along the Y-direction. The pair of second sliders 233A and 233B may have rod shapes, may be positioned parallel to the X-direction, and may face each other along the Y-direction. The first sliders 223A and 223B and the second sliders 233A and 233B may be positioned parallel to each other along the X-axis, and one of the first sliders 223A and 223B (for example, the slider 223B positioned inside), and one of the second sliders 233A and 233B (for example, the slider 233B positioned inside) may be adjacent to and face each other along the Y-direction. The slider 223B positioned inside among the first sliders 223A and 223B and the slider 233B positioned inside among the second sliders 233A and 233B may face each other through adjacent surfaces (for example, a first adjacent surface of the slider 223B and a second adjacent surface of the slider 233B), respectively, and may be spaced apart by a predetermined interval, thereby forming an inner space.

The other slider of the first sliders 223A and 223B (for example, the slider 223A positioned outside) and other slider of the second sliders 233A and 233B (for example, the slider 233A positioned outside) may be positioned inside of both lateral surfaces of the first housing 210 so as not to collide with both lateral surfaces of the first housing 210.

The first sliders 223A and 223B and the second sliders 233A and 233B may have the same height and the same length.

The outward movement or inward movement of the second display 242 may be determined by the direction of the rotation of the first roller 310, and the amount of outward movement or inward movement thereof may be determined by the amount of rotation of the first roller 310. The outward movement or inward movement of the third display 243 may be determined by the direction of the rotation of the second roller 320, and the amount of outward movement or inward movement thereof may be determined by the amount of rotation of the second roller 320.

According to an embodiment of the disclosure, the electronic device 101 may include a rail portion for supporting sliding movements of the second housing 220 and the third housing 230 and for supporting displays (for example, the second display 242 and/or the third display 243) expanded in response to sliding movements of the second housing 220 and/or the third housing 230, respectively.

The rail portion may include multiple fixed rails 410 fixed inside the first housing 210, multiple first movable rails 420 coupled to the sliding second housing 220 so as to engage with lateral surfaces of the multiple fixed rails 410, respectively, and multiple second movable rails 430 coupled to the sliding third housing 230 so as to engage with lateral surfaces of the multiple fixed rails 410, respectively. Each of the multiple fixed rails 410, the multiple first movable rails 420, and the multiple second movable rails 430 may be a band-shaped rail parallel to the X-direction and may include a metal.

The multiple fixed rails 410 may be aligned inside the first housing 210 at a predetermined distance from each other along the Y-direction. The multiple first movable rails 420 may be fixed inside the second housing 220 and aligned at a predetermined distance from each other along the Y-direction. The multiple second movable rails 430 may be fixed inside the third housing 230 and aligned at a predetermined distance from each other along the Y-direction.

The first movable rails 420 and the second movable rails 430 may be positioned between every two adjacent fixed rails (for example, fixed rails 410) along the Y-direction. For example, the first movable rails 420 may have lateral surfaces engaging with lateral surfaces of the fixed rail 410 positioned on a portion (for example, upper region), respectively, and engaging with lateral surfaces of the fixed rails 410 positioned on another portion (for example, lower region) of the second movable rails 430. The multiple fixed rails 410, the multiple first movable rails 420, and the multiple second movable rails 430 may have lateral surfaces engaging with each other by a protrusion-groove coupling structure. For example, each of the multiple first movable rails 420 may include a first groove formed on a lateral surface thereof, respectively, and each of the multiple second movable rails 430 may include a second groove formed on a lateral surface thereof, respectively. Each of the multiple fixed rails 410 may include protrusions formed on lateral surfaces facing the first movable rail 420 and a second movable rail 430, respectively.

The multiple first movable rails 420 and the multiple second movable rails 430 may slide in the X-direction with regard to the multiple fixed rails 410.

In a closed state of the electronic device 101, the multiple first movable rails 420 and the multiple second movable rails 430 may be positioned parallel to the multiple fixed rails 410 in the first housing 210. In an open state of the electronic device 101, the multiple first movable rails 420 and the multiple second movable rails 430 may slide together with corresponding housings (for example, the second housing 220 and the third housing 230), respectively, thereby being expanded in the X-direction from the first housing 210.

Multiple movable rails (for example, the multiple second movable rails 430 referring to FIG. 4B) sliding in a partially open state of the electronic device 101 may slide together with a corresponding housing (for example, the third housing 230 in FIG. 4B), thereby being expanded in the X-direction from the first housing 210. Multiple movable rails (for example, the multiple first movable rails 420 referring to FIG. 4B) fixed (or not sliding) in a partially open state of the electronic device 101 may be positioned parallel to the multiple fixed rails 410 in the first housing 210.

According to an embodiment of the disclosure, the length of each of the multiple first movable rails 420 may be larger than the maximum sliding distance of the second housing 220 such that, in an open state or in a partially open state, the multiple first movable rails 420 are not fully separately from the multiple fixed rails 410. According to an embodiment of the disclosure, the length of each of the multiple second movable rails 430 may be larger than the maximum sliding distance of the third housing 230 such that, in an open state or in a partially open state, the multiple second movable rails 430 are not fully separately from the multiple fixed rails 410.

According to an embodiment of the disclosure, the rail portion may stably support the flexible display 240. According to an embodiment of the disclosure, the multiple first movable rails 420 and/or the multiple second movable rails 430 sliding in a partially open state may stably support expanded displays (for example, the second display 242 and/or the third display 243).

Figure 5D:
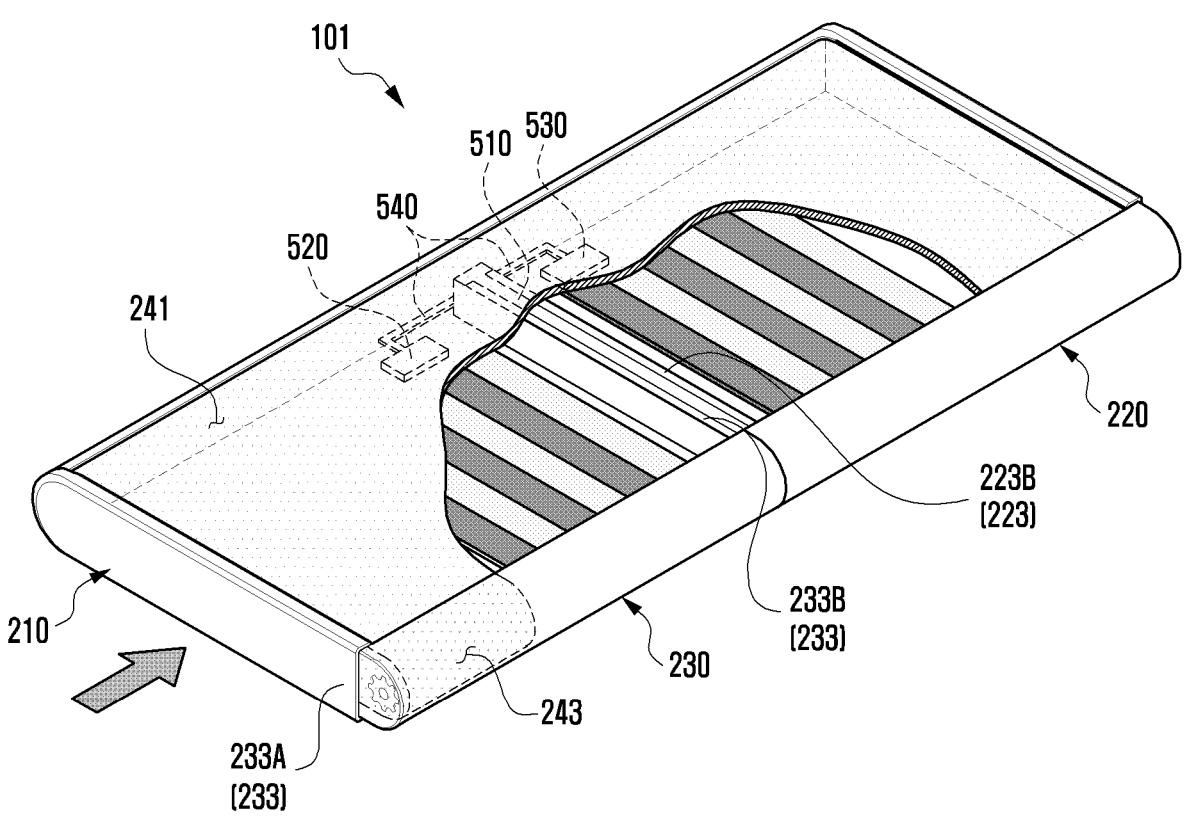
FIGS. 5D and 5E illustrate an electronic device in a closed state and in an open state, respectively, according to various embodiments of the disclosure.
Figure 5D:
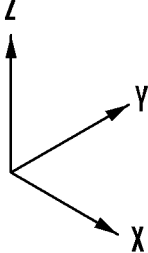
Figure 5E:
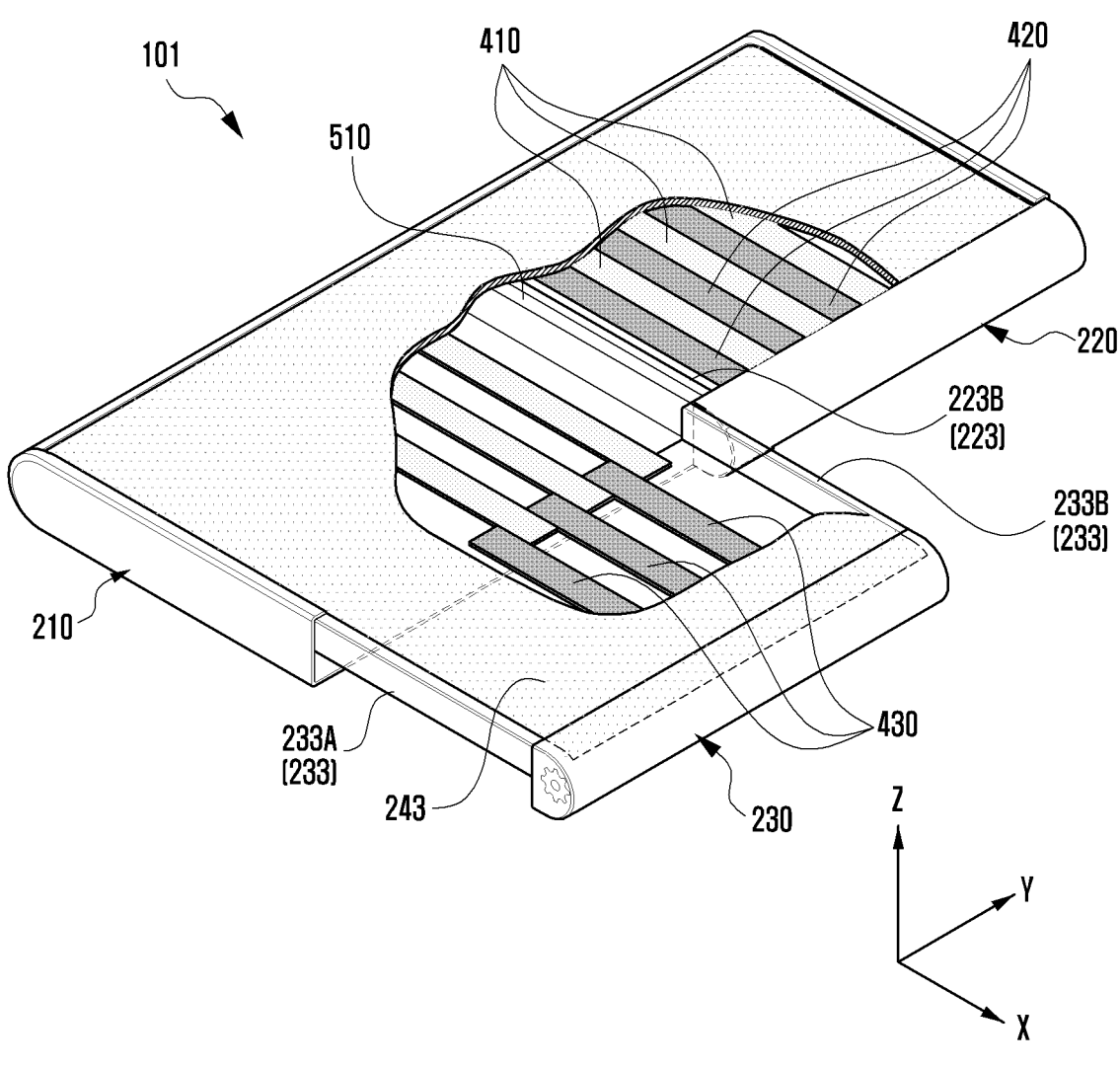

FIGS. 5D and 5E illustrate an electronic device in a closed state and in an open state, respectively, according to various embodiments of the disclosure.

According to an embodiment of the disclosure, FIGS. 5D and 5E schematically illustrate an example of a different structure for supporting sliding movements for a partially open state in an electronic device 101 according to an embodiment. For example, FIGS. 5D and 5E may illustrate an example for supporting sliding movements by a drawer structure (or a containing structure) in which a mechanical element for supporting the flexible display 240 of the electronic device 101 is divided into upper and lower parts. In an embodiment of the disclosure, FIGS. 5D and 5E schematically illustrate the drawer structure of the electronic device 101, other components may correspond to those described above with reference to the accompanying drawings, and detailed descriptions will be omitted herein.

Referring to FIGS. 5D and 5E, the electronic device 101 according to an embodiment may include the flexible display 240 including multiple displays distinguished independently (for example, the first display 241, the second display 242, and the third display 243 in FIGS. 4A, 4B, 5A, 5B, and 5C). According to an embodiment of the disclosure, the electronic device 101 may support at least some displays (for example, the second display 242 and the third display 243) among the multiple displays 241, 242, and 243 such that they can be used after being partially expanded (or split/expanded) according to a designated display operating scheme. For example, FIG. 5D may illustrate an example of a fully closed state of the electronic device 101 (for example, a state in which the second display 242 and the third display 243 are reduced), and FIG. 5E may illustrate an example of a partially open state of the electronic device 101 (for example, a state in which the third display 243 is expanded).

In an embodiment of the disclosure, the second display 242 may move out of the second housing 220 or move into the second housing 220 according to the direction of sliding of the second housing 220. In an embodiment of the disclosure, the third display 243 may move out of the third housing 230 or move into the third housing 230 according to the direction of sliding of the third housing 230.

According to an embodiment of the disclosure, the electronic device 101 may include the first housing 210, the second housing 220, and the third housing 230.

The first housing 210 may be disposed so as to form the rear and lateral surfaces of the electronic device 101. The second housing 220 may be positioned on one side of the first housing 210 (for example, on the right side of the first display 241) and above the third housing 230. The third housing 230 may be positioned on one side of the first housing 210 (for example, on the right side of the first display 241) and below the second housing 220. Referring to FIGS. 5D and 5E, the second housing 220 and the third housing 230 may be formed (or disposed) in a structure in which they are distinguished as an upper drawer and a lower drawer, respectively.

The second housing 220 may include a first sliding portion 223. The first sliding portion 223 may include sliding portions on a lateral surface of the second housing 220 and on another lateral surface facing the former lateral surface, respectively, thereby supporting sliding movements of the second housing 220 through the sliding portions on both lateral surfaces. The second housing 220 may slide by means of an operation of the first sliding portion 223, thereby varying the distance from the first housing 210 (or the first display 241). The first sliding portion 223 may include a pair of first sliders 223A and 223B.

The third housing 230 may include a second sliding portion 233. The second sliding portion 233 may include sliding portions on a lateral surface of the third housing 230 and on another lateral surface facing the former lateral surface, respectively, thereby supporting sliding movements of the third housing 230 through the sliding portions on both lateral surfaces. The third housing 230 may slide by means of an operation of the second sliding portion 233, thereby varying the distance from the first housing 210 (or the first display 241). The second sliding portion 233 may include a pair of second sliders 233A and 233B.

The second housing 220 and the third housing 230 may be positioned on a straight line along the Y-axis direction (for example, in the vertical direction or in the longitudinal direction of the first display 241) in a closed state of the electronic device 101 or in a fully open state of the electronic device 101. The pair of first sliders 223A and 223B may have rod shapes, may be positioned parallel to the X-direction, and may face each other along the Y-direction. The pair of second sliders 233A and 233B may have rod shapes, may be positioned parallel to the X-direction, and may face each other along the Y-direction. The first sliders 223A and 223B and the second sliders 233A and 233B may be positioned parallel to each other along the X-axis, and one of the first sliders 223A and 223B (for example, the slider 223B positioned inside), and one of the second sliders 233A and 233B (for example, the slider 233B positioned inside) may be adjacent to and face each other along the Y-direction. The slider 223B positioned inside among the first sliders 223A and 223B and the slider 233B positioned inside among the second sliders 233A and 233B may face each other through adjacent surfaces (for example, a first adjacent surface of the slider 223B and a second adjacent surface of the slider 233B), respectively, and may be spaced apart by a predetermined interval, thereby forming an inner space.

Referring to FIGS. 5D and 5E, the electronic device 101 may include a rail support portion 510 for supporting sliding movements of the first sliding portion 223 (for example, the slider 223B) of the second housing 220 and the second sliding portion 233 (for example, the slider 233B) of the third housing 230 in a closed state of the electronic device 101 or in a partially open state of the electronic device 101. For example, the rail support portion 510 may be installed to extend in the X-direction in a position in which the second display 242 and the third display 243 are distinguished (for example, in the middle position with reference to the Y-direction in the closed state) under the first display 241.

The rail support portion 510 may be installed between inner walls of the first sliding portion 223 (for example, the slider 223B) and the second sliding portion 233 (for example, the slider 233B), which face each other (for example, installed in an inner space formed between the inner walls spaced apart by a predetermined interval), so as to extend by a predetermined length in the X-direction. In an embodiment of the disclosure, the rail support portion 510 may enable the electronic device 101 to form upper and lower structures separate from each other (for example, respective drawer structures), and the separate structures may support sliding (or rolling) of the second display 242 and/or the third display 243.

According to an embodiment of the disclosure, the separate structures may include at least one electric element (for example, semiconductor) 520 and 530 related to driving of the electronic device 101, respectively. For example, the separate structures may have display driving circuits (for example, circuits for controlling the flexible display 240) related to driving of the second display 242 and the third display 243 fixed/installed through a designated circuit board (not illustrated).

In an embodiment of the disclosure, the electronic device 101 may have at least one electric element 520 and 530 disposed in upper and lower drawer structures (separate from each other), respectively, based on the rail support portion 510, and a connecting portion 540 (for example, an FPCB) for connecting the separate electric elements 520 and 530 may electrically connect the same.

Figure 6B:
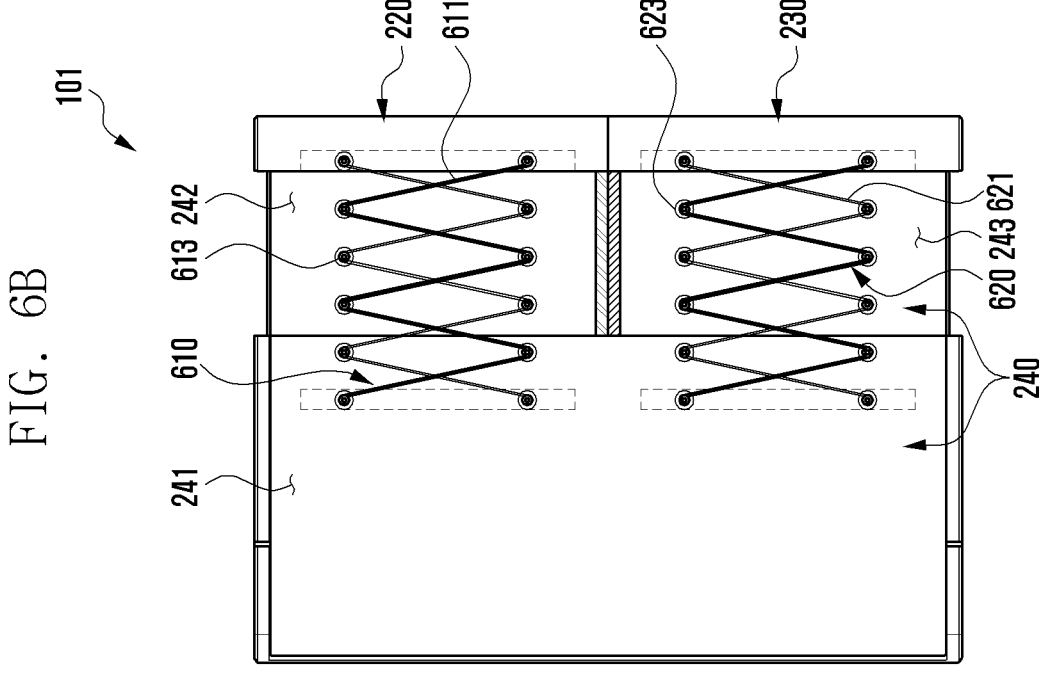
FIGS. 6A and 6B illustrate an electronic device in a closed state and in an open state, respectively, according to various embodiments of the disclosure.
Figure 6A:
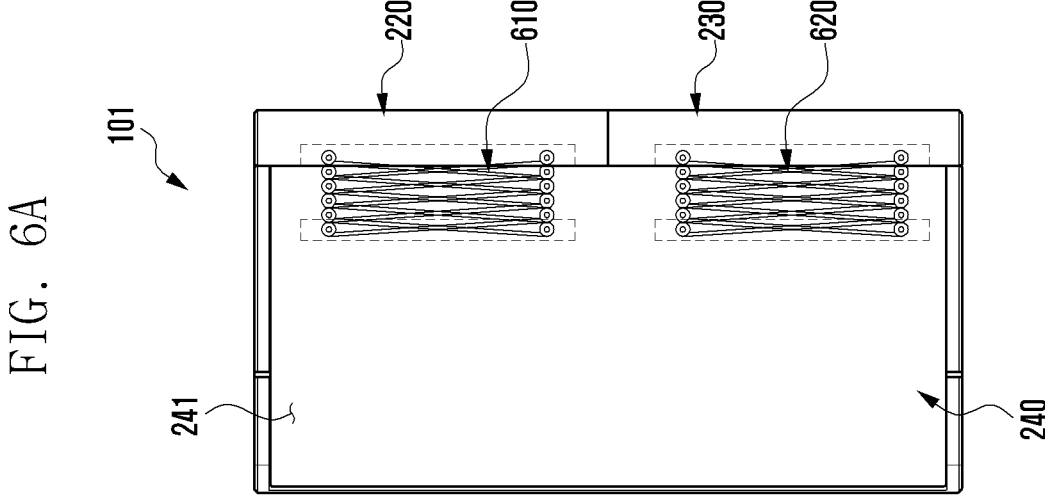

FIGS. 6A and 6B illustrate an electronic device in a closed state and in an open state, respectively, according to various embodiments of the disclosure.

According to an embodiment of the disclosure, FIGS. 6A and 6B schematically illustrate another example of a sliding structure for supporting sliding movements for a partially open state in an electronic device 101 according to an embodiment. For example, FIGS. 4A, 4B, and 5A to 5C may illustrate an example in which sliding movements are supported by a rail structure, and FIGS. 6A and 6B may illustrate an example in which sliding movements are supported by a link structure. In an embodiment of the disclosure, FIGS. 6A and 6B schematically illustrate a link structure for supporting sliding movements, other components may correspond to those described above with reference to the accompanying drawings, and detailed descriptions will be omitted herein.

Referring to FIGS. 6A and 6B, the electronic device 101 may include the flexible display 240 (for example, the first display 241, the second display 242, and the third display 243), the second housing 220 configured such that a first portion of one end of the flexible display 240 can be partially rolled and contained therein or unfolded (for example, having a rolling structure of the second display 242), the third housing 230 configured such that a second portion of one end of the flexible display 240 can be partially rolled and contained therein or unfolded (for example, having a rolling structure of the third display 243), a first link portion 610 configured to operate such that the second housing 220 slides in a designated direction (for example, in the X-direction), thereby partially unfolding or folding the screen of the flexible display 240, and a second link portion 620 configured to operate such that the third housing 230 slides in a designated direction (for example, in the X-direction), thereby partially unfolding or folding the screen of the flexible display 240.

The first link portion 610 may include a first link 611 supported by a support portion 630 vertically installed at the back surface center of the flexible display 240 (for example, on the back surface at an end of the first display 241) such that the first link 611 can be hinged from the support portion 630, and a first hinge shaft 613 for hinging of the first link 611. The first link portion 610 may be hinged around the first hinge shaft 613. According to some embodiments of the disclosure, the first link portion 610 may include a first driving motor (not illustrated) for driving the first link 611 to be hinged.

The second link portion 620 may include a second link 621 supported by a support portion 630 vertically installed at the back surface center of the flexible display 240 (for example, on the back surface at an end of the first display 241) such that the second link 621 can be hinged from the support portion 630, and a second hinge shaft 623 for hinging of the second link 621. The second link portion 620 may be hinged around the second hinge shaft 623. According to some embodiments of the disclosure, the second link portion 620 may include a second driving motor (not illustrated) for driving the second link 621 to be hinged.

One end of the first link portion 610 may be fixed to a support portion 630 positioned on the first housing 210, and the other end thereof may be fixed/coupled to a support portion (not illustrated) positioned on the second housing 220. One end of the second link portion 620 may be fixed to a support portion 630 positioned on the first housing 210, and the other end thereof may be fixed/coupled to a support portion (not illustrated) positioned on the third housing 230. One end of the first link portion 610 and the second link portion 620 may be fixed to the support portion 630, and the other end thereof may move leftwards/rightwards in a designated direction (for example, in the X-direction).

According to an embodiment of the disclosure, the electronic device 101 may slide as the first link portion 610 and/or the second link portion 620 are hinged such that the flexible display 240 (for example, the second display 242 and/or the third display 243) is expanded or reduced, and may switch to an open state or a partially open state of the electronic device 101.

For example, the first link portion 610 and/or the second link portion 620 may be unfolded from the support portion 630 toward one side, or folded toward the support portion 630.

FIGS. 7A, 7B, 7C, and 7D are projection views illustrating examples of a rail structure configured to support sliding movements in an electronic device, respectively, according to various embodiments of the disclosure. FIG. 8A is a schematic view of a section taken along line D-D' in FIG. 7A according to an embodiment of the disclosure. FIG. 8B is a coupled perspective view of a guide rail in FIG. 8A in a coupled state according to an embodiment of the disclosure. FIG. 8C is front and lateral views of a guide rail in FIG. 8A in a separated state according to an embodiment of the disclosure.

Figure 7A:
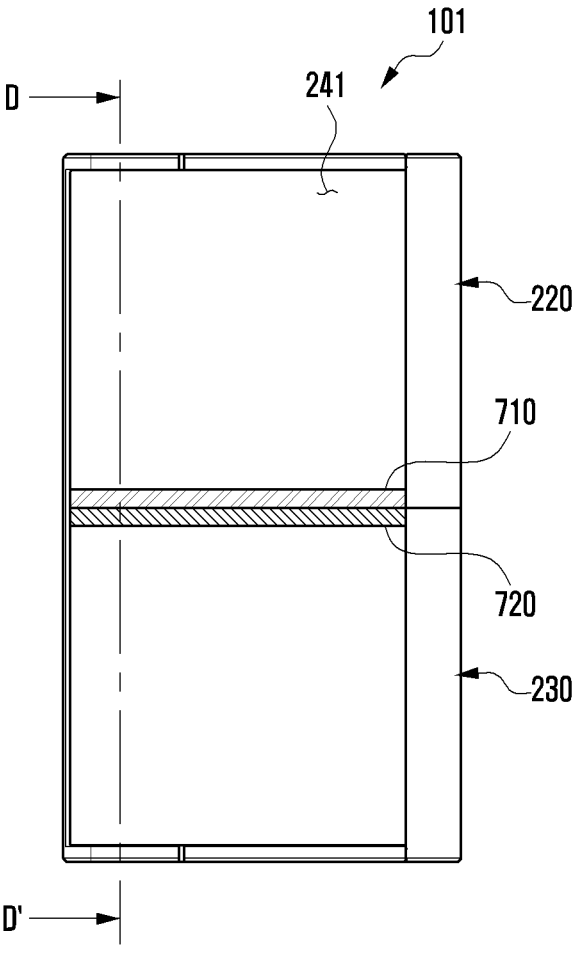
FIGS. 7A, 7B, 7C, and 7D are projection views illustrating a rail structure configured to support sliding movements in an electronic device, respectively, according to various embodiments of the disclosure.
Figure 7B:
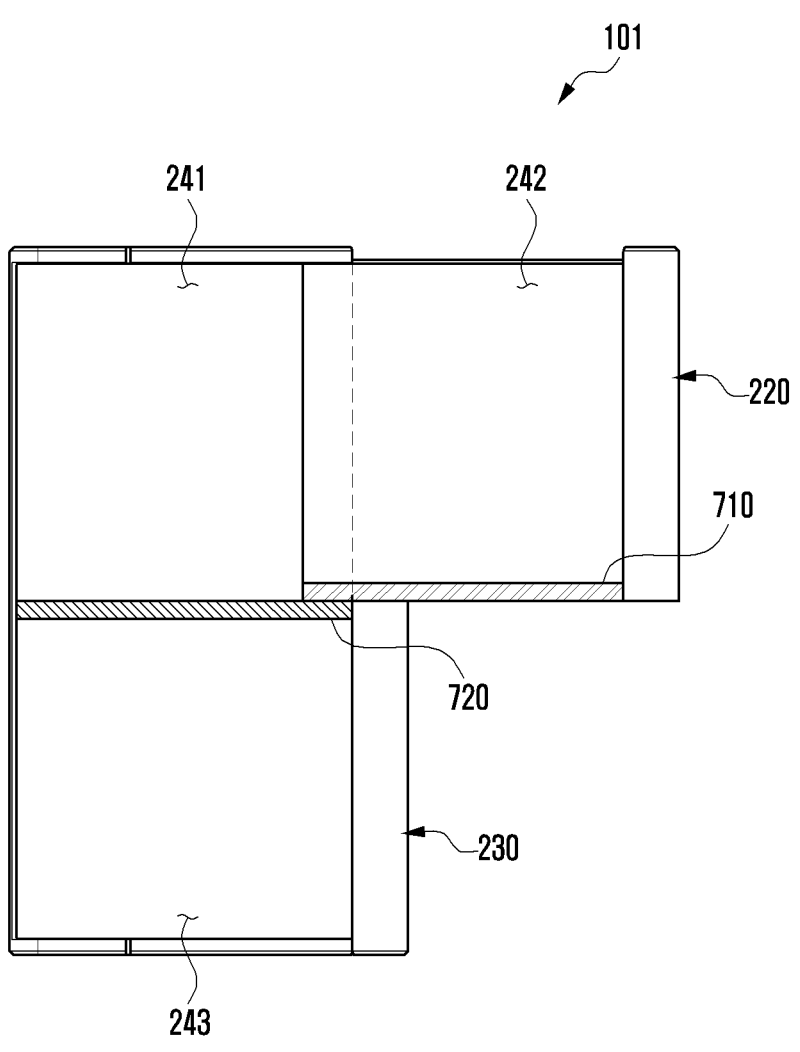
Figure 7C:
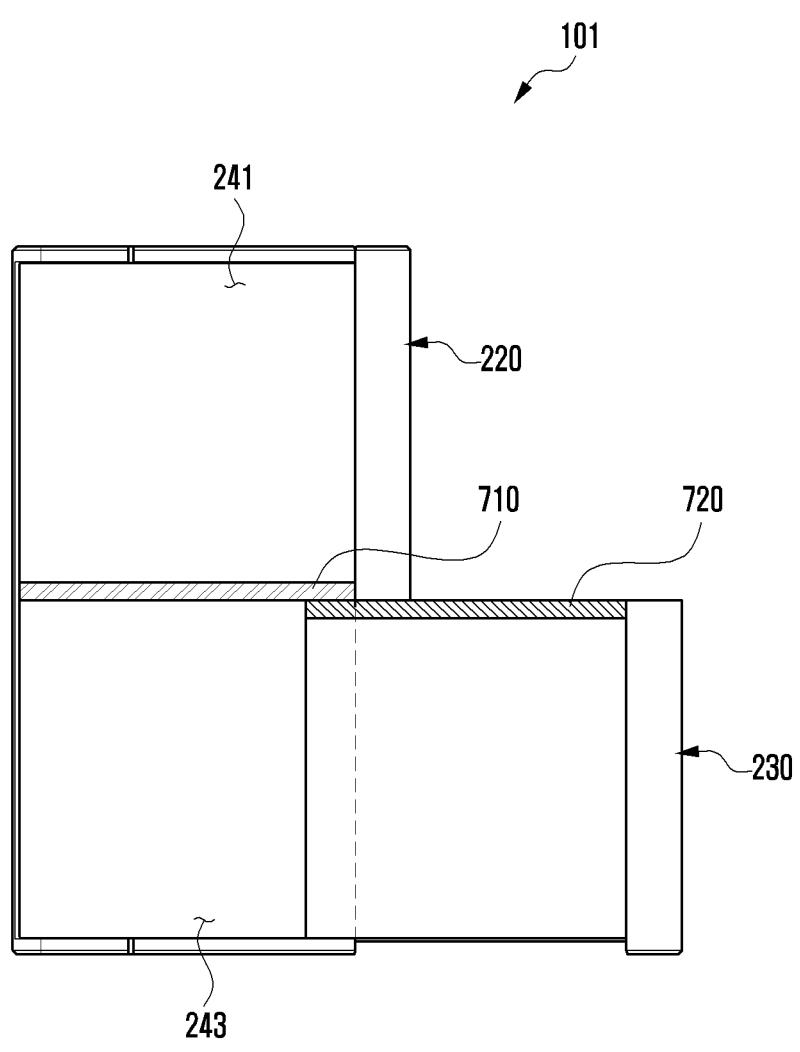
Figure 7D:
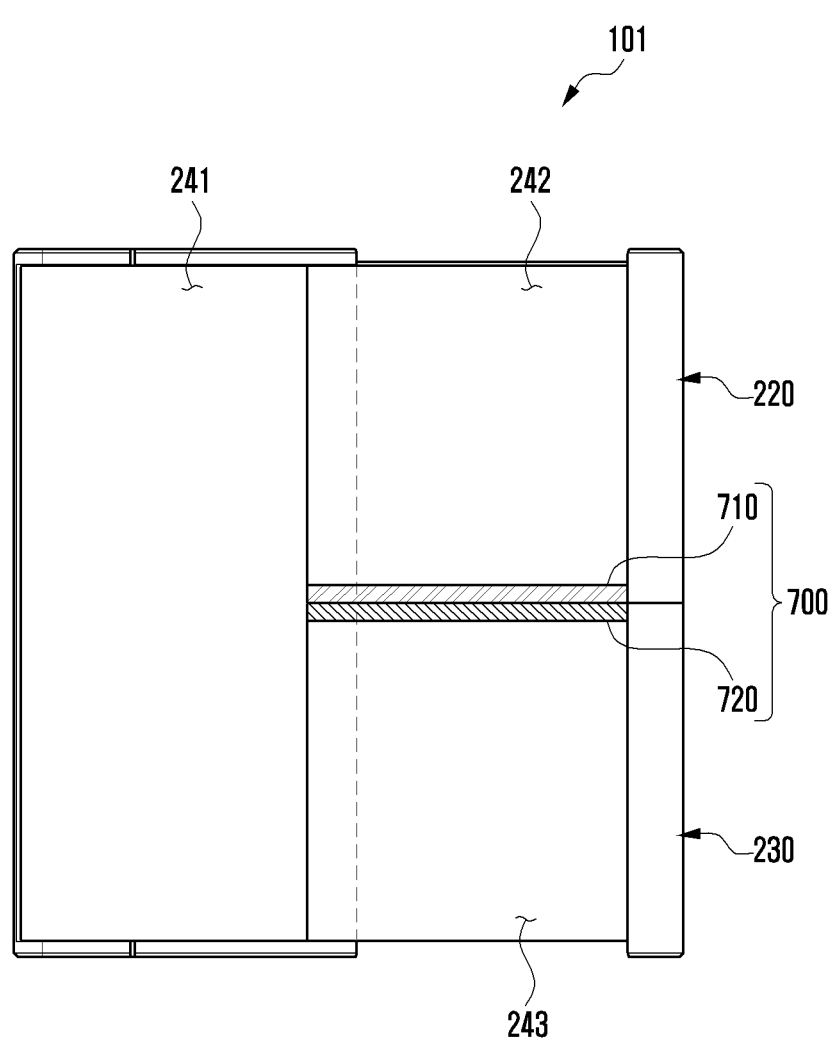
Figure 8A:
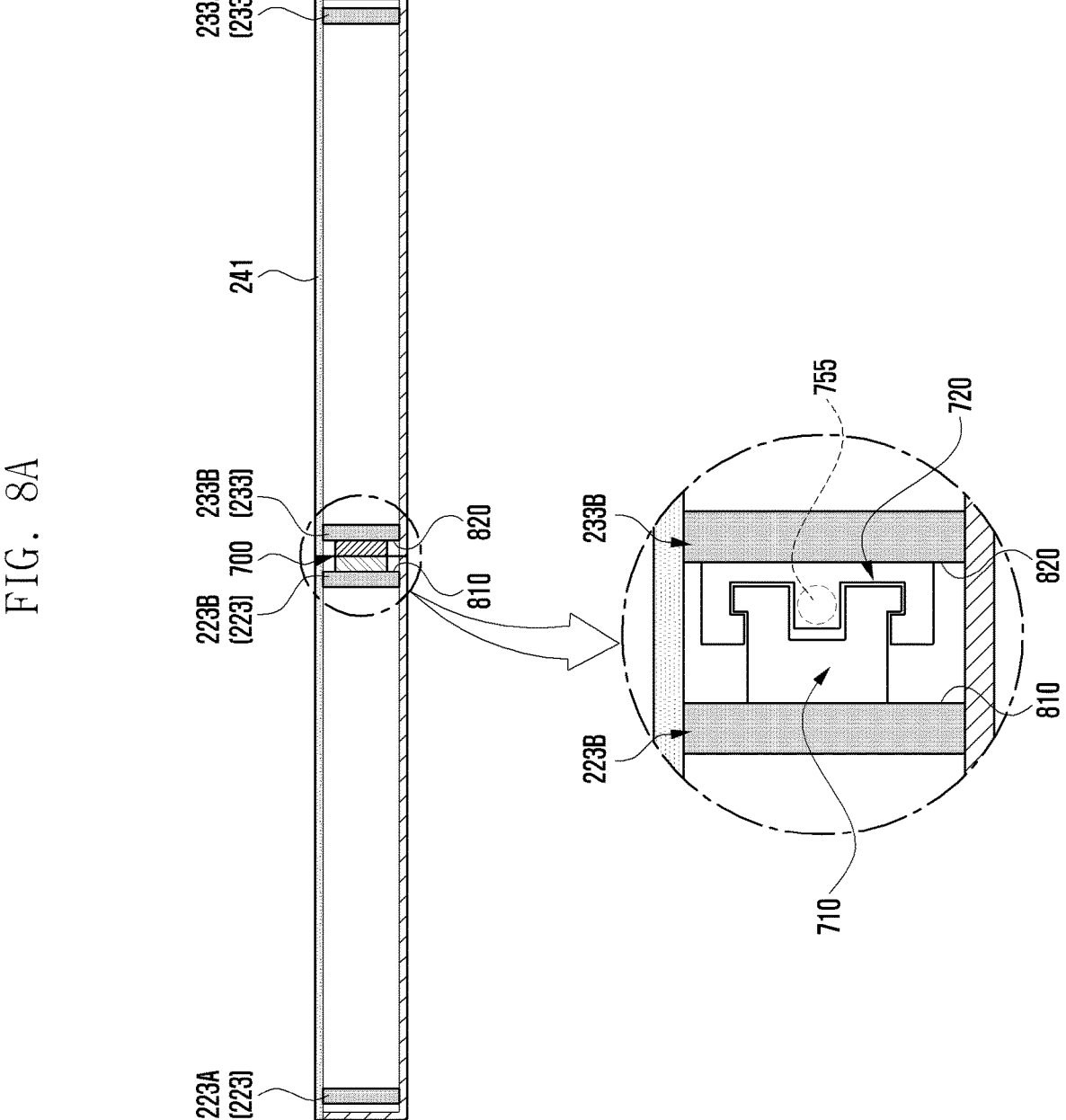
FIG. 8A is a schematic view of a section taken along line D-D' in FIG. 7A according to an embodiment of the disclosure.
Figure 8B:
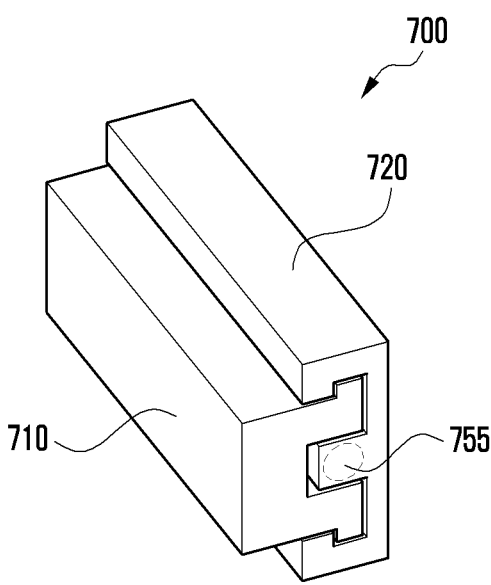
FIG. 8B is a coupled perspective view of a guide rail in FIG. 8A in a coupled state according to an embodiment of the disclosure.
Figure 8B:
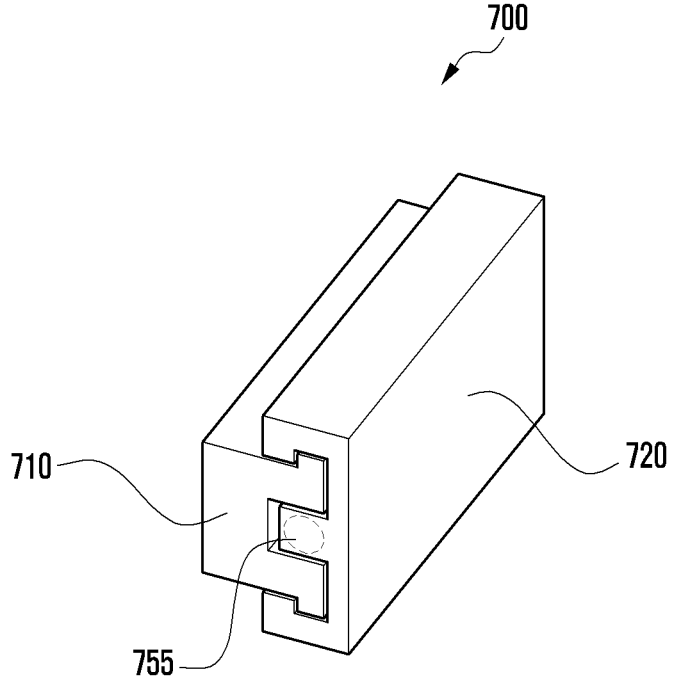
Figure 8C:
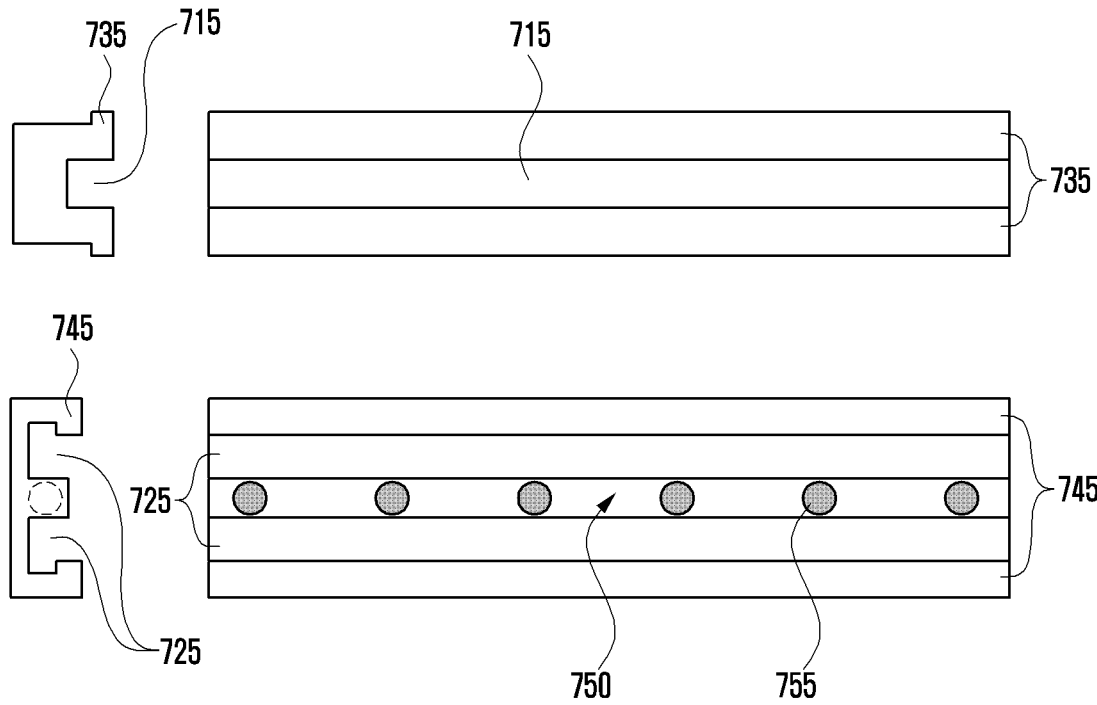
FIG. 8C is front and lateral views of a guide rail in FIG. 8A in a separated state according to an embodiment of the disclosure.

Referring to FIGS. 7A, 7B, 7C, and 7D, FIG. 7A may illustrate an example of a fully closed state of the electronic device 101 (for example, a state in which the second display 242 and the third display 243 are reduced), FIG. 7B may illustrate an example of a first partially open state of the electronic device 101 (for example, a state in which the second display 242 is expanded), FIG. 7C may illustrate an example of a second partially open state of the electronic device 101 (for example, a state in which the third display 243 is expanded), and FIG. 7D may illustrate an example of a fully open state of the electronic device 101 (for example, a state in which the second display 242 and the third display 243 are expanded).

In an embodiment of the disclosure, FIGS. 7A, 7B, 7C, and 7D schematically illustrate a guide rail 700 (or sliding rail) of a rail structure for supporting sliding movements between the second housing 220 and the third housing 230, other components (for example, the first housing 210, the second housing 220, the third housing 230, and the flexible display 240) may correspond to those described above with reference to the accompanying drawings, and detailed descriptions will be omitted herein.

Referring to FIGS. 7A, 7B, 7C, 7D, 8A, 8B, and 8C, the second housing 220 may include a pair of first sliders 223A and 223B fixed to both ends (for example, both ends of the first roller portion 221), and the third housing 230 may include a pair of second sliders 233A and 233B fixed to both ends (for example, both ends of the second roller portion 231).

One of the first sliders 223A and 223B (for example, the slider 223B positioned inside) (hereinafter, referred to as a "first inner slider 223B"), and one of the second sliders 233A and 233B (for example, the slider 233B positioned inside) (hereinafter, referred to as a "second inner slider 233B") may be adjacent to and face each other along the Y-direction. The first inner slider 223B among the first sliders 223A and 223B and the second inner slider 233B among the second sliders 233A and 233B may face each other through adjacent surfaces (for example, a first adjacent surface 810 of the first inner slider 223B and a second adjacent surface 820 of the second inner slider 233B), respectively, and may be spaced apart by a predetermined interval, thereby forming an inner space.

Each of the first inner slider 223B and the second inner slider 233B may include the guide rail 700 (for example, a first guide rail 710 and a second guide rail 720) for supporting sliding movements of the second housing 220 and the third housing 230. According to an embodiment of the disclosure, the first inner slider 223B may have a first guide rail 710 attached (or coupled) to the first adjacent surface 810 (for example, inner surface), and the second inner slider 233B may have a second guide rail 720 attached (or coupled) to the second adjacent surface 820 (for example, inner surface). The first guide rail 710 and the second guide rail 720 may be fixed to the first adjacent surface 810 of the first inner slider 223B and to the second adjacent surface 820 of the second inner slider 233B, respectively, by an attaching or coupling structure, depending on fixing members.

In an embodiment of the disclosure, at least some surfaces of the first guide rail 710 and the second guide rail 720 may engage with each other by a protrusion-groove coupling structure. According to an embodiment of the disclosure, the first guide rail 710 and the second guide rail 720 may have a rail structure made of a sliding rail for inducing mutual sliding actions (or movements) such that, through inner surfaces of the first inner slider 223B and the second inner slider 233B, the second housing 220 and the third housing 230 can slide inwards and outwards.

The first guide rail 710 and the second guide rail 720 may be installed on the first adjacent surface 810 and the second adjacent surface 820 of the first inner slider 223B and the second inner slider 233B, which face each other, and each may extend in the horizontal direction by a predetermined length. In an embodiment of the disclosure, the first guide rail 710 and the second guide rail 720 may mutually operate as a fixed rail (for example, a bracket) or a movable rail according to a partially open state of the electronic device 101.

For example, in the case of a first partially open state resulting from a sliding movement of the second housing 220 as in the example in FIG. 7B, the first guide rail 710 may be a movable rail with regard to the second guide rail 720, and the second guide rail 720 may be a fixed rail with regard to the first guide rail 710. As another example, in the case of a second partially open state resulting from a sliding movement of the third housing 230 as in the example in FIG. 7C, the first guide rail 710 may be a fixed rail with regard to the second guide rail 720, and the second guide rail 720 may be a movable rail with regard to the first guide rail 710.

According to an embodiment of the disclosure, the first guide rail 710 may be an upper bracket included in the second housing 220, and may interact with the second guide rail 720 of the third housing 230, thereby supporting sliding movements of the second housing 220. According to an embodiment of the disclosure, the second guide rail 720 may be a lower bracket included in the third housing 230, and may interact with the first guide rail 710 of the second housing 220, thereby supporting sliding movements of the third housing 230.

According to an embodiment of the disclosure, the first guide rail 710 and the second guide rail 720 may be fitted to each other instead of being fixed by fastening members. For example, the first guide rail 710 may be configured in a U-shape having a single guide groove (for example, a first guide groove 715), and the second guide rail 720 may be configured in an E-shape having two guide grooves (for example, second guide grooves 725) to which the first guide groove 715 is fitted, thereby being coupled to each other to be able to slide.

As an example, the first guide rail 710 may include a first guide groove 715 and a first guide plate 735, and the second guide rail 720 may include a second guide groove 725, a second guide plate 745, and a third guide plate 750. The first guide plate 735 of the first guide rail 710 may be formed so as to be inserted into the second guide groove 725 while surrounding the outer peripheral surface of the third guide plate 750. The second guide plate 745 of the second guide rail 720 may be formed so as to be fitted while surrounding the outer peripheral surface of the first guide plate 735, and the third guide plate 750 may be formed so as to be inserted into the first guide groove 715 of the first guide rail 710.

According to an embodiment of the disclosure, the first guide rail 710 and/or the second guide rail 720 may include a movable member (for example, a ball) for supporting smooth movements (for example, sliding movements) between the second housing 220 and the third housing 230. According to an embodiment of the disclosure, as illustrated, the third guide plate 750 of the second guide rail 720 may include balls 755 at a predetermined interval in the longitudinal direction such that the coefficient of friction between the first guide rail 710 and the second guide rail 720 is reduced, thereby facilitating sliding movements of the first guide rail 710 and the second guide rail 720.

Figure 9:
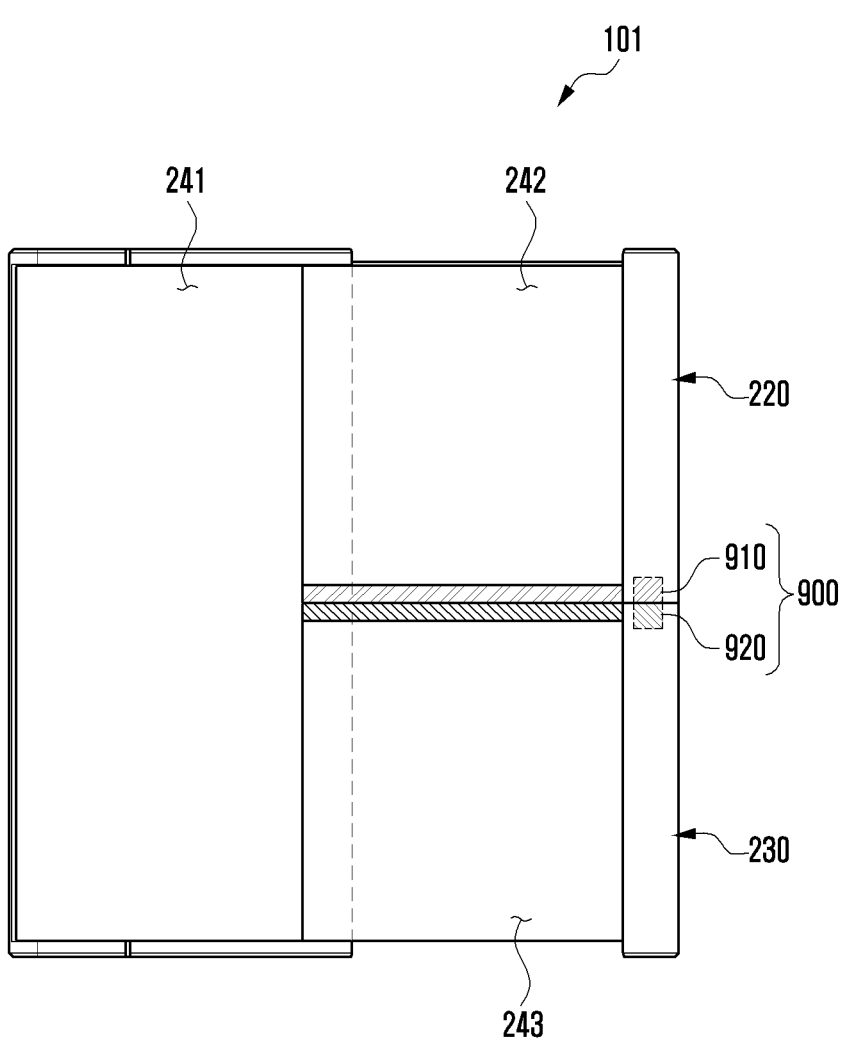
FIG. 9 is a schematic view of a locking structure configured to retain a housing in an electronic device according to an embodiment of the disclosure.

FIG. 9 is a schematic view of a locking structure configured to retain a housing in an electronic device according to an embodiment of the disclosure.

According to an embodiment of the disclosure, FIG. 9 illustrates a locking portion 900 configured such that, when the electronic device 101 is seen from the front, the second housing 220 and the third housing 230 are retained on a straight line in the vertical direction.

Referring to FIG. 9, the locking portion 900 may include, in the illustrated view, a first locking portion 910 formed on the lower side of the second housing 220 and a second locking portion 920 formed on the upper side of the third housing 230. According to an embodiment of the disclosure, the first locking portion 910 may be positioned in the lower inner space of the second housing 220, and the second locking portion 920 may be positioned in the upper inner space of the third housing 230. According to another embodiment of the disclosure, the first locking portion 910 may be formed on a part of the lower outer lateral surface of the second housing 220 (for example, in the illustrated view, formed along a part of the outer peripheral surface of the right surface of the second housing 220), and the second locking portion 920 may be formed on a part of the upper outer lateral surface of the third housing 230 (for example, in the illustrated view, formed along a part of the outer peripheral surface of the right surface of the third housing 230).

The locking portion 900 (for example, the first locking portion 910 and the second locking portion 920) can be implemented in various types, such as locking by a mechanical groove, locking by a separate locking button, and/or locking by a magnetic body.

According to an embodiment of the disclosure, the lower surface of the second housing 220 and the upper surface of the third housing 230 may face and abut each other, and the lower surface of the second housing 220 and the upper surface of the third housing 230 may be fixed while facing each other by the locking portion 900.

According to an embodiment of the disclosure, the locking portion 900 may provide a retaining force for retaining the position of the second housing 220 and the third housing 230. For example, in a partially open state of the electronic device 101, if the second housing 220 and/or the third housing 230 approach each other as a result of sliding movements thereof, the locking portion 900 may automatically retain them in designated positions (for example, positions on a straight line).

In an embodiment of the disclosure, if the locking portion 900 is implemented by a magnetic body, the magnetic body may be an electromagnet, and principles of the electromagnet may be used such that a current is supplied to support the retaining force of the locking portion 900, thereby supporting physical locking between the second housing 220 and the third housing 230, and the current is blocked to release the retaining force of the locking portion 900, thereby releasing physical locking between the second housing 220 and the third housing 230. For example, the first locking portion 910 and the second locking portion 920 may be retained through fastening resulting from different polarities.

The processor 120 may control retaining of the locking portion 900 (for example, supplying/blocking the current), or an on/off switch may be further included to control locking and unlocking of the locking portion 900.

In another embodiment of the disclosure, if the locking portion 900 is implemented mechanically, the first locking portion 910 may form a retaining groove, for example, and the second locking portion 920 may form a retaining protrusion (or an engaging clamp) inserted into the retaining groove. The retaining force of the locking portion 900 may be supported through fastening between the retaining groove and the retaining protrusion of the locking portion 900, thereby supporting physical locking of the second housing 220 and the third housing 230, and the retaining force of the locking portion 900 may be released by releasing the retaining protrusion from the retaining groove, thereby releasing the physical locking of the second housing 220 and the third housing 230. For example, the first locking portion 910 and the second locking portion 920 may be retained by a mechanical fastening structure. As an example, the forward or backward movement of the second locking portion 920 (for example, a retaining protrusion or an engaging clamp) may be controlled to control retaining from the first locking portion 910. The processor 120 may control retaining of the locking portion 900 of the electronic device 101 (for example, forward or backward movement), or an on/off switch may be further included to control locking and unlocking of the locking portion 900.

Figure 10:
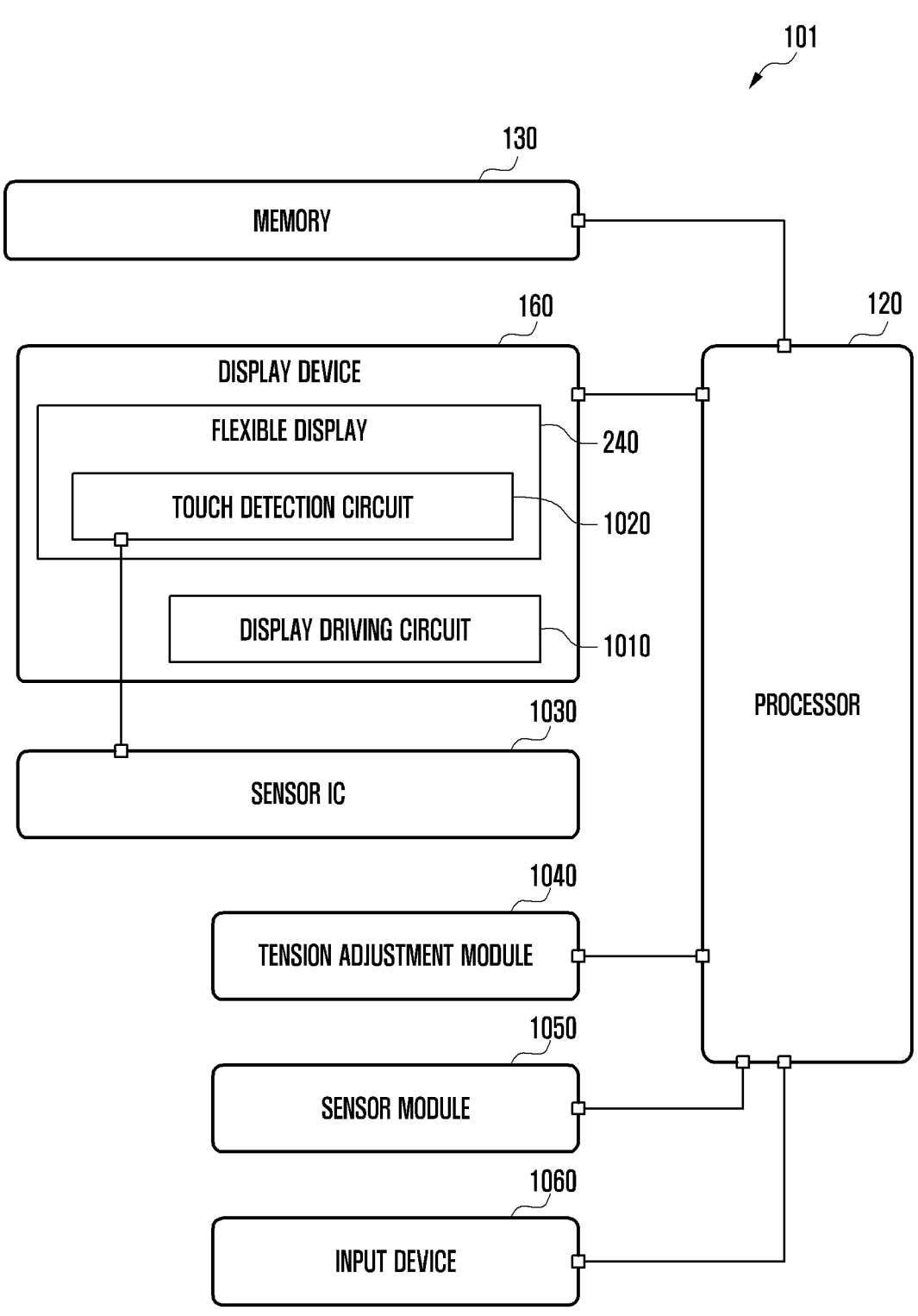
FIG. 10 is a block diagram of an electronic device according to an embodiment of the disclosure.
Figure 11A:
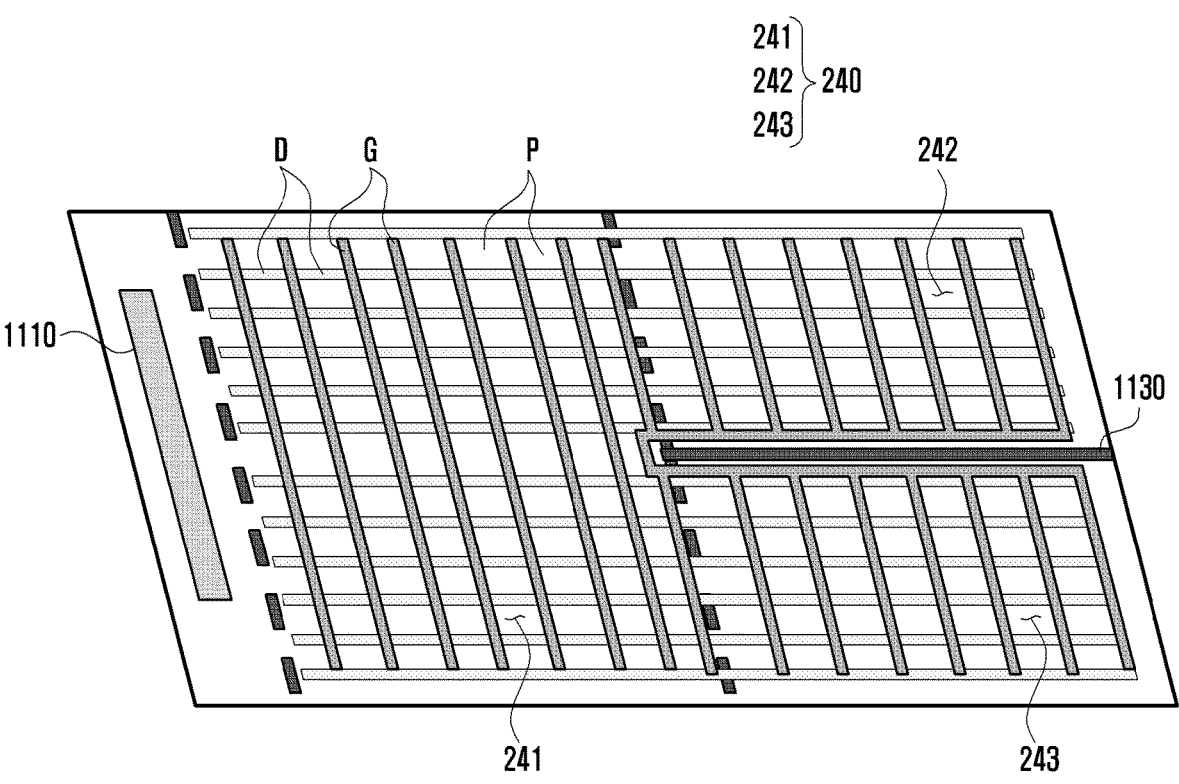
FIGS. 11A and 11B illustrate a circuit structure supporting operations of a display, respectively, according to various embodiments of the disclosure.
Figure 11B:
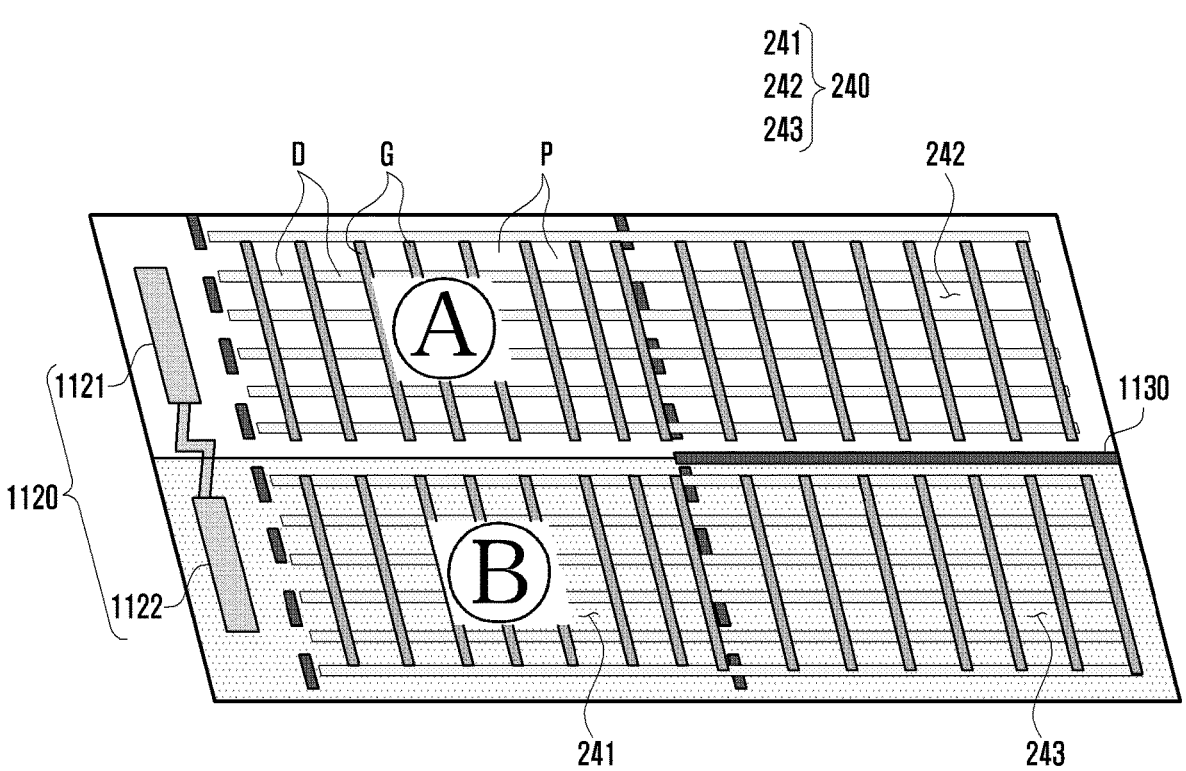

FIG. 10 is a block diagram of an electronic device according to an embodiment of the disclosure. FIGS. 11A and 11B illustrate a circuit structure supporting operations of a display, respectively, according to various embodiments of the disclosure.

Referring to FIG. 10, in an embodiment of the disclosure, the electronic device 101 (or electronic device 101) may include the processor 120 (for example, the processor 120 in FIG. 1), memory 130 (for example, the memory 130 in FIG. 1), a display device 160 (for example, the display device 160 in FIG. 1), a sensor integrated circuit (IC) 640, a tension adjustment module 650, a sensor module 660 (for example, the sensor module 176 in FIG. 1), and/or an input device 670 (for example, the input device 150 in FIG. 1). According to various embodiments of the disclosure, the electronic device 101 may be the electronic device in FIG. 1, may include at least some of the components of the electronic device in FIG. 1, or may further include other components.

According to an embodiment of the disclosure, the electronic device 101 may include the first housing 210, the second housing 220 coupled to the first housing 210 in a first state (for example, an open state) of the electronic device 101 and configured to slide in a designated direction from the first housing 220 in the first state, thereby supporting a second state in which the display of the electronic device 101 is first partially expanded (for example, a first partially open state), and the third housing 230 coupled to the first housing 210 in the first state of the electronic device 101 and configured to slide in a designated direction from the first housing 210 in the first state, thereby supporting a third state in which the display of the electronic device 101 is second partially expanded (for example, a second partially open state).

According to an embodiment of the disclosure, the display device 160 may include the flexible display 240 having a display area partially varied in conjunction with sliding movements of the second housing 220 and/or the third housing 230, and a display driving circuit 1010 for driving of the display device 160.

According to an embodiment of the disclosure, the flexible display 240 may include the first display 241 fixedly disposed on the first housing 210, a second display 242 mounted on the second housing 220 in a rollable manner, and the third display 243 mounted on the third housing 230 in a rollable manner. According to an embodiment of the disclosure, the first display 241 may be visually exposed in a first state of the electronic device 101, in a second state thereof, in a third state thereof, and in a fourth state (open state) thereof, which is a combination of the second and third states. According to an embodiment of the disclosure, the second display 242 may be visually exposed in the second and fourth states of the electronic device 101, and may partially expand the display area in response to a sliding movement of the second housing 220. According to an embodiment of the disclosure, the third display 243 may be visually exposed in the third and fourth states of the electronic device 101, and may partially expand the display area in response to a sliding movement of the third housing 230.

According to an embodiment of the disclosure, the flexible display 240 may be implemented such that a part thereof (for example, a bendable section) can be moved out of the inner space of the second housing 220 and/or the third housing 230 of the electronic device 101. For example, when the electronic device 101 switches from a closed state to an open state or to a partially open state, the bendable section of the flexible display 240 may move out of the inner space of the electronic device 101 as if sliding, thereby expanding the screen entirely or partially. When the electronic device 101 switches from an open state or a partially open state to a closed state, the bendable section of the flexible display 240 may move into the inner space of the electronic device 101 as if sliding, thereby reducing the screen entirely or partially.

According to an embodiment of the disclosure, the display driving circuit 1010 is a circuit for controlling the flexible display 240, and may include a display drive integrated circuit (DDI) or a DDI chip. According to an embodiment of the disclosure, the display driving circuit 1010 may include a touch DDI (TDDI) disposed in a chip-on-panel (COP) or chip-on-film (COF) type. The display driving circuit 1010 may receive a command signal from the processor 120 and control at least display of the flexible display 240 so as to display a corresponding screen. The display driving circuit 1010 may play the role of a signal passage between the flexible display 240 and the processor 120, thereby controlling pixels through thin-film transistors (TTFs) inside the flexible display 240. For example, the display driving circuit 1010 may have a function of turning pixels included in the flexible display 240 on or off, and may be electrically connected to gate electrodes of the TFTs.

The display driving circuit 1010 may have a function of adjusting the amount of red, green, and blue (RGB) signals to have a color different, and may be electrically connected to source electrodes of the TFTs. Each TFT may include a gate line (or a scan line) electrically connecting the display driving circuit 1010 and the gate electrode of the TFT, and a data line (or a source line) electrically connecting a display driving circuit 632 and the source electrode of the TFT. According to various embodiments of the disclosure, the display driving circuit 1010 may operate in response to a red, green, blue, white (RGBW) scheme in which white pixels are added to the RGB pixels.

According to various embodiments of the disclosure, the display driving circuit 1010 may be a DDI package. The DDI package may include a DDI (or a DDI chip), a timing controller (T-CON), graphic random access memory (RAM)

(GRAM), or power generating circuits. According to various embodiments of the disclosure, the GRAM may be omitted, or memory provided separately from the display driving circuit 1010 may be utilized.

The timing controller may convert a data signal input from the processor 120 into a signal needed by the DDI. The timing controller may play the role of adjusting input data information to a signal appropriate for the DDI's gate driver (or gate IC) and source driver (or source IC).

The graphic RAM may play the role of memory in which data to be input to the DDI's driver (or IC) is temporarily stored. The graphic RAM may store an input signal and again send the same to the DDI's driver, and may signal the signal while interacting with the timing controller. The power generating circuits may generate a voltage for driving the flexible display 240 and supply a necessary voltage to the DDI's gate driver and source driver.

According to an embodiment of the disclosure, one DDI or more may be included and implemented. For example, FIG. 11A may illustrate an example in which one DDI 1110 is implemented, and FIG. 11B may illustrate an example in which two DDIs 1120 (for example, a first DDI 1121 and a second DDI 1122) are implemented.

Referring to FIG. 11A, the electronic device 101 may include a single DDI 1110 connected to the processor 120 and the flexible display 240 (for example, the first display 241, the second display 242, the third display 243) operatively or electrically. For example, the first display 241, the second display 242, and the third display 243 may be connected to a single DDI 1110. Referring to FIG. 11B, the electronic device 101 may include two DDI 1120s (for example, a first DDI 1121 and a second DDI 1122) connected to the processor 120 and the flexible display 240 operatively or electrically. For example, a part (for example, part A) of the first display 241 and the second display 242 may be connected to the first DDI 1121, and another part (for example, part B) of the first display 241 and the third display 243 may be connected to the second DDI 1122. According to an embodiment of the disclosure, the first DDI 1121 and the second DDI 1122 may be connected to each other operatively or electrically.

Various embodiments are not limited thereto, and the electronic device 101 may include a DDI connected to the first display 241 operatively or electrically, a DDI connected to the second display 242 operatively or electrically, and a DDI connected to the third display 243 operatively or electrically.

According to an embodiment of the disclosure, the flexible display 240 may include multiple gate lines G for transferring a gate signal (or a scan signal), multiple data lines D for transferring a data signal in response to the gate signal from the gate lines G, and multiple pixels P defined by the gate line G and the data line D. According to an embodiment of the disclosure, FIGS. 11A and 11B illustrate gate lines G extending in a first direction (for example, Y-direction) and data lines D extending in a second direction (for example, X-direction) intersecting with the first direction, but are not limited thereto. For example, the direction of extension of the gate lines G and that of the data lines D may be switched. The DDIs 1110 and 1120 may have a gate driver configured to drive multiple gate lines G and may have a source driver (or a data driver) configured to drive multiple data lines D.

FIG. 11A may illustrate a single DDI 1110 is implemented. If a single DDI 1110 is configured, some of gate lines G in split regions (for example, the second display 242 and the third display 243) of the flexible display 240 may extend to a non-split region (for example, the first display 241), and gate lines G of the second display 242 and the third display 243 may be connected so as to bypass and surround a cutting region 1130 between the second display 242 and the third display 243.

FIG. 11B may illustrate two DDIs 1120 (for example, a first DDI 1121 and a second DDI 1122 are implemented. If two DDIs 1120 are configured, the region of the flexible display 240 may be divided in the direction of extension of the cutting region 1130 (for example, divided into upper and lower regions), and gate lines G may be separately formed in respective divided regions. In an embodiment of the disclosure, the first DDI 1121 and the second DDI 1122 may be connected operatively or electrically so as to share multiple control signals (for example, a vertical synchronization signal (VSYNC), a horizontal synchronization signal (HSYNC), a clock signal (DCLK), and/or a data enable signal (DE)), thereby synchronizing with each other.

Referring back to FIG. 10, the flexible display 240 may include a touch detection circuit 1020 (or a touch sensor). The touch detection circuit 1020 may include, for example, a transmitter (Tx) including multiple first electrode lines (or multiple driving electrodes), and a receiver (Rx) including multiple second electrode lines (or multiple receiving electrodes).

According to an embodiment of the disclosure, a sensor integrated circuit (IC) 1030 may supply a current (for example, alternating current (AC)) to the touch detection circuit 1020, and an electric field may be formed between the transmitter and receiver of the touch detection circuit 1020. The sensor IC 1030 may convert an analog signal acquired through the touch detection circuit 1020 into a digital signal. For example, if a finger touches the screen or is within a critical distance from the screen, the electric field is changed, thereby causing a change in capacitance (or voltage drop). If the change in capacitance is equal to/higher than a threshold value, the sensor IC 1030 may generate an electric signal regarding coordinates on the screen as an effective touch input or hovering input and may output the same to the processor 120. The processor 120 may recognize the coordinates on the screen, based on the electric signal received from the sensor IC 1030.

According to an embodiment of the disclosure, the sensor IC 1030 may include a touch controller integrated circuit (IC). The touch controller IC may perform various functions, such as noise filtering, noise removal, or detection data extraction in connection with the touch detection circuit 1020. According to an embodiment of the disclosure, the touch controller IC may include various circuits, such as an analog-digital converter (ADC), a digital signal processor (DSP), and/or a micro control unit (MCU).

According to an embodiment of the disclosure, the processor 120 may include, for example, a micro control unit (MCU), and may drive an operating system (OS) or an embedded software program so as to control multiple hardware components connected to the processor 120. The processor 120 may control multiple hardware components according to instructions (for example, the program 140 in FIG. 1) stored in the memory 130, for example.

According to an embodiment of the disclosure, in an open state or a partially open state of the display device 160, the processor 120 may display an application execution screen so as to correspond to the amount of outward movement of the display device 160. According to an embodiment of the disclosure, the processor 120 may detect a change in state of the display device 160 and may determine an exposed screen region, based on detecting the change in state of the display device 160. According to an embodiment of the disclosure, the processor 120 may control the display device 160 so as to construct and display an execution screen based on the exposed screen region.

According to an embodiment of the disclosure, the processor 120 may control the display device 160 so as to display a screen through a fixed region of the first display 241 in a first state (for example, a closed state).

According to an embodiment of the disclosure, if the second display 242 slides (rolls) as a result of a sliding movement of the second housing 220 such that the electronic device 101 reaches a first partially open second state (for example, a first partially open state), the processor 120 may control the display device 160 so as to display a screen while interworking with the fixed region of the first display 241 and the expanded region the second display 242 in the second state, or to display a screen through the expanded region independently of the fixed region.

According to an embodiment of the disclosure, if the third display 243 slides (rolls) as a result of a sliding movement of the third housing 230 such that the electronic device 101 reaches a second partially open third state (for example, a second partially open state), the processor 120 may control the display device 160 so as to display a screen while interworking with the fixed region of the first display 141 and the expanded region of the second display 242 in the third state, or to display a screen through the expanded region independently of the fixed region.

According to an embodiment of the disclosure, if the second display 242 and the third display 243 slide (roll) as a result of a sliding movement of the second housing 220 and the third housing 230 such that the electronic device 101 reaches a fourth state (for example, an open state or a fully open state) which is a combination of the second state and the third state, the processor 120 may control the display device 160 so as to display a full screen while interworking with the fixed region of the first display 241, the expanded region of the second display 242, and the expanded region of the third display 243 in the fourth state, or to display a split screen through distinction of a fixed region and an expanded region.

According to an embodiment of the disclosure, the processor 120 may display a first execution screen based on the first display 241 and, while displaying the first execution screen, may detect a change in state of at least one of the second display 242 and the third display 243 (detect sliding thereof). According to an embodiment of the disclosure, based on detecting a change in state, the processor 120 may identify at least one display (for example, the second display 242 and/or the third display 243), a change in state thereof is detected.

According to an embodiment of the disclosure, based on identifying a change in state of the second display 242, the processor 120 may maintain a first execution screen displayed through the first display 241 and may display a second execution screen through the second display 242. According to another embodiment of the disclosure, based on identifying a change in state of the second display 242, the processor 120 may control the display device 160 so as to change (for example, expand) and display a first execution screen so as to correspond to interworking between a first portion of the first display 241 (for example, a portion extending with the second display 242, a change in state of which has been detected, for example, the upper region of the first display 241) and the second display 242, and to display a second execution screen through a second portion of the first display 241 (for example, a portion corresponding to the position of the third display 243 having no state change, for example, the lower region of the first display 241).

According to an embodiment of the disclosure, based on identifying a change in state of the third display 243, the processor 120 may maintain a first execution screen displayed through the first display 241 and may display a second execution screen through the third display 243. According to another embodiment of the disclosure, based on identifying a change in state of the third display 243, the processor 120 may control the display device 160 so as to change and display a first execution screen so as to correspond to interworking between a second portion of the first display 241 (for example, a portion extending with the third display 243, a change in state of which has been detected, for example, the lower region of the first display 241) and the third display 243, and to display a second execution screen through a first portion of the first display 241 (for example, a portion corresponding to the position of the second display 242 having no state change, for example, the upper region of the first display 241).

According to an embodiment of the disclosure, at least based on the type of an executed application and/or the configuration of the electronic device 101 according to user designation, the processor 120 may control the display device 160 so as to differently operate screen display according to a closed state, a partially open state, and an open state.

A tension adjustment module 1040 may be included in or connected to a tension structure configured to provide a tension acting on the flexible display 240, for example. The tension adjustment module 1040 may adjust the tension acting on the flexible display 240 according to a control signal from the processor 120.

A sensor module 1050 (for example, the sensor module 176 in FIG. 1) may measure a physical quantity, for example, or detecting the operating state of the electronic device 101, thereby generating an electric signal or a data value corresponding thereto. According to an embodiment of the disclosure, the sensor module 1050 may include, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. According to an embodiment of the disclosure, the sensor module 1050 may further include a control circuit for controlling at least one sensor included therein.

According to an embodiment of the disclosure, the sensor module 1050 may be a device configured to detect the angle of inclination of the electronic device 101 with regard to the ground surface by using detection data acquired from at least one of multiple sensors and/or the direction in which the electronic device 101 faces in a three-dimensional coordinate system. However, this is not limitative, and various sensors capable of obtaining information (for example, azimuth) regarding the angle of inclination of the electronic device 101 may be used. For example, the acceleration sensor may detect information regarding a linear motion of the electronic device 101 and/or acceleration of the electronic device 101 with regard to three axes. The gyro sensor may detect information related to rotation of the electronic device 101, and a geomagnetic sensor may detect information regarding the direction in which the electronic device 101 faces within an absolute coordinate system.

According to an embodiment of the disclosure, the processor 120 may use 9-axis motion data acquired by using the gyro sensor and the geomagnetic sensor. For example, the processor 120 may form a virtual coordinate space based on an azimuth (for example, yaw, pitch, and/or roll values) measured from 9-axis motion data, may identify a region of the virtual coordinate space as a landscape range, and may identify another region thereof as a portrait range.

An input device 1060 (for example, the input device 150 in FIG. 1) may receive a user input, for example. The input device 1060 may include a key input device, for example. According to an embodiment of the disclosure, the key input device may include various types of keys, such as physical keys, capacitive keys, or optical keys. The input device 670 may include various types of other user interfaces.

According to an embodiment of the disclosure, the memory 130 may store various pieces of configuration information and/or instructions related to operating the display device 160 according to a closed state, a partially open state, and an open state of the electronic device 101. As an example, the memory 130 may include at least one configuration for differently operating screen display according to a closed state, a partially open state, and an open state. As an example, the memory 130 may include at least one instruction for identifying switching of a closed state, a partially open state, and an open state, and processing corresponding screen display in the identified state. As an example, the memory 130 may include an instruction for causing the processor 120 to adjust the tension of the flexible display 240 by using the tension adjustment module 1040.

An electronic device 101 according to various embodiments of the disclosure may include the first housing 210, the second housing 220 coupled to the first housing 210 in a first state (for example, a closed state) of the electronic device 101 and configured to slide in a designated direction from the first housing 210 in the first state so as to support a second state (for example, a first partially open state) in which a display area is first partially expanded, the third housing 230 coupled to the first housing 210 in the first state of the electronic device 101 and configured to slide in the designated direction from the first housing 210 in the first state so as to support a third state (for example, a second partially open state) in which a display area is second partially expanded, and a flexible display 240 having a display area at least partially varied in conjunction with sliding movements of the second housing 220 and/or the third housing 230. The flexible display 240 may include the first display 241 fixedly disposed on the first housing 210 and visually exposed in the first state, in the second state, in the third state, and in a fourth state (for example, an open state) which is a combination of the second state and the third state, a second display 242 mounted on the second housing 220 to be able to roll, visually exposed in the second state and the fourth state, and configured to partially expand a display area according to a sliding movement of the second housing 220, and the third display 243 mounted on the third housing 230 to be able to roll, visually exposed in the third state and the fourth state, and configured to partially expand a display area according to a sliding movement of the third housing 230.

According to various embodiments of the disclosure, the first display 241 may be configured to display a screen through a fixed region in the first state, the second display 242 may be configured to slide according to a sliding movement of the second housing 220, thereby forming the second state in which the electronic device 101 is first partially open, and display a screen by interworking with a first portion of the fixed region of the first display 241 and an expanded region of the second display 242 in the second state, or display a screen through the expanded region independently of the fixed region, and the third display 243 may be configured to slide according to a sliding movement of the third housing 230, thereby forming the third state in which the electronic device 101 is second partially open, and display a screen by interworking with a second portion of the fixed region of the first display 241 and an expanded region of the third display 243 in the third state, or display a screen through the expanded region independently of the fixed region.

According to various embodiments of the disclosure, the flexible display 240 may be connected to at least one display drive integrated circuit (DDI), and the first display 241, the second display 242, and/or the third display 243 may be operatively connected by the at least one DDI.

According to various embodiments of the disclosure, in case that the at least one DDI includes one DDI 1110, the same may be formed to connect gate lines of the second display 242 and the third display 243 while bypassing the first display 241.

According to various embodiments of the disclosure, in case that the at least one DDI includes two DDIs 1120, the same may be formed to separate gate lines of the second display 242 and the third display 243.

According to various embodiments of the disclosure, the first display 241, the second display 242, and the third display 243 may be independent displays, and the second display 242 and the third display 243 may be disposed adjacent to each other and formed to be able to slide independently or simultaneously.

According to various embodiments of the disclosure, the second display 242 and the third display 243 may have a first disposition structure (for example, up/down disposition structure), and may be formed to slide in/out in a first direction (for example, leftward/rightward direction) perpendicular to the first disposition structure.

According to various embodiments of the disclosure, the second display 242 and the third display 243 may have a second disposition structure (for example, left/right disposition structure), and may be formed to slide in/out in a second direction (for example, upward/downward direction) perpendicular to the second disposition structure.

According to various embodiments of the disclosure, the second housing 220 may include a pair of first sliders 223A and 223B fixed to both ends thereof, the third housing 230 may include a pair of second sliders 233A and 233B fixed to both ends thereof, and a first inner slider 223B of the first sliders 223A and 223B and a second inner slider 233B of the second sliders may be adjacent to and face each other through the first adjacent surface 810 and a second adjacent surface 820, respectively, and may be spaced apart by a predetermined interval so as to form an inner space.

According to various embodiments of the disclosure, the pair of first sliders 223A and 223B may have rod shapes, may be positioned parallel to a first direction (for example, X-direction), and may face each other along a second direction (for example, Y-direction). The pair of second sliders 233A and 233B may have rod shapes, may be positioned parallel to the first direction (for example, X-direction), and may face each other along second direction (for example, Y-direction). The first sliders 223A and 223B and the second sliders 233A and 233B may be positioned parallel to each other along the first direction (for example, X-direction). The first inner sider 223B of the first sliders 223A and 223B and the second inner slider 233B of the second sliders 233A and 233B may be formed adjacent to and face each other along the second direction (for example, Y-direction).

According to various embodiments of the disclosure, the first sliders 223A and 223B and the second sliders 233A and 233B may include rail-structured guide rails 700 disposed on the first adjacent surface 810 and the second adjacent surface 820, respectively, so as to guide sliding movements of corresponding displays.

According to various embodiments of the disclosure, the guide rails 700 may include the first guide rail 710 at least partially fixed/formed on the first adjacent surface 810 of the first inner slider 223B so as to support a sliding movement of the second housing 220, and the second guide rail 720 at least partially fixed/formed on the second adjacent surface 820 of the second inner slider 233B so as to support a sliding movement of the third housing 230.

According to various embodiments of the disclosure, the first guide rail 710 and the second guide rail 720 may be formed such that at least some surfaces thereof engage with each other by a protrusion-groove coupling structure, and may be formed in a sliding rail structure configured to induce mutual sliding actions such that, through inner surfaces of the first inner slider 223B and the second inner slider 233B, the second housing 220 and the third housing 230 can slide inwards and outwards.

According to various embodiments of the disclosure, each of the first guide rail 710 and the second guide rail 720 may be so as formed to extend in the horizontal direction by a predetermined length, and to mutually operate as a fixed rail or a movable rail according to a partially open state of the electronic device 101.

According to various embodiments of the disclosure, the first guide rail 710 may be formed to slide according to a movement of the second housing 220, and to guide a sliding movement between the second display 242 and the third display 243 during a sliding movement between the first state and the second state, and the second guide rail 720 may be formed to slide according to a movement of the third housing 230, and to guide a sliding movement between the third display 243 and the second display 242 during a sliding movement between the first state and the third state.

According to various embodiments of the disclosure, the first guide rail 710 and/or the second guide rail 720 may be formed to include a movable member (for example, a ball) 755 for supporting smooth movements between the second housing 220 and the third housing 230.

According to various embodiments of the disclosure, the second housing 220 and the third housing 230 may be formed to further include the locking portion 900 configured such that the second housing 220 and the third housing 230 are retained on a straight line in the vertical direction.

According to various embodiments of the disclosure, the electronic device 101 may include, as housings, the first housing 210 configured to retain the first display 241, the second housing 220 configured to be independent of the first housing 210 and to have a rolling structure of a second display 242 internally, and the third housing 230 configured to be independent of the first housing 210 and the second housing 220 and to have a rolling structure of the third display 243 internally.

According to various embodiments of the disclosure, the electronic device 101 may include, as the flexible display 240, the first display 241 having a display region exposed outwards, a second display 242 exposed according to a sliding movement in a designated direction, thereby providing a first partially open state of the electronic device 101, and configured to extend a first portion of a fixed region of the first display 241 in the first partially open state or provide a first expanded region operating independently of the fixed region, and the third display 243 exposed according to a sliding movement in a designated direction, thereby providing a second partially open state of the electronic device 101, and configured to extend a second portion of a fixed region of the first display 241 in the second partially open state or provide a second expanded region operating independently of the fixed region.

According to various embodiments of the disclosure, the second housing 220 and the third housing 230 may be configured to slide from the first housing 210 independently of each other or slide from the first housing 210 simultaneously, and the second display 242 and the third display 243 may be configured to provide the first expanded region and/or the second expanded region, based on independent or simultaneous sliding movements of the second housing 220 and the third housing 230.

The electronic device 101 according to various embodiments of the disclosure may include the first display 241, the second display 242 capable of expanding the first display 241 first partially, the third display 243 capable of expanding the first display 241 second partially, and the processor 120. The processor 120 may display a first execution screen based on the first display 241, detect a change in state of at least one display among the second display 242 and the third display 243 while displaying the first execution screen, and identify at least one display, a change in state of which is detected, among the second display 242 and the third display 243.

According to various embodiments of the disclosure, the processor 120 may be configured to control the flexible display 240 (for example, the display device 160), based on identifying a change in state of the second display 242, such that the first execution screen displayed through the first display 241 is maintained, and a second execution screen is displayed through the second display 242, or the first execution screen is changed so as to correspond to interworking between a first portion of the first display 241 and the second display 242 and then displayed, and a second execution screen is displayed through a second portion of the first display 241.

According to various embodiments of the disclosure, the processor 120 may be configured to control the flexible display 240 (for example, the display device 160), based on identifying a change in state of the third display 243, such that the first execution screen displayed through the first display 241 is maintained, and a third execution screen is displayed through the third display 243, or the first execution screen is changed so as to correspond to interworking between a second portion of the first display 241 and the third display 243 and then displayed, and a second execution screen is displayed through a first portion of the first display 241.

Hereinafter, a method for operating an electronic device 101 according to various embodiments will be described below. According to various embodiments of the disclosure, operations performed in the electronic device 101 described below may be executed by a processor (for example, the processor 120 in FIG. 1) including at least one processing circuitry of the electronic device 101. According to an embodiment of the disclosure, operations performed in the electronic device 101 may be executed by instructions which are stored in the memory 130, and which cause the processor 120 to operate, when executed.

Figure 12:
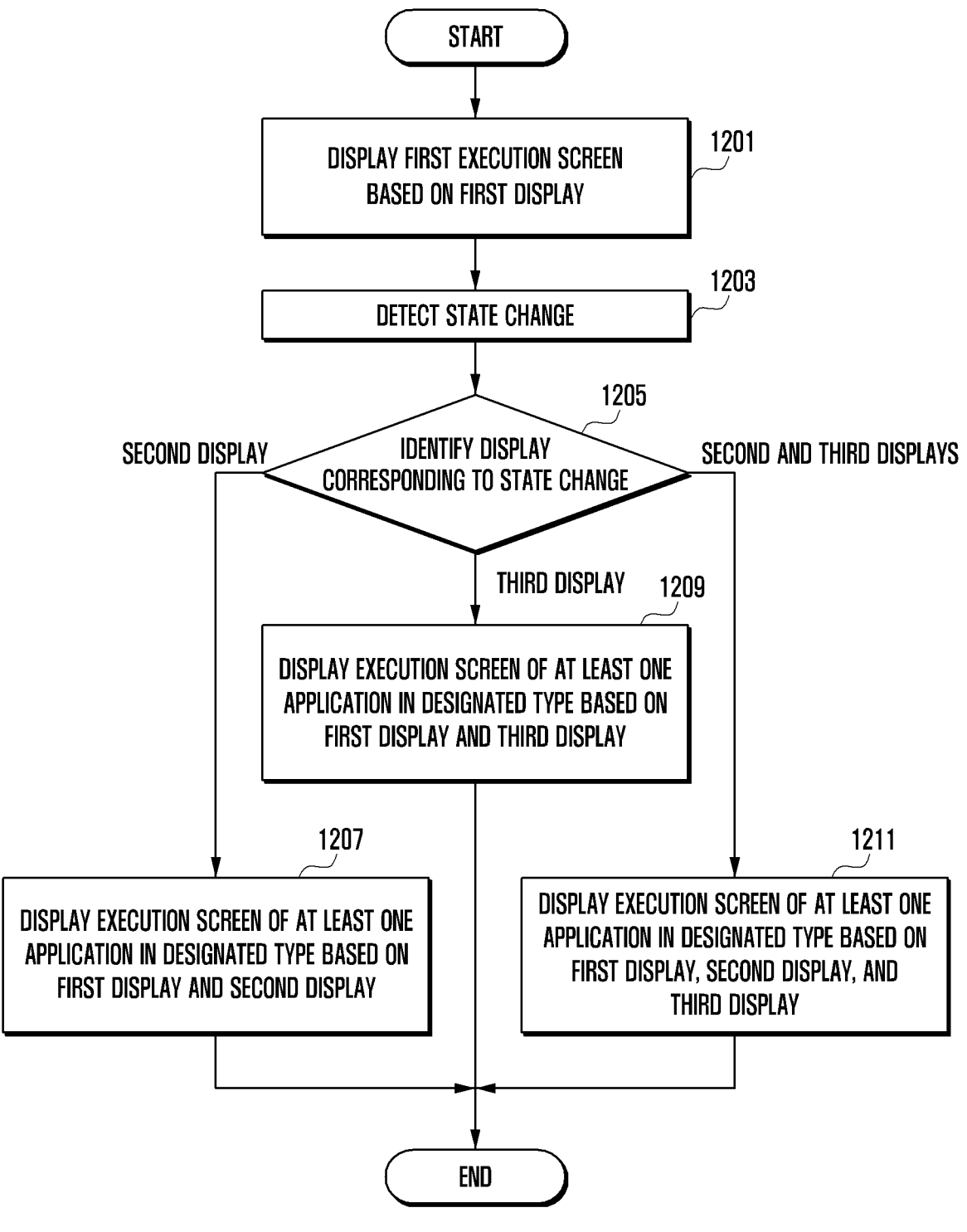
FIG. 12 is a flowchart illustrating a method for operating an electronic device according to an embodiment of the disclosure.
Figure 13:
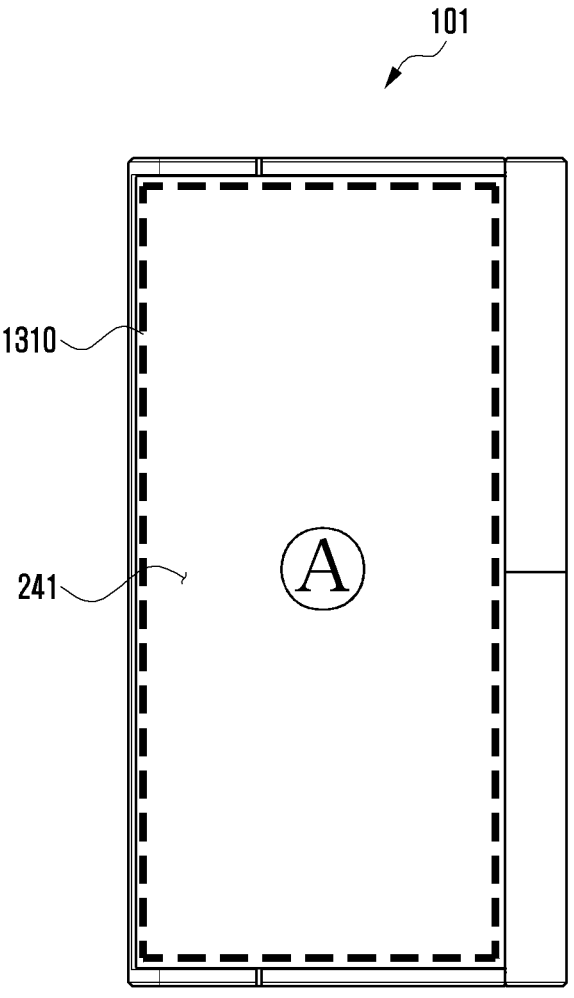
FIG. 13 illustrates an electronic device configured to display a first execution screen in a closed state of the electronic device according to an embodiment of the disclosure.
Figure 14A:
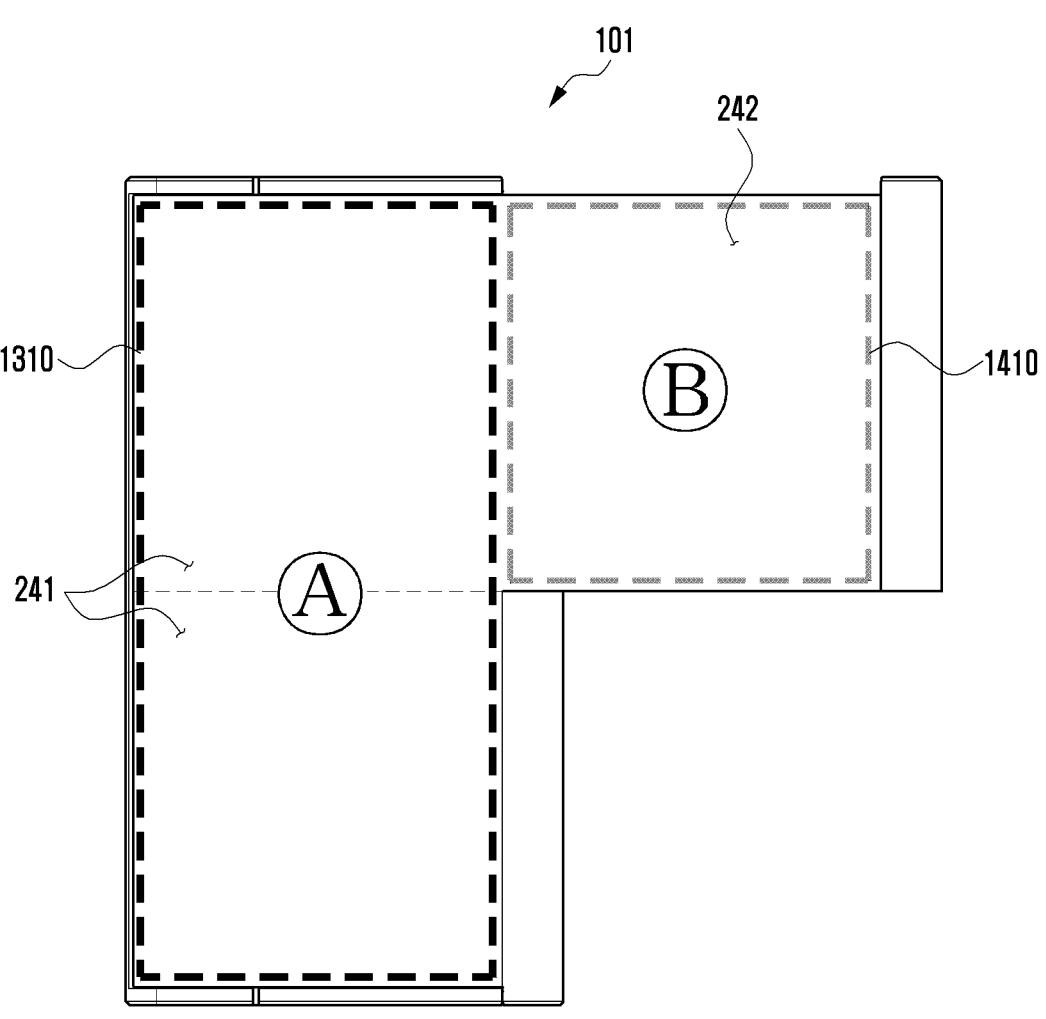
FIGS. 14A and 14B illustrate an electronic device configured to display at least one application execution screen in a first partially open state of the electronic device, respectively, according to various embodiments of the disclosure.
Figure 14B:
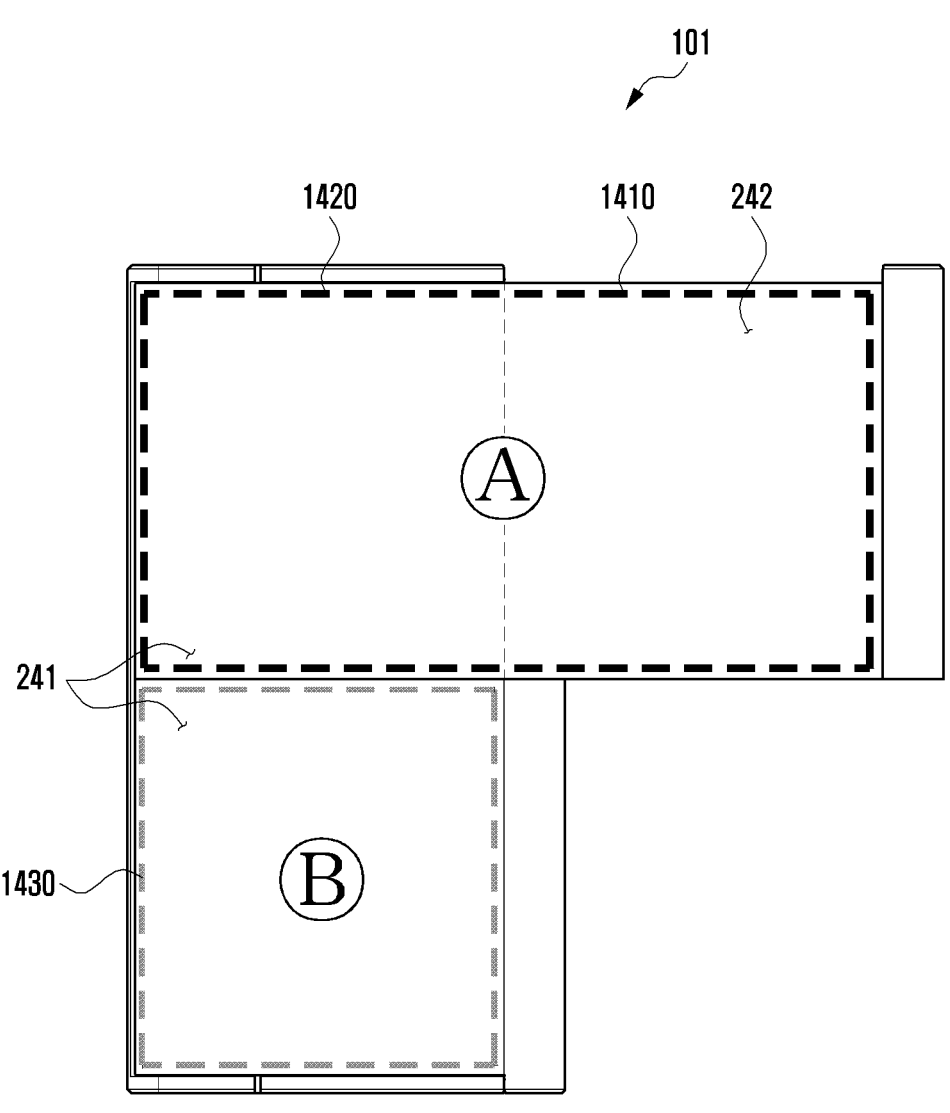
Figure 15A:
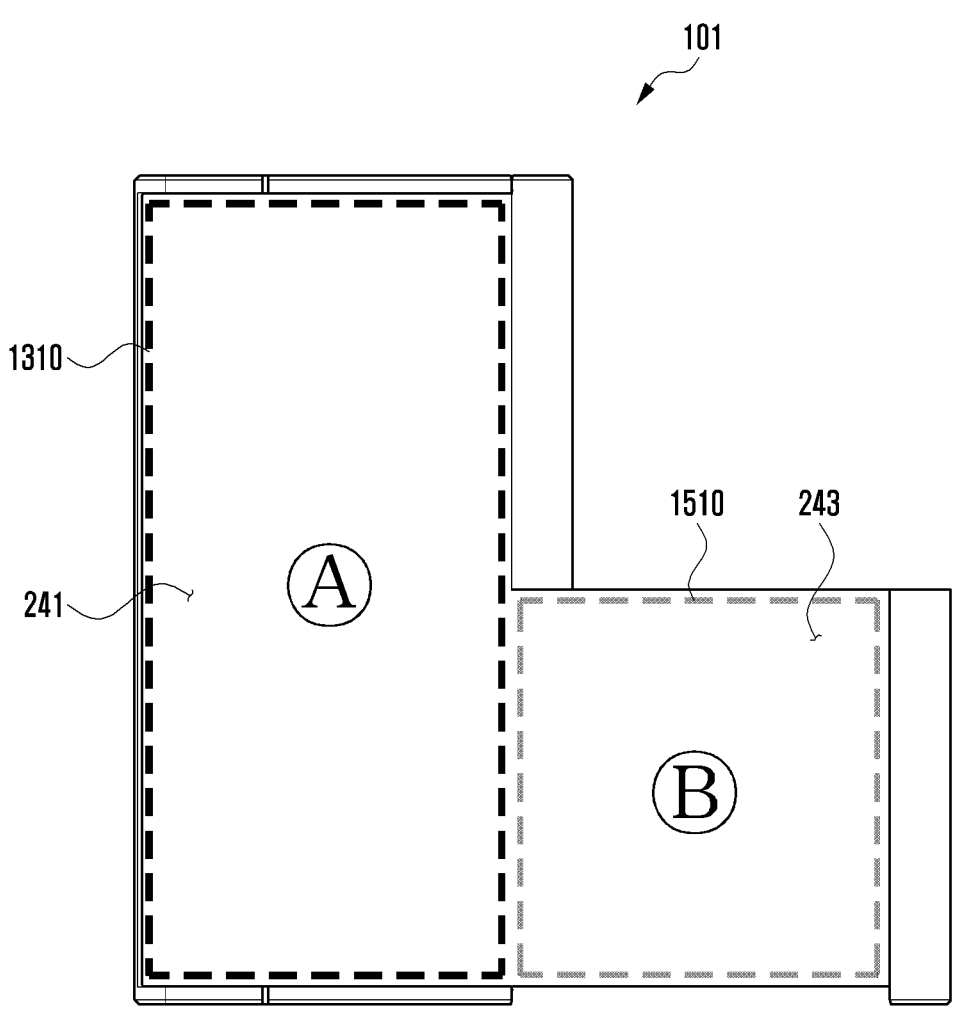
FIGS. 15A and 15B illustrate an electronic device configured to display at least one application execution screen in a second partially open state of the electronic device, respectively, according to various embodiments of the disclosure.
Figure 15B:
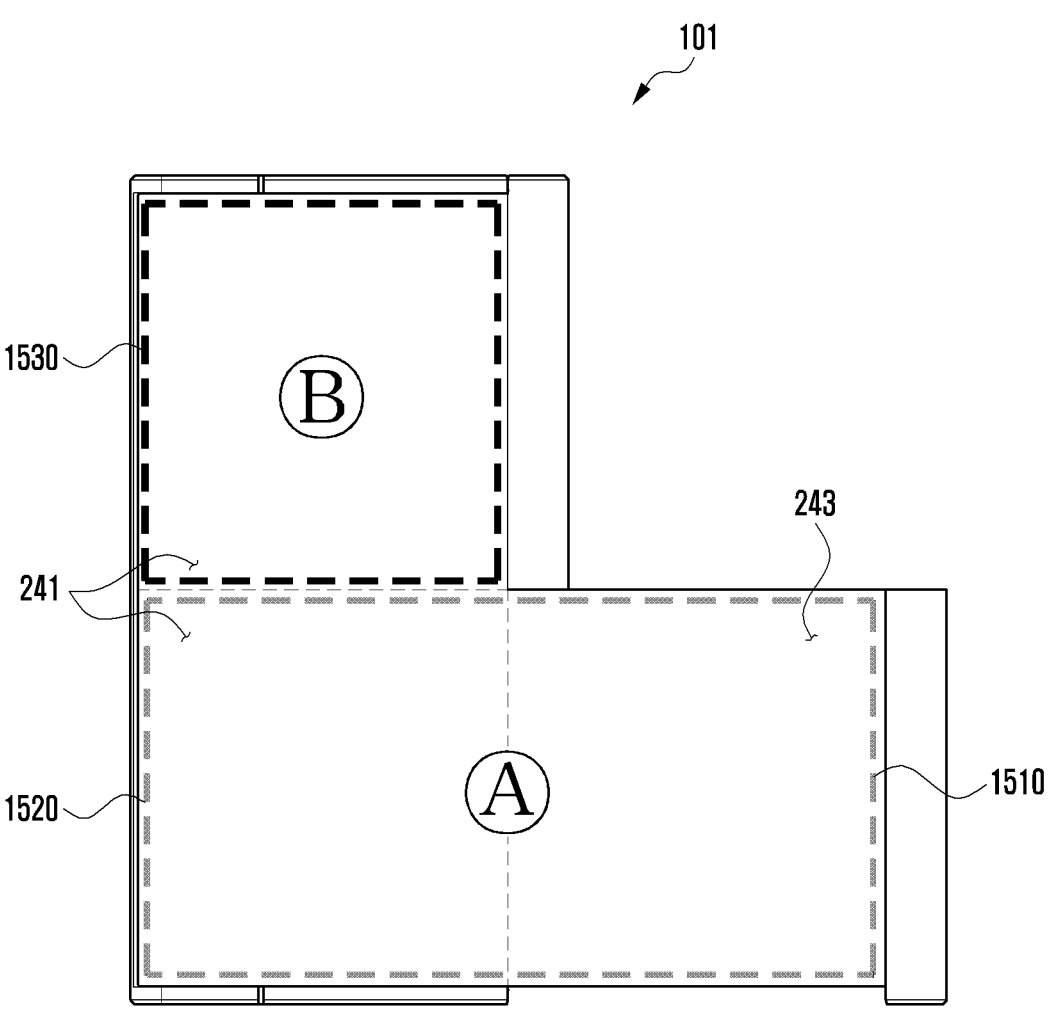
Figure 16A:
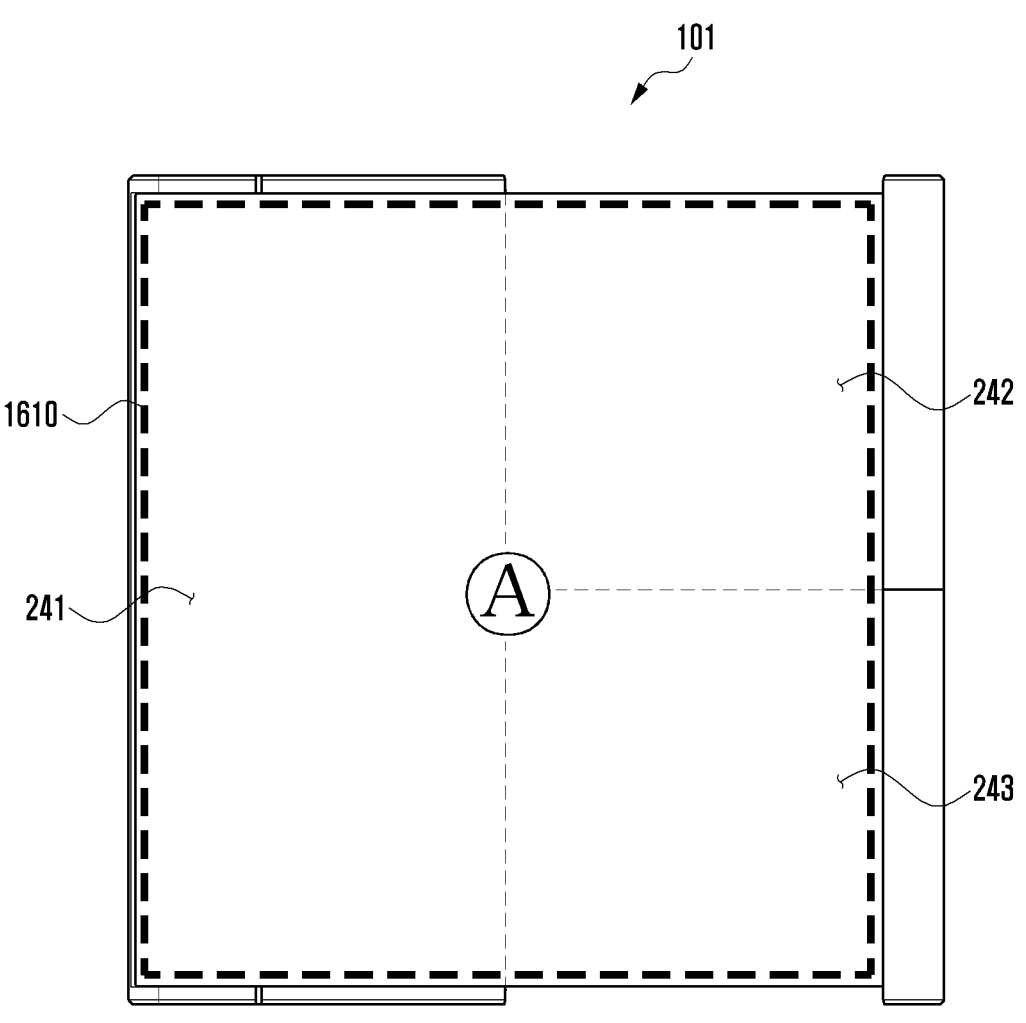
FIGS. 16A, 16B, and 16C illustrate an electronic device configured to display at least one application execution screen in an open state of the electronic device, respectively, according to various embodiments of the disclosure.
Figure 16B:
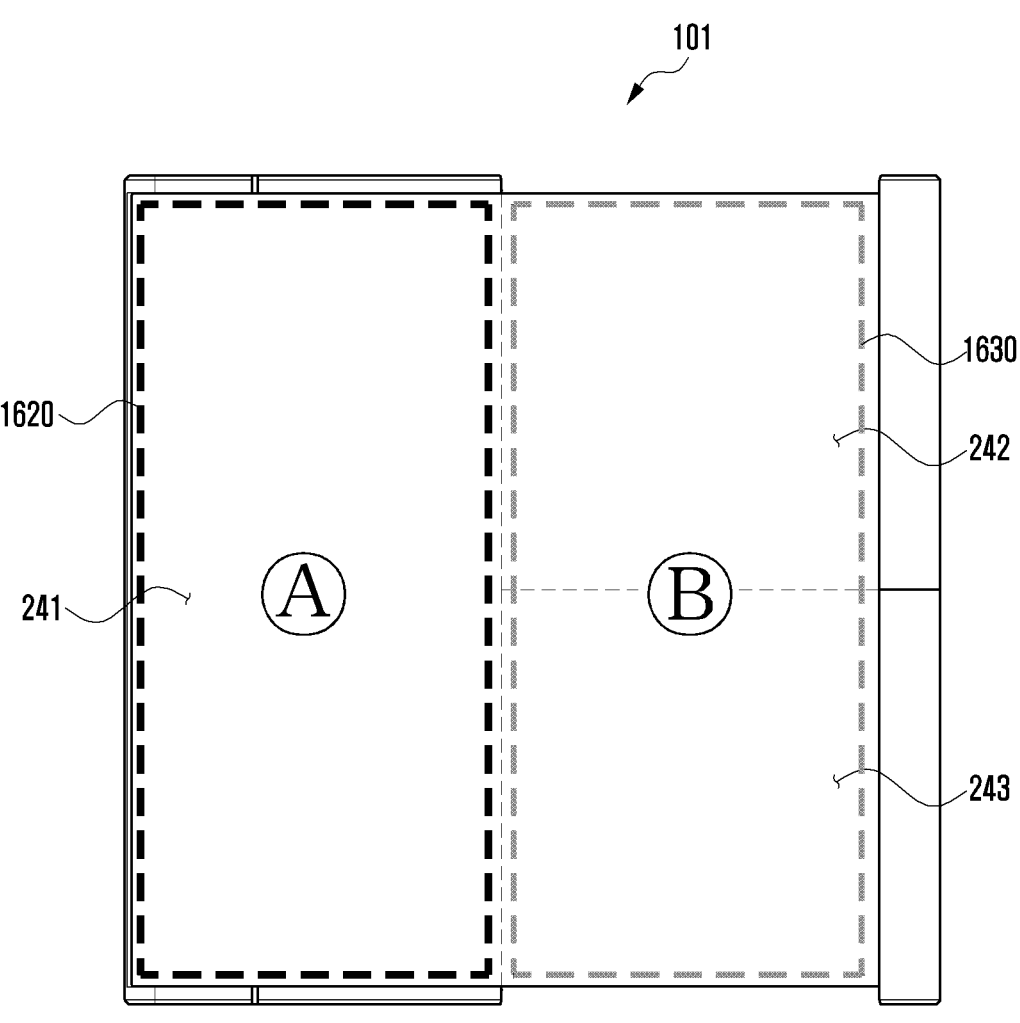
Figure 16C:
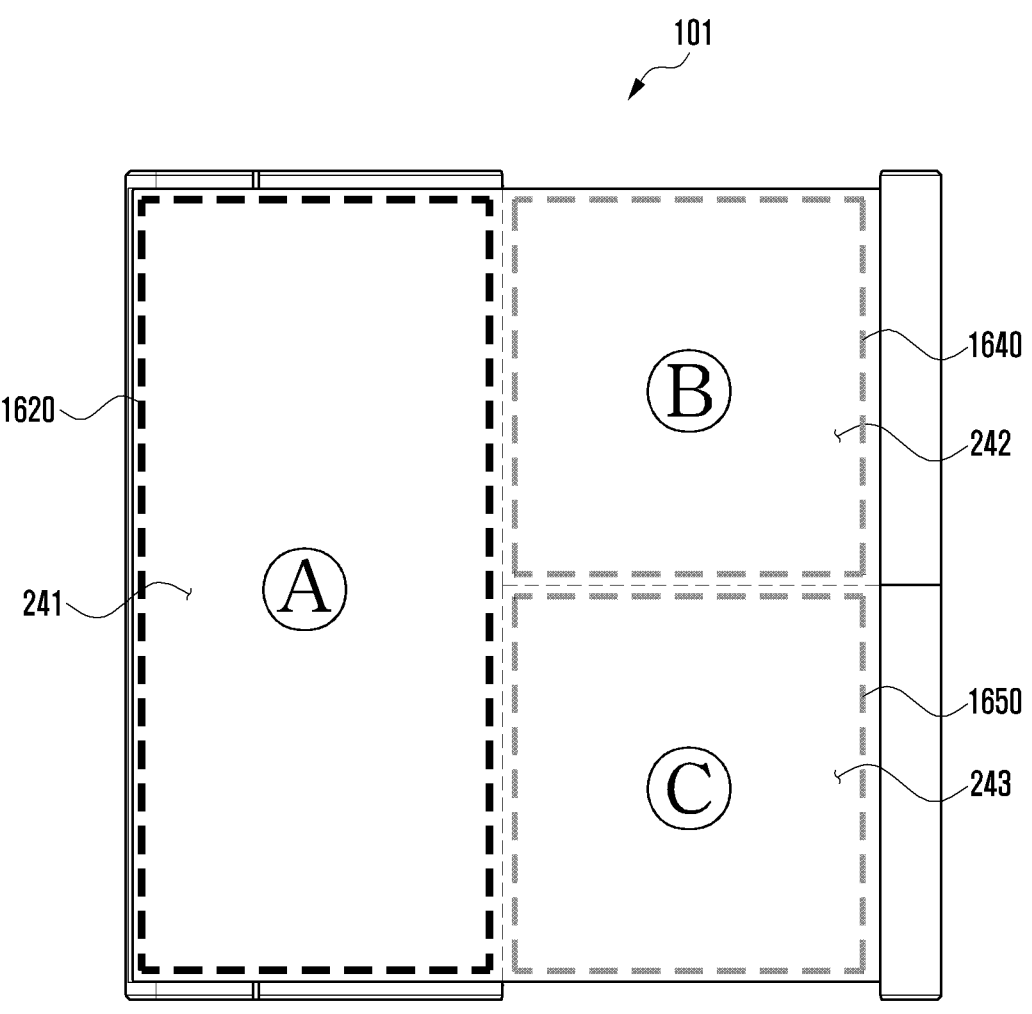

FIG. 12 is a flowchart illustrating a method for operating an electronic device according to an embodiment of the disclosure. FIG. 13 illustrates an electronic device configured to display a first execution screen in a closed state of the electronic device according to an embodiment of the disclosure. FIGS. 14A and 14B illustrate an electronic device configured to display at least one application execution screen in a first partially open state of the electronic device, respectively, according to various embodiments of the disclosure. FIGS. 15A and 15B illustrate an electronic device configured to display at least one application execution screen in a second partially open state of the electronic device, respectively, according to various embodiments of the disclosure. FIGS. 16A, 16B, and 16C illustrate an electronic device configured to display at least one application execution screen in an open state of the electronic device, respectively, according to various embodiments of the disclosure.

Referring to FIGS. 12, 13, 14A, 14B, 15A, 15B, and 16A to 16C, in operation 1201, the processor 120 of the electronic device 101 may display a first execution screen based on the first display 241. According to an embodiment of the disclosure, the processor 120 may display a first execution screen of a first application through the first display 241 of the flexible display 240 in a first state (for example, a closed state) of the electronic device 101.

An example thereof is illustrated in FIG. 13. Referring to FIG. 13, the electronic device 101 may be in a state in which a first execution screen (for example, screen A) of a first application (for example, application A) is displayed through the first display 241 of the flexible display 240 (for example, the display device 160). According to an embodiment of the disclosure, the processor 120 may control the flexible display 240 (for example, the display device 160) so as to display the first execution screen (for example, screen A) as a full screen 1310 corresponding to the display region (for example, fixed region) of the first display 241.

In operation 1203, the processor 120 may detect a change in state of the flexible display 240. According to an embodiment of the disclosure, while displaying a first execution screen through the first display 241 in a first state, the processor 120 may detect a change in state in which the second display 242 and/or the third display 243 slide and are exposed to the outside (or sliding outwards). For example, the processor 120 may detect switching from the first state to a second state in which the second display 242 slides and is exposed, switching from the first state to a third state in which the third display 243 slides and is exposed, or switching from the first state to a fourth state in which the second display 242 and the third display 243 slide approximately simultaneously and are exposed.

In operation 1205, based on detecting a change in state, the processor 120 may identify at least one display corresponding to the change in state. According to an embodiment of the disclosure, the processor 120 may identify whether the display having a change in state is the second display 242, the third display 243, or the second display 242 and the third display 243.

Upon identifying in operation 1205 that the display corresponding to a change in state is the second display 242, the processor 120 may display an execution screen of at least one application in a designated type based on the first display 241 and the second display 242 in operation 1207.

According to an embodiment of the disclosure, based on identifying a change in state of the second display 242, the processor 120 may maintain a first execution screen of a first application displayed through the first display 241 according to a first designated scheme, and may display a second execution screen through the second display 242. According to an embodiment of the disclosure, the second execution screen may include a sub-screen associated with the first application or an execution screen associated with the second application.

An example thereof is illustrated in FIG. 14A. Referring to FIG. 14A, the electronic device 101 may be in a state in which a first execution screen (for example, screen A) of a first application (for example, application A) is displayed through the first display 241 of the flexible display 240 (for example, the display device 160), and a second execution screen (for example, screen B) is displayed through the second display 242. According to an embodiment of the disclosure, the processor 120 may control the flexible display 240 (for example, the display device 160) so as to display the first execution screen (for example, screen A) as a full screen 1310 corresponding to the display region (for example, fixed region) of the first display 241, and to display the second execution screen (for example, screen B) as a full screen 1410 corresponding to the display region (for example, expanded region) of the second display 242.

For example, the processor 120 may maintain a state in which the first execution screen (for example, screen A) is displayed in the entire display region of the first display 241, and may operate the second display 242 independently of the first display 241. For example, the processor 120 may construct a single first window based on a region (for example, region 1310) corresponding to the entire part of the first display 241, may construct a single second window based on a region (for example, region 1410) corresponding to the entire part of the second display 242, and may display different execution screens through the first and second windows, respectively. In an embodiment of the disclosure, the second execution screen (for example, screen B) may be an execution screen of a second application different from the first application, or may be a sub-execution screen related to the first application or the first execution screen of the first application. In an embodiment of the disclosure, the sub-execution screen may include an execution screen related to an additional function of the first application or a sub-menu of the first execution screen.

According to another embodiment of the disclosure, based on identifying a change in state of the second display 242, the processor 120 may change (for example, expand) and display a first execution screen so as to correspond to interworking between a first portion of the first display 241 (for example, a portion extending with the second display 242, a change in state of which has been detected, for example, the upper region of the first display 241) and the second display 242 according to a second designated scheme, and may display a second execution screen of a second application through a second portion of the first display 241 (for example, a portion corresponding to the position of the third display 243 having no state change, for example, the lower region of the first display 241).

An example thereof is illustrated in FIG. 14B. Referring to FIG. 14B, the electronic device 101 may be in a state in which a first execution screen (for example, screen A) of a first application (for example, application A) is displayed through a partial region (for example, a first portion) of the first display 241 of the flexible display 240 (for example, the display device 160) and the second display 242, and a second execution screen (for example, screen B) is displayed through another partial region (for example, a second portion) of the first display 241. According to an embodiment of the disclosure, the processor 120 may control the flexible display 240 (for example, the display device 160) so as to display the first execution screen (for example, screen A) based on interworking between a partial screen 1420 corresponding to the display region (for example, fixed region) of the first display 241 and a full screen 1410 corresponding to the display region (for example, expanded region) of the second display 242, and to display the second execution screen (for example, screen B) on a partial screen 1430 corresponding to another partial region of the display region (for example, fixed region) of the first display 241.

For example, the processor 120 may operate such that the first execution screen (for example, screen A) is reconfigured (or resized) to correspond to the screen size extending from the first portion of the first display 241 to the expanded second display 242, and the corresponding screen (for example, wide screen) is displayed. For example, the processor 120 may construct a single expanded first window based on a region (for example, region 1420) corresponding to the first portion of the first display 241 and a region (for example, region 1410) corresponding to the second display 242, may construct a single second window based on a region (for example, region 1430) corresponding to the second portion of the first display 241, and may display different execution screens through the first and second windows, respectively. In an embodiment of the disclosure, the second execution screen (for example, screen B) may be an execution screen of a second application different from the first application, or may be a sub-execution screen related to the first application or the first execution screen of the first application. In an embodiment of the disclosure, the sub-execution screen may include an execution screen related to an additional function of the first application or a sub-menu of the first execution screen.

Upon identifying in operation 1205 that the display corresponding to a change in state is the third display 243, the processor 120 may display an execution screen of at least one application in a designated type based on the first display 241 and the third display 243 in operation 1209.

According to an embodiment of the disclosure, based on identifying a change in state of the third display 243, the processor 120 may maintain a first execution screen of a first application displayed through the first display 241 according to a first designated scheme, and may display a second execution screen through the third display 243. According to an embodiment of the disclosure, the second execution screen may include a sub-screen associated with the first application or an execution screen associated with the second application.

An example thereof is illustrated in FIG. 15A. Referring to FIG. 15A, the electronic device 101 may be in a state in which a first execution screen (for example, screen A) of a first application (for example, application A) is displayed through the first display 241 of the flexible display 240 (for example, the display device 160), and a second execution screen (for example, screen B) is displayed through the third display 243. According to an embodiment of the disclosure, the processor 120 may control the flexible display 240 (for example, the display device 160) so as to display the first execution screen (for example, screen A) as a full screen 1310 corresponding to the display region (for example, fixed region) of the first display 241, and to display the second execution screen (for example, screen B) as a full screen 1510 corresponding to the display region (for example, expanded region) of the third display 243.

For example, the processor 120 may maintain a state in which the first execution screen (for example, screen A) is displayed in the entire display region of the first display 241, and may operate the third display 243 independently of the first display 241. For example, the processor 120 may construct a single first window based on a region (for example, region 1310) corresponding to the entire part of the first display 241, may construct a single second window based on a region (for example, region 1510) corresponding to the entire part of the second display 242, and may display different execution screens through the first and second windows, respectively. In an embodiment of the disclosure, the second execution screen (for example, screen B) may be an execution screen of a second application different from the first application, or may be a sub-execution screen related to the first application or the first execution screen of the first application. In an embodiment of the disclosure, the sub-execution screen may include an execution screen related to an additional function of the first application or a sub-menu of the first execution screen.

According to another embodiment of the disclosure, based on identifying a change in state of the third display 243, the processor 120 may change (for example, expand) and display a first execution screen of a first application so as to correspond to interworking between a first portion of the first display 241 (for example, a portion extending with the third display 243, a change in state of which has been detected, for example, the lower region of the first display 241) and the third display 243 according to a second designated scheme, and may display a second execution screen of a second application through a second portion of the first display 241 (for example, a portion corresponding to the position of the second display 242 having no state change, for example, the upper region of the first display 241).

An example thereof is illustrated in FIG. 15B. Referring to FIG. 15B, the electronic device 101 may be in a state in which a first execution screen (for example, screen A) of a first application (for example, application A) is displayed through a partial region (for example, a second portion) of the first display 241 of the flexible display 240 (for example, the display device 160) and the third display 243, and a second execution screen (for example, screen B) is displayed through another partial region (for example, a first portion) of the first display 241. According to an embodiment of the disclosure, the processor 120 may control the flexible display 240 (for example, the display device 160) so as to display the first execution screen (for example, screen A) based on interworking between a partial screen 1520 corresponding to a partial region of the display region (for example, fixed region) of the first display 241 and a full screen 1510 corresponding to the display region (for example, expanded region) of the third display 243, and to display the second execution screen (for example, screen B) on a partial screen 1530 corresponding to another partial region of the display region (for example, fixed region) of the first display 241.

For example, the processor 120 may operate such that the first execution screen (for example, screen A) is reconfigured (or resized) to correspond to the screen size extending from the second portion of the first display 241 to the expanded third display 243, and the corresponding screen (for example, wide screen) is displayed. For example, the processor 120 may construct a single expanded first window based on a region (for example, region 1520) corresponding to the second portion of the first display 241 and a region (for example, region 1510) corresponding to the third display 243, may construct a single second window based on a region (for example, region 1530) corresponding to the first portion of the first display 241, and may display different execution screens through the first and second windows, respectively. In an embodiment of the disclosure, the second execution screen (for example, screen B) may be an execution screen of a second application different from the first application, or may be a sub-execution screen related to the first application or the first execution screen of the first application. In an embodiment of the disclosure, the sub-execution screen may include an execution screen related to an additional function of the first application or a sub-menu of the first execution screen.

Upon identifying in operation 1205 that the display corresponding to a change in state is the second display 242 and the third display 243, the processor 120 may display an execution screen of at least one application in a designated type based on the first display 241, the second display 242, and the third display 243 in operation 1211.

According to an embodiment of the disclosure, based on identifying a change in state of the second display 242 and the third display 243, the processor 120 may expand the first execution screen of the first application displayed through the first display 241 according to the first designated scheme to the second display 242 and the third display 243 such that the same is displayed as a full screen. According to an embodiment of the disclosure, the second display 242 and the third display 243 may slide approximately simultaneously or independently of each other, thereby expanding the screen of the first display 241.

An example thereof is illustrated in FIG. 16A. Referring to FIG. 16A, the electronic device 101 may be in a state in which a first execution screen (for example, screen A) of a first application (for example, application A) is displayed through the first display 241, the second display 242, and the third display 243 of the flexible display 240 (for example, the display device 160). According to an embodiment of the disclosure, the processor 120 may control the flexible display 240 (for example, the display device 160) so as to display the first execution screen (for example, screen A) as a full screen 1610 including a screen corresponding to the display region (for example, fixed region) of the first display 241, a screen corresponding to the expanded region of the second display 242, and a screen corresponding to the expanded region of the third display 243.

For example, the processor 120 may operate such that the first execution screen disposed through the display region of the first display 241 is reconfigured (or resized) to correspond to the screen size extending from the first portion of the first display 241 to the expanded second display 242 and from the second portion of the first display 241 to the expanded third display 243, and the corresponding screen (for example, large screen) is displayed. For example, the processor 120 may construct a single fully expanded first window based on a region corresponding to the first portion and the second portion of the first display 241, a region corresponding to the second display 242, and a region corresponding to the third display 243, and may display an expanded execution screen through the window.

According to another embodiment of the disclosure, upon identifying a change in state of the second display 242 and the third display 243, the processor 120 may maintain the first execution screen of the first application displayed through the first display 241 according to a second designated scheme, and may display the second execution screen through the second display 242 and the third display 243. For example, the processor 120 may split the entire screen of the flexible display 240 vertically, thereby displaying split screens. Although split screens are provided through a vertical split in an embodiment as an example, this is not limitative, and split screens may be provided through a horizontal split according to a designated scheme or the application type. According to an embodiment of the disclosure, the second execution screen may include a sub-screen associated with the first application or an execution screen associated with the second application. According to an embodiment of the disclosure, the second display 242 and the third display 243 may slide approximately simultaneously or independently of each other, thereby expanding the screen of the first display 241.

An example thereof is illustrated in FIG. 16B. Referring to FIG. 16B, the electronic device 101 may be in a state in which a first execution screen (for example, screen A) of a first application (for example, application A) is displayed through the first display 241 of the flexible display 240 (for example, the display device 160), and a second execution screen (for example, screen B) is displayed through the second display 242 and the third display 243. According to an embodiment of the disclosure, the processor 120 may control the flexible display 240 (for example, the display device 160) so as to display the first execution screen (for example, screen A) as a full screen 1620 corresponding to the display region (for example, fixed region) of the first display 241, and to display the second execution screen (for example, screen B) as a full screen 1630 corresponding to the display region (for example, expanded region) of the second display 242 and the display region (for example, expanded region) of the third display 243.

For example, the processor 120 may maintain a state in which the first execution screen (for example, screen A) is displayed in the entire display region of the first display 241, and may operate the second display 242 and the third display 243 independently of the first display 241. For example, the processor 120 may construct a single first window based on a region (for example, region 1620) corresponding to the entire part of the first display 241, may construct a single second window based on a region (for example, region 1630) corresponding to the entire part on which the second display 242 and the third display 243 are connected, and may display different execution screens through the first and second windows, respectively. In an embodiment of the disclosure, the second execution screen (for example, screen B) may be an execution screen of a second application different from the first application, or may be a sub-execution screen related to the first application or the first execution screen of the first application. In an embodiment of the disclosure, the sub-execution screen may include an execution screen related to an additional function of the first application or a sub-menu of the first execution screen.

According to another embodiment of the disclosure, upon identifying a change in state of the second display 242 and the third display 243, the processor 120 may maintain a first execution screen of a first application displayed through the first display 241 according to a third designated scheme, may display a second execution screen through the second display 242, and may display a third execution screen through the third display 243. According to an embodiment of the disclosure, the second execution screen may include a sub-execution screen associated with the first application or an execution screen associated with the second application, and the third execution screen may include a sub-execution screen associated with the first or second application or an execution screen associated with the third application. For example, the first, second, and third execution screens may be different execution screens which can operate independently.

An example thereof is illustrated in FIG. 16C. Referring to FIG. 16C, the electronic device 101 may be in a state in which a first execution screen (for example, screen A) of a first application (for example, application A) is displayed through the first display 241 of the flexible display 240 (for example, the display device 160), a second execution screen (for example, screen B) is displayed through the second display 242, and a third execution screen (for example, screen C) is displayed through the third display 243. According to an embodiment of the disclosure, the processor 120 may control the flexible display 240 (for example, the display device 160) so as to display the first execution screen (for example, screen A) as a full screen 1620 corresponding to the display region (for example, fixed region) of the first display 241, to display the second execution screen (for example, screen B) as a full screen 1640 corresponding to the display region (for example, expanded region) of the second display 242, and to display the third execution screen as a full screen 1650 corresponding to the display region (for example, expanded region) of the third display 243.

For example, the processor 120 may maintain a state in which the first execution screen (for example, screen A) is displayed in the entire display region of the first display 241, and may operate the first display 241, the second display 242, and the third display 243 independently (or individually) of each other. For example, the processor 120 may construct a single first window based on a region (for example, region 1620) corresponding to the entire part of the first display 241, may construct a single second window based on a region (for example, region 1640) corresponding to the entire part of the second display 242, may construct a single third window based on a region (for example, region 1650) corresponding to the entire part of the third display 243, and may display different execution screens through the first, second, and third windows, respectively.

In an embodiment of the disclosure, the second execution screen (for example, screen B) may be an execution screen of a second application different from the first application, or may be a sub-execution screen related to the first application or the first execution screen of the first application. In an embodiment of the disclosure, the third execution screen (for example, screen C) may be an execution screen of a third application different from the first and second applications, may be a sub-execution screen related to the first or second application, or may be a sub-execution screen related to the first execution screen of the first application or the second execution screen of the second application. In an embodiment of the disclosure, the sub-execution screen may include an execution screen related to an additional function of the corresponding application or a sub-menu of the execution screen.

As described above with reference to FIGS. 12, 13, 14A, 14B, 15A, 15B, and 16A to 16C, the electronic device 101 may variously operate the flexible display 240 according to a designated scheme (for example, the type of an application and/or the configuration of the electronic device 101 based on user designation). According to an embodiment of the disclosure, the designated scheme may follow the type of an application and/or the configuration of the electronic device 101 based on user designation. According to an embodiment of the disclosure, the type of an application may be identified according to whether the application operates in a horizontal mode or a vertical mode. According to an embodiment of the disclosure, in the case of an application operating in both horizontal and vertical modes, it is possible to switch form a partially open state to the horizontal mode or vertical mode according to a user-designated preferential mode (or preferred mode) configuration.

According to some embodiments of the disclosure, the designated mode may be configured to operate differently according to a first partially open state and a second partially open state. For example, in the case of a first partially open state resulting from sliding out of the second display 242, the same may be designated as an expanded mode such that the first portion of the fixed region of the first display 241 and the expanded region of the second display interwork and operate. As another example, in the case of a second partially open state resulting from sliding out of the third display 243, the same may be designated as a fixed mode such that state of the fixed region of the first display 241 is maintained, and the expanded region of the third display 243 operates independently of the fixed region of the first display 241. This is not limitative, and the expanded mode and the fixed mode may be designated such that, according to a user configuration, opposite operations occur in the first partially open state and the second partially open state.

Figure 17A:
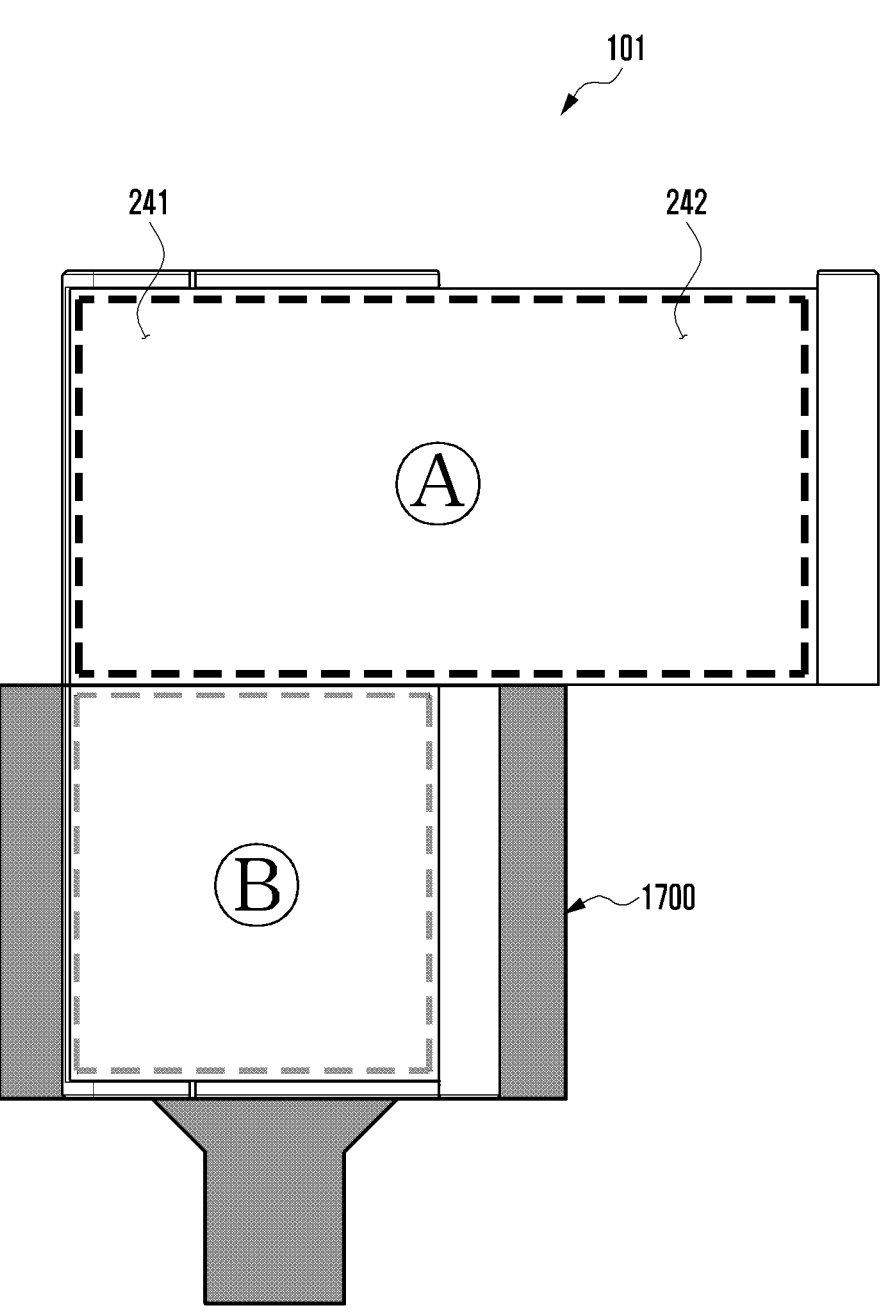
FIGS. 17A and 17B illustrate using structure characteristics of an electronic device, respectively, according to various embodiments of the disclosure.
Figure 17B:
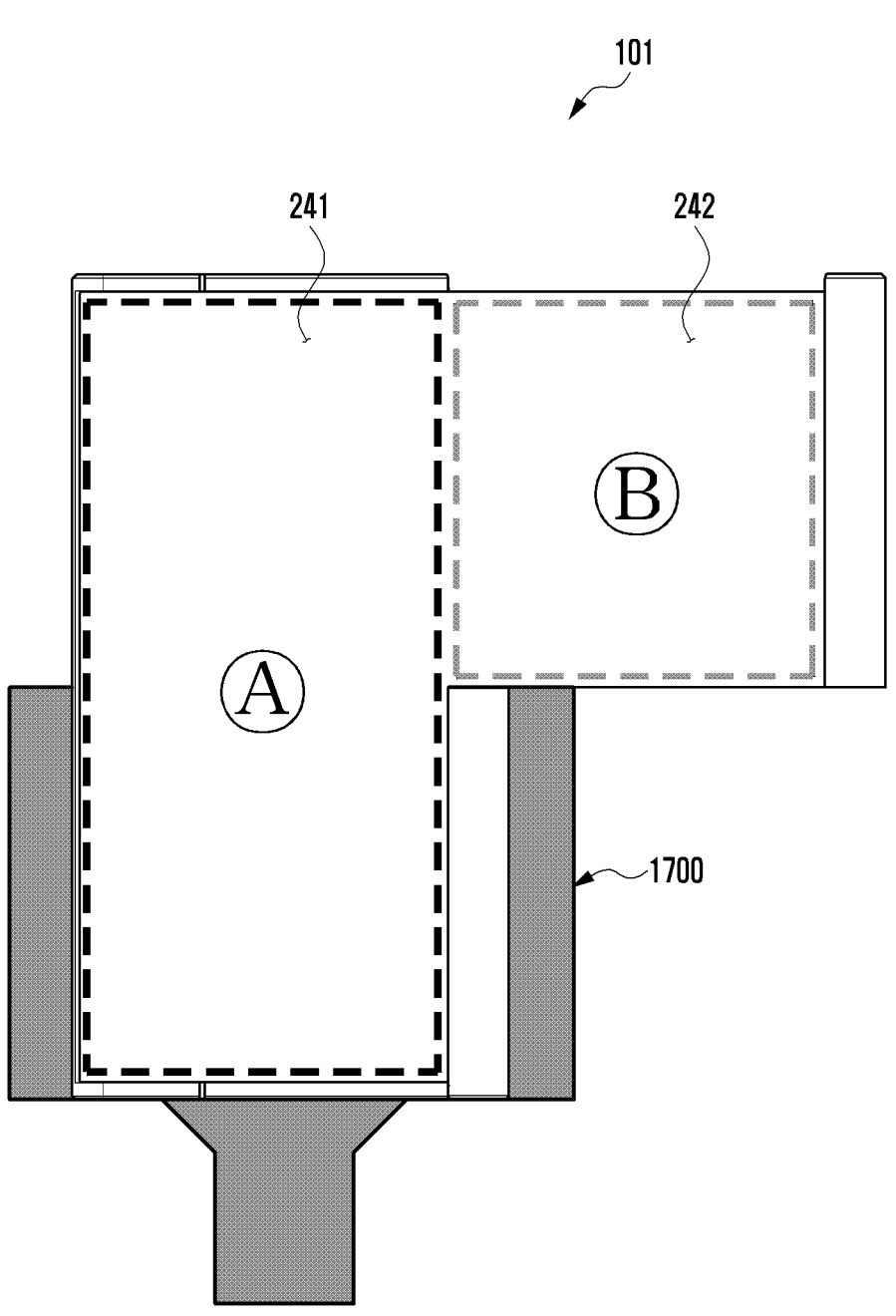

FIGS. 17A and 17B illustrate using structure characteristics of an electronic device, respectively, according to various embodiments of the disclosure.

Referring to FIGS. 17A and 17B, the electronic device 101 according to an embodiment may include the flexible display 240 including multiple displays distinguished independently (for example, the first display 241, a second display 242, and the third display 243). According to an embodiment of the disclosure, the electronic device 101 may support at least some displays (for example, the second display 242 and the third display 243) among the multiple displays 241, 242, and 243 such that they can be used after being partially expanded (or split/expanded) according to the manner in which the user uses the electronic device 101. For example, FIGS. 17A and 17B may illustrate an example in which the electronic device 101 is mounted on a cradle 1700 and used. According to an embodiment of the disclosure, as illustrated in FIGS. 17A and 17B, the electronic device 101 may be in a partially open state, such as a state in which the second display 242 is expanded, and the third display 243 (not illustrated) is closed.

According to an embodiment of the disclosure, the expanded region of the electronic device 101 capable of display expansion may be a mechanically vulnerable part. Therefore, it may be difficult to mount (or cradle) the electronic device 101 in a fully open state on the cradle 1700. According to various embodiments of the disclosure, when the electronic device 101 is mounted on the cradle 1700, one of the second display 242 or the third display 243 can be expanded according to the cradling direction, and the electronic device 101 then can be stably cradled on the cradle 1700 through the non-expanded part.

Therefore, the electronic device 101 can be stably cradled on the cradle 1700 through the non-expanded region (for example, the lower region of the first display 241 in the drawings), and can also be used for various purposes by using the partially expanded region. For example, as in the example in FIG. 7A, the user may simultaneously use a wide screen (for example, screen A) and an additional function screen (for example, screen B) by connecting a partial display region of the first display 241 and the expanded region of the second display 242. As another example, as in the example in FIG. 7B, the user may use the entire display region of the first display 241 as a default screen and may simultaneously use an additional function screen through the expanded region of the second display 242.

According to an embodiment of the disclosure, the partially expandable electronic device 101 may enable the user to use various multi-screens by utilizing expanded regions, and may provide stability and convenience in connection with cradling or holding the electronic device 101. According to an embodiment of the disclosure, when capturing images with the electronic device 101, the user may use the unexpanded region as a handle, thereby supporting one-hand image capture while stably holding the same with one hand, and providing a stable grip.

According to an embodiment of the disclosure, existing electronic devices may consume a large amount of current because, during display expansion, the Y-axis is always expanded with the same size. On the other hand, in the case of the electronic device 101 according to various embodiments of the disclosure, only the display on a desired part can be split/expanded and used as needed. This may block a current to the display in the unexpanded region, relatively reducing unnecessary current consumption, and may improve stability, convenience, and/or usability in use environments, such as character typing, camera image capture, and/or cradling of the electronic device 101.

A method for operating an electronic device 101 including the first housing 210, the second housing 220, the third housing 230, and the flexible display 240 (for example, the display device 160) capable of moving into/out of the second housing 220 and/or the third housing 230 according to various embodiments of the disclosure may include an operation of displaying a first execution screen based on the first display 241 fixed to the first housing 210, the first display 241 having a display region exposed outwards, an operation of detecting a change in state of at least one display, while displaying the first execution screen, among the second display 242 configured to be rolled from the second housing 220 and capable of expanding the first display 241 first partially, and the third display 243 configured to be rolled to the third housing 230 and capable of expanding the first display 241 second partially, and an operation of identifying at least one display, a change in state of which is detected, among the second display 242 and the third display 243.

According to various embodiments of the disclosure, the method may include an operation of controlling the flexible display 240 (for example, the display device 160), based on identifying a change in state of the second display 242, such that the first execution screen displayed through the first display 241 is maintained, and a second execution screen is displayed through the second display 242, or the first execution screen is changed so as to correspond to interworking between a first portion of the first display 241 and the second display 242 and then displayed, and a second execution screen is displayed through a second portion of the first display 241.

According to various embodiments of the disclosure, the method may include an operation of controlling the flexible display 240 (for example, the display device 160), based on identifying a change in state of the third display 243, such that the first execution screen displayed through the first display 241 is maintained, and a third execution screen is displayed through the third display 243, or the first execution screen is changed so as to correspond to interworking between a second portion of the first display 241 and the third display 243 and then displayed, and a second execution screen is displayed through a first portion of the first display 241.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first housing;
a second housing including a first roller portion and a first sliding portion, the second housing being coupled to the first housing in a first state of the electronic device and configured to slide in a designated direction from the first housing through the first sliding portion in the first state so as to support a second state in which a display area is first partially expanded;
a third housing including a second roller portion and a second sliding portion, the third housing being coupled to the first housing in the first state of the electronic device and configured to slide in the designated direction from the first housing through the second sliding portion in the first state so as to support a third state in which the display area is second partially expanded; and
a flexible display having a display area at least partially varied in conjunction with sliding movements of at least one of the second housing or the third housing, wherein the flexible display comprises:
a first display disposed on the first housing and visually exposed in the first state, in the second state, in the third state, and in a fourth state which is a combination of the second state and the third state, a second display disposed to roll through the first roller portion in the second housing and being configured to either partially expand from a first portion of the first display or retract into the second housing, dependent on a rotation direction of the first roller portion as the second housing slides, and a third display disposed to roll through the second roller portion in the third housing and being configured to either partially expand from a second portion of the first display or retract into the third housing, dependent on a rotation direction of the second roller portion as the third housing slides, and
wherein the second display and the third display are disposed adjacent to each other and formed to be able to slide independently or simultaneously.

2. The electronic device of claim 1,
wherein the first display is configured to display a screen through a fixed region in the first state,
wherein the second display is configured to slide according to a sliding movement of the second housing, thereby forming the second state in which the electronic device is first partially open, and is configured to perform one of:
displaying a screen by interworking with a first portion of the fixed region of the first display and an expanded region of the second display in the second state; or
displaying a screen through the expanded region of the second display independently of the fixed region, and wherein the third display is configured to slide according to a sliding movement of the third housing, thereby forming the third state in which the electronic device is second partially open, and is configured to perform one of:
displaying a screen by interworking with a second portion of the fixed region of the first display and an expanded region of the third display in the third state; or
displaying a screen through the expanded region of the third display independently of the fixed region.

3. The electronic device of claim 2, wherein the flexible display is connected to at least one display drive integrated circuit (DDI), and wherein one or more of the first display, the second display, and the third display is operatively connected by the at least one DDI.

4. The electronic device of claim 3, wherein, in case that the at least one DDI comprises one DDI, gate lines of the second display and the third display are connected so as to bypass the first display.

5. The electronic device of claim 3, wherein, in case that the at least one DDI comprises two DDIs, gate lines of the second display and the third display are separated.

6. The electronic device of claim 2, wherein the first display, the second display, and the third display are independent displays.

7. The electronic device of claim 2, wherein the second display and the third display have a first disposition structure, and wherein the second display and the third display are formed to slide into and out of the electronic device in a first direction perpendicular to the first disposition structure.

8. The electronic device of claim 2, wherein the second display and the third display have a second disposition structure, and wherein the second display and the third display are formed to slide into and out of the electronic device in a second direction perpendicular to the second disposition structure.

9. The electronic device of claim 1, wherein the second housing comprises a pair of first sliders fixed to both ends thereof, wherein the third housing comprises a pair of second sliders fixed to both ends thereof, and wherein a first inner slider of the first sliders and a second inner slider of the second sliders are adjacent to and face each other through a first adjacent surface and a second adjacent surface, respectively, and are spaced apart by a predetermined interval so as to form an inner space.

10. The electronic device of claim 9, wherein rail-structured guide rails are disposed on the first adjacent surface and the second adjacent surface, respectively, so as to guide sliding movements of corresponding displays.

11. The electronic device of claim 10, wherein the rail-structured guide rails are formed in a sliding rail structure, wherein the sliding rail structure is configured to induce mutual sliding actions such that the second housing and the third housing can slide in and out through inner surfaces of the first inner slider and the second inner slider, and wherein the rail-structured guide rails are formed to operate as a fixed rail or a movable rail mutually according to a partially open state of the electronic device.

12. The electronic device of claim 1, wherein the second housing and the third housing further comprise a locking portion such that the second housing and the third housing are retained on a straight line in a vertical direction.

13. The electronic device of claim 1, wherein the first housing is configured to retain the first display, wherein the second housing is independent of the first housing and includes a second display rolling structure internally, wherein the third housing is independent of the first housing and the second housing and includes a third display rolling structure internally, wherein the first display includes a display region exposed outwards, wherein the second display is exposed according to a sliding movement in the designated direction, thereby providing a first partially open state of the electronic device, wherein the second display is configured to extend a first portion of a fixed region of the first display in the first partially open state or provide a first expanded region operating independently of the fixed region, wherein the third display is exposed according to a sliding movement in the designated direction, thereby providing a second partially open state of the electronic device, wherein the third display is configured to extend a second portion of a fixed region of the first display in the second partially open state or provide a second expanded region operating independently of the fixed region, wherein the second housing and the third housing are configured to slide from the first housing independently of each other or slide from the first housing simultaneously, and wherein the second display and the third display are configured to provide the first expanded region or the second expanded region, respectively, based on independent or simultaneous sliding movements of the second housing and the third housing.

14. The electronic device of claim 1, wherein the electronic device comprises a processor, and wherein the processor is configured to:

display a first execution screen based on the first display;

detect a change in state of at least one display among the second display and the third display while displaying the first execution screen;

based on detecting the change in state of the second display, perform one of:

maintaining the first execution screen displayed through the first display and displaying a second execution screen through the second display, or changing the first execution screen so as to correspond to an interworking between a first portion of the first display and the second display and displaying the second execution screen through a second portion of the first display; and based on detecting the change in state of the third display, perform one of:

maintaining the first execution screen displayed through the first display and displaying a third execution screen through the third display, or changing the first execution screen so as to correspond to an interworking between the second portion of the first display and the third display and displaying the third execution screen through the first portion of the first display.

15. A method for operating an electronic device comprising a first housing, a second housing, a third housing, and a flexible display capable of moving into or out of the second housing and the third housing, the method comprising:

displaying a first execution screen based on a first display fixed to the first housing, the first display having a display region exposed outwards;

while displaying the first execution screen, detecting a change in state of at least one of a second display and a third display, the second display being configured to be rolled through a first roller portion in the second housing and capable of first partially expanding from a first portion of the first display or retracting into the second housing, depending on a rotation direction of the first roller portion as the second housing slides, the third display being configured to be rolled through a second roller portion in the third housing and capable of second partially expanding from a second portion of the first display or retracting into the third housing, depending on a rotation direction of the second roller portion as the third housing slides;

based on detecting the change in state of the second display, performing one of:

maintaining the first execution screen displayed through the first display and displaying a second execution screen through the second display, or changing the first execution screen so as to correspond to an interworking between a first portion of the first display and the second display and displaying the second execution screen through a second portion of the first display; and based on detecting the change in state of the third display, performing one of:

maintaining the first execution screen displayed through the first display and displaying a third execution screen through the third display, or changing the first execution screen so as to correspond to an interworking between the second portion of the first display and the third display and displaying the third execution screen through the first portion of the first display, wherein the second display and the third display are disposed adjacent to each other and formed to be able to slide independently or simultaneously.

16. The method of claim 15, further comprising:

displaying, using the first display, a screen through a fixed region in a first state;

sliding the second display according to a sliding movement of the second housing, thereby forming a second state in which the electronic device is first partially open, and performing, using the second display, one of displaying a screen by interworking with the first portion of the fixed region of the first display and an expanded region of the second display in the second state or displaying a screen through the expanded region of the second display independently of the fixed region; and sliding the third display according to a sliding movement of the third housing, thereby forming a third state in which the electronic device is second partially open, and performing, using the third display, one of displaying a screen by interworking with the second portion of the fixed region of the first display and an expanded region of the third display in the third state or displaying a screen through the expanded region of the third display independently of the fixed region.

17. The method of claim 16, wherein the flexible display is connected to at least one display drive integrated circuit (DDI), and wherein one or more of the first display, the second display, and the third display is operatively connected by the at least one DDI.

18. The method of claim 17, further comprising:

in case that the at least one DDI comprises one DDI, connecting gate lines of the second display and the third display so as to bypass the first display.

19. One or more non-transitory computer-readable storage media storing computer-executable instructions that, when executed by at least one processor of an electronic device, cause the electronic device to perform operations comprising:

displaying a first execution screen based on a first display fixed to a first housing, the first display having a display region exposed outwards;

while displaying the first execution screen, detecting a change in state of at least one of a second display and a third display, the second display being configured to be rolled through a first roller portion in a second housing and capable of first partially expanding from a first portion of the first display or retracting into the second housing, depending on a rotation direction of the first roller portion as the second housing slides, the third display being configured to be rolled through a second roller portion in a third housing and capable of second partially expanding from a second portion of the first display or retracting into the third housing, depending on a rotation direction of the second roller portion as the third housing slides;

based on detecting the change in state of the second display, performing one of:

maintaining the first execution screen displayed through the first display and displaying a second execution screen through the second display, or changing the first execution screen so as to correspond to an interworking between a first portion of the first display and the second display and displaying the second execution screen through a second portion of the first display; and based on detecting the change in state of the third display, performing one of:

maintaining the first execution screen displayed through the first display and displaying a third execution screen through the third display, or changing the first execution screen so as to correspond to an interworking between the second portion of the first display and the third display and displaying the third execution screen through the first portion of the first display, wherein the second display and the third display are disposed adjacent to each other and formed to be able to slide independently or simultaneously.

20. A portable communication device comprising:

a housing including a first housing, a second housing slidably coupled to a first portion of the first housing via a first sliding structure, and a third housing slidably coupled to a second portion of the first housing via a second sliding structure configured to slide independently of the first sliding structure, wherein the second housing and the third housing are configured to be slid independently of each other with respect to the first housing; and a flexible display including a first display portion, a second display portion and a third display portion, a screen of the flexible display partially expanding based on a sliding movement of at least one of the second housing or the third housing, the first display portion being configured to remain in the first housing when the second housing or the third housing slides out with respect to the first housing, the second display portion being configured to be slid out of and slid into the second housing according to the second housing sliding out and sliding in, respectively, with respect to the first housing, and the third display portion being configured to be slid out of and slid into the third housing accord-
ing to the third housing sliding out and sliding in,
respectively, with respect to the first housing,
wherein the second display portion of the flexible display
is disposed in an inner space of the second housing and 5
the third display portion of the flexible display is
disposed in an inner space of the third housing, and
wherein the second display portion and the third display
portion are disposed adjacent to each other and formed
to be able to slide independently or simultaneously. 10
21. The portable communication device of claim 20,
wherein the second housing includes a first roller portion
and the third housing includes a second roller portion,
and
wherein the first roller portion of the second housing 15
includes a first roller, and
wherein the second roller portion of the third housing
includes a second roller.

* * * * *